United States Patent [19]
Yoshida et al.

[11] Patent Number: 6,026,246
[45] Date of Patent: Feb. 15, 2000

[54] DISTANCE MEASURING APPARATUS

[75] Inventors: Hideo Yoshida; Yasuhiro Miwa, both of Saitama, Japan

[73] Assignee: Fuji Photo Optical Co., Ltd., Saitama, Japan

[21] Appl. No.: 09/281,906

[22] Filed: Mar. 31, 1999

Related U.S. Application Data

[63] Continuation-in-part of application No. 09/039,330, Mar. 16, 1998.

[30] Foreign Application Priority Data

| Mar. 31, 1997 | [JP] | Japan | 9-081461 |
| Mar. 31, 1997 | [JP] | Japan | 9-081493 |
| Mar. 31, 1997 | [JP] | Japan | 9-081504 |
| Mar. 31, 1997 | [JP] | Japan | 9-081508 |
| Mar. 31, 1997 | [JP] | Japan | 9-081522 |
| Mar. 31, 1998 | [JP] | Japan | 10-086331 |
| Mar. 31, 1998 | [JP] | Japan | 10-086368 |
| Mar. 31, 1998 | [JP] | Japan | 10-086389 |

[51] Int. Cl.$^7$ .................................................. G03B 13/00
[52] U.S. Cl. ........................ 396/106; 396/98; 396/120; 396/125
[58] Field of Search .................. 396/106, 120, 396/125, 98

[56] References Cited

U.S. PATENT DOCUMENTS

| 4,855,585 | 8/1989 | Nonaka | 396/106 |
| 5,200,602 | 4/1993 | Ikebe et al. | 396/106 |
| 5,361,117 | 11/1994 | Nonaka | 396/120 |
| 5,444,511 | 8/1995 | Seki et al. | 396/120 |
| 5,534,991 | 7/1996 | Maeda et al. | 396/106 |
| 5,572,012 | 11/1996 | Saito et al. | 396/106 |
| 5,610,680 | 3/1997 | Seki et al. | 396/106 |
| 5,614,984 | 3/1997 | Seki et al. | 396/106 |
| 5,742,524 | 1/1997 | Ito et al. | 396/106 |
| 5,754,281 | 5/1998 | Maeda | 396/120 |
| 5,864,720 | 1/1999 | Miyanari | 396/106 |
| 5,870,178 | 2/1999 | Akira | 396/106 |

*Primary Examiner*—Russell Adams
*Attorney, Agent, or Firm*—Leydig, Voit & Mayer, Ltd.

[57] ABSTRACT

A far-side signal ($I_2$) output from a PSD which has received reflected light from an object to be subjected to distance measurement is input to a clamp circuit through a second signal processing circuit, and the far-side signal ($I_2$) or a clamp signal (Ic) at a predetermined level, i.e., a signal ($I_2c$) at a higher level is output from the clamp circuit. An arithmetic circuit and an integration circuit receive a near-side signal ($I_1$) output from the PSD and the signal ($I_2c$) output from the clamp circuit and calculate an output ratio signal ($I_1/(I_1+I_2c)$). A CPU obtains a distance signal from the output ratio signal in accordance with a transformation formula which changes depending on the threshold value for determining whether to clamp the signal.

32 Claims, 67 Drawing Sheets

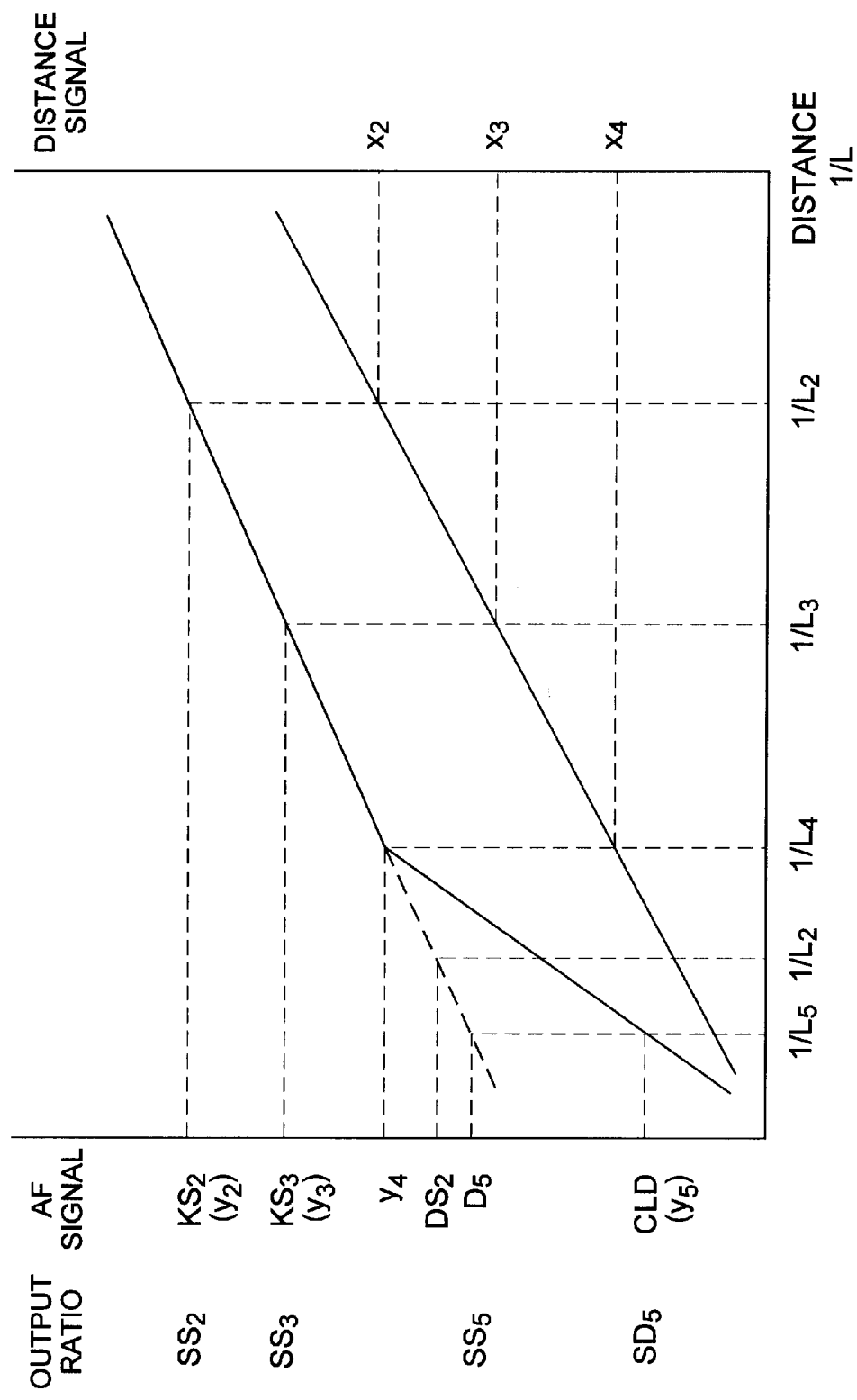

CENTER OF PSD

FAR SIDE

NEAR SIDE

DISTANCE MEASURING APPARATUS

RELATED APPLICATION

This is a continuation-in-part application of application Ser. No. 09/039,330 filed on Mar. 16, 1998, now pending.

BACKGROUND OF THE INVENTION

1. Field of the Invention

The present invention relates to an active distance measuring apparatus suitable for a camera or the like.

2. Related Background Art

Conventionally, as an active distance measuring apparatus for a camera, the one shown in FIG. 84 is known. FIG. 84 is a block diagram of a distance measuring apparatus of the first prior art.

In the distance measuring apparatus shown in FIG. 84, a driver 112 drives an infrared emitting diode (to be referred to as an "IRED" hereinafter) 114 under the control of a CPU 110 to cause the IRED 114 to output infrared light, thereby projecting the infrared light to an object to be subjected to distance measurement. The infrared light reflected by the object is focused on a position sensing device (to be referred to as a "PSD" hereinafter) 116 through an objective (not shown). The PSD 116 outputs two signals $I_1$ and $I_2$ in accordance with the position where the reflected infrared light was received. A first signal processing circuit 118 removes the stationary light component contained in the signal $I_1$ as noise, and a second signal processing circuit 120 removes the stationary light component contained in the signal $I_2$ as noise.

An arithmetic circuit 132 calculates the output ratio ($I_1/(I_1+I_2)$) on the basis of the signals $I_1$ and $I_2$ from which the stationary light components are removed, and outputs an output ratio signal corresponding to the distance to the object. An integration circuit 134 integrates the output ratio signal output from the arithmetic circuit 132 a number of times to improve the S/N ratio. A signal output (to be referred to as an "AF signal" hereinafter) from the integration circuit 134 corresponds to the distance to the object. The CPU 110 performs predetermined calculation on the basis of the AF signal output from the integration circuit 134 to obtain a distance signal and controls a lens driving circuit 136 on the basis of the distance signal to move a lens 138 to an in-focus position.

FIG. 85 is a graph showing the relationship between the AF signal output from the integration circuit 134 and the distance to the object in the first prior art. In this graph, the abscissa indicates the reciprocal (1/L) of a distance L to the object, and the ordinate indicates the output ratio ($I_1/(I_1+I_2)$), i.e., the AF signal. As shown in FIG. 85, up to a certain distance $L_4$, the output ratio and the reciprocal (1/L) of the distance L have a substantially linear relationship therebetween. As the distance L increases, (1/L decreases), the output ratio decreases. However, at a distance larger than the distance $L_4$, when the distance L increases, the influence of noise component increases inversely. Letting $I_n$ ($I_n \geq 0$) be the noise component, the output ratio is given by $(I_1+I_n)/(I_1+I_n+I_2+I_n)$. At a distance larger than the distance $L_4$, the output ratio varies in the increasing direction. In addition, the noise component $I_n$ is generated at random and the output ratio is therefore unstable depending on specific distance measuring conditions involved. This is because when the distance L increases, the intensity of reflected light reaching the PSD 116 decreases, and the noise component $I_n$ increases relative to the light component. When this phenomenon occurs, the distance L to the object cannot be uniquely determined from the output ratio.

The following techniques are known as distance measuring apparatuses for solving the above problem. FIG. 86 is a block diagram of a distance measuring apparatus of the second prior art. FIG. 86 shows only the arrangement on the light-receiving side. In the distance measuring apparatus shown in FIG. 86, after stationary light components are removed from signals $I_1$ and $I_2$ output from a PSD 140 by stationary light removing circuits 142 and 144, respectively, they are input to arithmetic circuits 146 and 148. The arithmetic circuit 146 calculates $I_1/(I_1+I_2)$ on the basis of the signals $I_1$ and $I_2$ from which the stationary light components are removed, thereby obtaining the output ratio. An integration circuit 150 integrates the output ratio. On the other hand, the arithmetic circuit 148 calculates $I_1+I_2$ to obtain the light amount. An integration circuit 152 integrates the light amount. A selection unit 160 selects one of the output ratio and the light amount and obtains the distance to the object on the basis of the output ratio or the light amount. The processing of the selection unit 160 is performed in the CPU.

FIG. 87 is a block diagram of a distance measuring apparatus of the third prior art. FIG. 87 also shows only the arrangement on the light-receiving side. In the distance measuring apparatus shown in FIG. 87, after stationary light components are removed from signals $I_1$ and $I_2$ output from a PSD 170 by stationary light removing circuits 172 and 174, respectively, they are input to one terminal of a switch 176. This switch 176 inputs the output from the stationary light removing circuit 172 or 174 to an integration circuit 178 under the control of the CPU. The integration circuit 178 integrates the input signal $I_1$ or $I_2$. An arithmetic unit 180 calculates $I_1/(I_1+I_2)$ on the basis of the integration result to obtain the output ratio. On the other hand, an arithmetic unit 182 calculates $I_1+I_2$ to obtain the light amount. A selection unit 184 selects one of the output ratio and the light amount and obtains the distance to the object on the basis of the output ratio or the light amount. The processing operations of the arithmetic units 180 and 182 and the selection unit 184 are performed in the CPU.

Both the distance measuring apparatuses of the second and third prior arts (FIGS. 86 and 87) obtain a distance L to the object on the basis of the output ratio ($I_1/(I_1+I_2)$) when the distance L is small, or obtain the distance L on the basis of the light amount ($I_1+I_2$) when the distance L is large. With this arrangement, the distance L can be uniquely determined.

SUMMARY OF THE INVENTION

As described above, the distance measuring apparatuses of the second and third prior arts (FIGS. 86 and 87) can solve the problem of the distance measuring apparatus of the first prior art (FIG. 84). However, the distance measuring apparatus of the second prior art (FIG. 86) requires two sets of arithmetic circuits and integration circuits. This makes the circuit arrangement larger than that of the distance measuring apparatus of the first prior art (FIG. 84), resulting in an increase in cost. The distance measuring apparatus of the third prior art (FIG. 87) has a small circuit arrangement but cannot simultaneously detect the signals $I_1$ and $I_2$ from the PSD 170. For this reason, to obtain the distance L at an S/N ratio equivalent to that of the distance measuring apparatus of the second prior art (FIG. 86), the apparatus of the third prior art requires a time twice longer than that of the second prior art.

All the distance measuring apparatuses of the above-described prior arts are designed to suitably operate when the external light luminance, the temperature, and the power supply voltage are within standard ranges. However, if the external light luminance, the temperature, or the power supply voltage varies, e.g., the light amount of infrared light emitted by the IRED changes, the circuits (the first signal processing circuits 118 and 120 in FIG. 84, the stationary light removing circuits 142 and 144 in FIG. 86, or the stationary light removing circuits 172 and 174 in FIG. 87) for removing stationary light components cannot sufficiently remove the stationary light components from the signals $I_1$ and $I_2$ output from the PSD, or the arithmetic circuits or integration circuits operate deviating from the design value. In such a case, the obtained distance measurement result contains errors, and no reliable distance measurement result cannot be obtained. Especially, when the distance to the object is large, this problem is serious.

The present invention has been made to solve the above problem, and has as its object to provide a distance measuring apparatus capable of uniquely obtaining the distance to an object to be subjected to distance measurement with a small circuit arrangement in a short time even when the distance to the object is large.

In addition, in all the above prior arts, the relative positional relationship between the IRED and the PSD sometimes changes in assembling the camera, resulting in an error in distance measurement result. More specifically, as shown in FIGS. 44A to 44D, when the relative positional relationship (FIG. 88A) between the IRED and the PSD corresponds to the design (FIG. 88B), the output signal from the PSD represents the actual distance. However, if the relative positional relationship shifts, the output signal from the PSD represents that the object is at a position farther than the actual position (FIG. 88C) or closer than the actual position (FIG. 88D). Therefore, parameters for a transformation formula used to calculate the distance signal from the PSD output must be obtained in the manufacture in units of cameras and stored in the memory of the camera in advance. However, when the distance to the object increases, the parameters can hardly be obtained on the basis of the actual measurement.

The present invention has been made to solve the above problem, and has as its object to provide a distance measuring apparatus capable of uniquely obtaining the distance to an object to be subjected to distance measurement with a small circuit arrangement in a short time even when the distance to the object is large, and a method of adjusting the same.

In order to achieve the above objects, according to an aspect of the present invention, there is provided a distance measuring apparatus comprising (1) light-emitting means for outputting a light beam toward an object to be subjected to distance measurement, (2) light-receiving means for receiving reflected light of the light beam projected on the object at a light-receiving position corresponding to a distance to the object and outputting, on the basis of the light-receiving position, a far-side signal whose value becomes larger when the distance increases if an amount of received light remains the same and a near-side signal whose value becomes larger when the distance decreases if the amount of received light remains the same, (3) clamp means for receiving the far-side signal, comparing a level of the far-side signal with that of a clamp signal, and directly outputting the far-side signal when the far-side signal has a level higher than that of the clamp signal, and otherwise, outputting the clamp signal, (4) arithmetic means for calculating an output ratio of the near-side signal and the signal output from the clamp means and outputting an output ratio signal, and (5) conversion means for converting the output ratio signal into a distance signal corresponding to the distance in accordance with a transformation formula which changes depending on whether the output ratio signal is on a far side of a predetermined reference level, the predetermined reference level being a clamp effect presence/absence determination reference level defined by a reference object reflectivity.

According to this distance measuring apparatus, the light beam output from the light-emitting means toward the object is reflected by the object. The reflected light is received by the light-receiving means at the light-receiving position corresponding to the distance to the object, and the light-receiving means outputs, on the basis of the light-receiving position, the far-side signal whose value becomes larger when the distance increases if the amount of received light remains the same and the near-side signal whose value becomes larger when the distance decreases if the amount of received light remains the same. The clamp means compares the level of the far-side signal with that of the clamp signal. When the far-side signal has a level higher than that of the clamp signal, the far-side signal is directly output; otherwise, the clamp signal is output. The arithmetic means calculates the ratio of the near-side signal to the signal output from the clamp means and outputs the output ratio signal. The conversion means converts the output ratio signal into the distance signal in accordance with the transformation formula which changes depending on whether the output ratio signal is on the far side of the predetermined reference level, and outputs the distance signal.

According to another aspect of the present invention, there is provided a distance measuring apparatus comprising (1) light-emitting means for outputting a light beam toward an object to be subjected to distance measurement, (2) light-receiving means for receiving reflected light of the light beam projected on the object at a light-receiving position corresponding to a distance to the object and outputting, on the basis of the light-receiving position, a far-side signal whose value becomes larger when the distance increases if an amount of received light remains the same and a near-side signal whose value becomes larger when the distance decreases if the amount of received light remains the same, (3) clamp means for receiving the far-side signal, comparing a level of the far-side signal with that of a clamp signal, and directly outputting the far-side signal when the far-side signal has a level higher than that of the clamp signal, and otherwise, outputting the clamp signal, (4) arithmetic means for calculating an output ratio of the near-side signal to the signal output from the clamp means and outputting an output ratio signal, (5) detection means for outputting a detection signal representing whether the far-side signal has a level higher than that of the clamp signal, and (6) conversion means for converting the output ratio signal into a distance signal corresponding to the distance in accordance with a transformation formula which changes depending on the detection signal.

The functions of the light-emitting means, the light-receiving means, the clamp means, and the arithmetic means in this distance measuring apparatus are the same as described above. In this case, the detection means outputs the detection signal representing whether the far-side signal has a level higher than that of the clamp signal. The conversion means converts the output ratio signal into the distance signal in accordance with the transformation formula which changes depending on the detection signal, and outputs the distance signal.

In either arrangement, almost the same distance measurement result as that of the conventional scheme which also uses light amount distance measurement can be obtained in a short time without increasing the circuit scale, and the distance to the object can be uniquely and stably obtained even when the distance is large. When this distance measuring apparatus is incorporated in a camera and used for automatic focusing, focus control for the photographing lens of the camera is done on the basis of the distance signal.

In either case, various transformation formulas are available for the conversion means. The second transformation formula is preferably determined on the basis of the first transformation formula or preferably determined on the basis of the effect amount of the clamp means at a distance having a predetermined value and the distance which is obtained from the level of the clamp signal and at which the effect of the clamp means is obtained.

In either case, preferably, the distance measuring apparatus further comprises one of luminance measurement means for measuring an external light luminance, temperature measurement means for measuring a temperature, and voltage measurement means for measuring a power supply voltage, and the conversion means converts the output ratio signal into the distance signal in accordance with the transformation formula based on the external light luminance, the temperature, or the power supply voltage. In this case, in addition to the above effect, the distance can be uniquely and stably obtained even when the external light luminance, the temperature, or the power supply voltage varies, so reliable infinity determination is enabled with high long distance measurement accuracy.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 19B is a graph for explaining a method of adjusting the distance measuring apparatus according to the embodiment;

DESCRIPTION OF THE PREFERRED EMBODIMENTS

Figure 1:
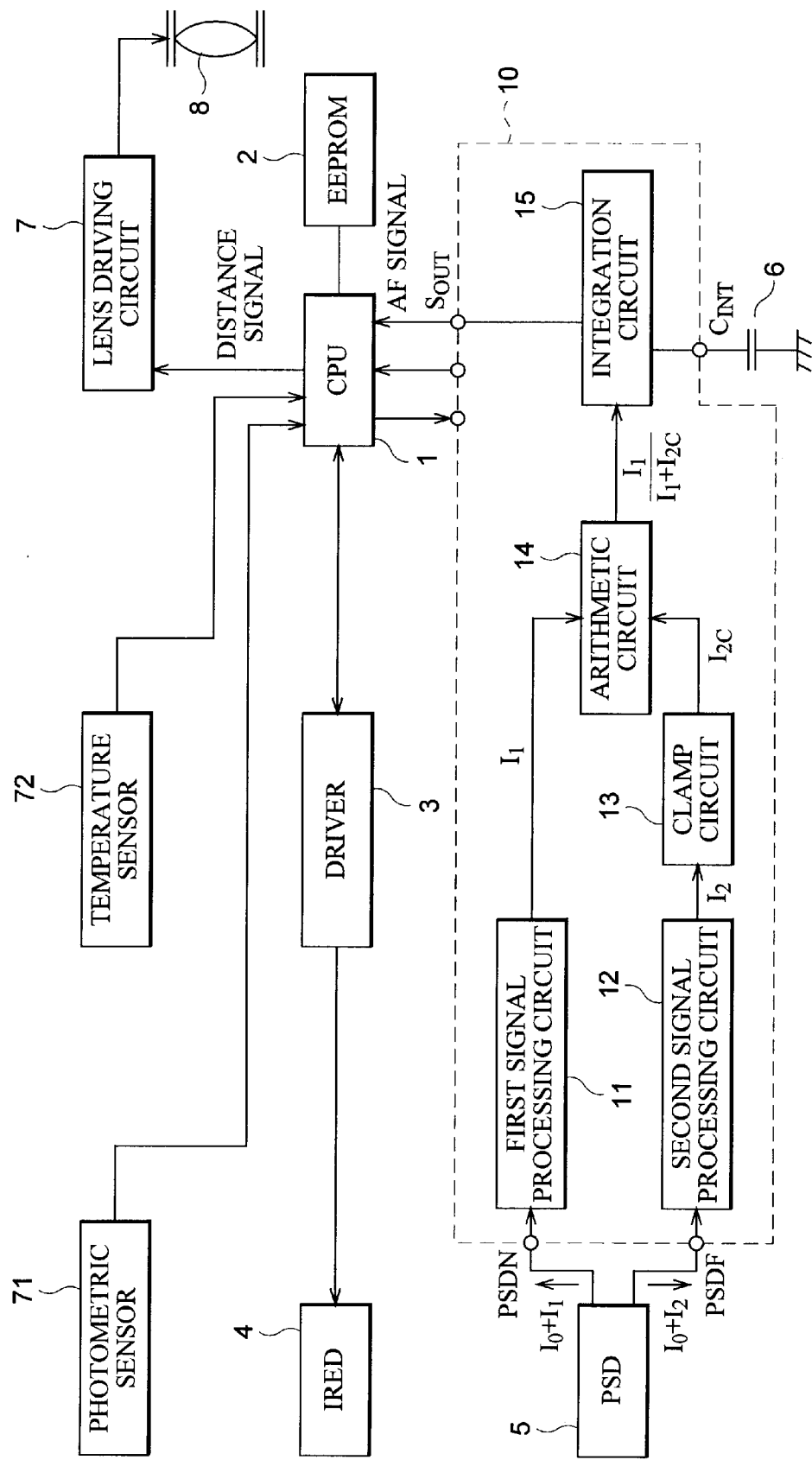
FIG. 1 is a block diagram of a distance measuring apparatus according to the present invention.

The embodiments of the present invention will be described below with reference to the accompanying drawings. The same reference numerals denote the same elements throughout the drawings, and a detailed description thereof will be omitted. And a distance measuring apparatus incorporated in a camera will be described.

The entire arrangement of a distance measuring apparatus according to the present invention will be described. FIG. 1 is a block diagram of the distance measuring apparatus of a first embodiment.

A CPU 1 controls the entire camera having the distance measuring apparatus. The CPU 1 controls the entire camera including the distance measuring apparatus on the basis of programs and parameters stored in an EEPROM 2. In the distance measuring apparatus shown in FIG. 1, the CPU 1 controls a driver 3 to control emission of infrared light by an IRED 4 and inputs the value of a power supply voltage (or a power supply voltage obtained from a drive current supplied from the driver 3 to the IRED 4) supplied to the driver 3. The CPU 1 controls the operation of an automatic focusing IC (to be referred to as an "AFIC" hereinafter) 10 and inputs an AF signal output from the AFIC 10. The CPU 1 also inputs the value of an external light luminance measured by a photometric sensor 71 and inputs the value of temperature measured by a temperature sensor 72. The power supply voltage to be measured is not limited to that of the driver 3 or the IRED 4. The voltage of a battery may be directly measured, or a voltage supplied to another constituent element may be measured.

The infrared light emitted by the IRED 4 is projected on an object to be subjected to distance measurement through a projecting lens (not shown) disposed in front of the IRED 4. Some light components are reflected, and the reflected light is received at a position on the light-receiving surface of a PSD 5 through a light-receiving lens (not shown) disposed in front of the PSD 5. The light-receiving position corresponds to the distance to the object. The PSD 5 outputs two signals $I_1$ and $I_2$ corresponding to the position where the light was received. The signal $I_1$ is a near-side signal whose value becomes large when the distance decreases if the amount of received light remains the same. The signal $I_2$ is a far-side signal whose value becomes large when the distance increases if the amount of received light remains the same. The sum of the signals $I_1$ and $I_2$ represents the light amount of the reflected light received by the PSD 5. The output ratio ($I_1/(I_1+I_2)$) represents the light-receiving position on the light-receiving surface of the PSD 5, i.e., the distance to the object. The near-side signal $I_1$ is input to the PSDN terminal of the AFIC 10, and the far-side signal $I_2$ is input to the PSDF terminal of the AFIC 10. Actually, in some cases, signals obtained by adding a stationary light component $I_0$ to the near-side signal $I_1$ and the far-side signal $I_2$ are input to the AFIC 10 depending on external conditions.

The AFIC 10 is an integrated circuit (IC) comprising a first signal processing circuit 11, a second signal processing circuit 12, a clamp circuit 13, an arithmetic circuit 14, and an integration circuit 15. The first signal processing circuit 11 receives the signal $I_1+I_0$ output from the PSD 5, removes the stationary light component $I_0$ contained in the signal, and outputs the near-side signal $I_1$. The second signal processing circuit 12 receives the signal $I_2+I_0$ output from the PSD 5, removes the stationary light component $I_0$ contained in the signal, and outputs the far-side signal $I_2$.

Figure 85:
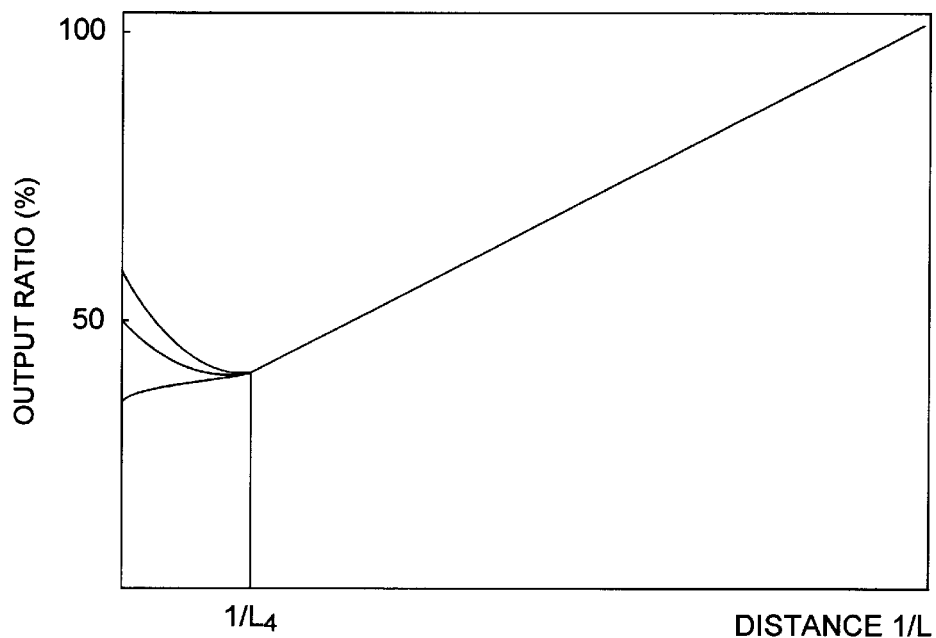
FIG. 85 is a graph showing the relationship between the AF signal output from an integration circuit and the distance to an object to be subjected to distance measurement in the first prior art.
Figure 86:
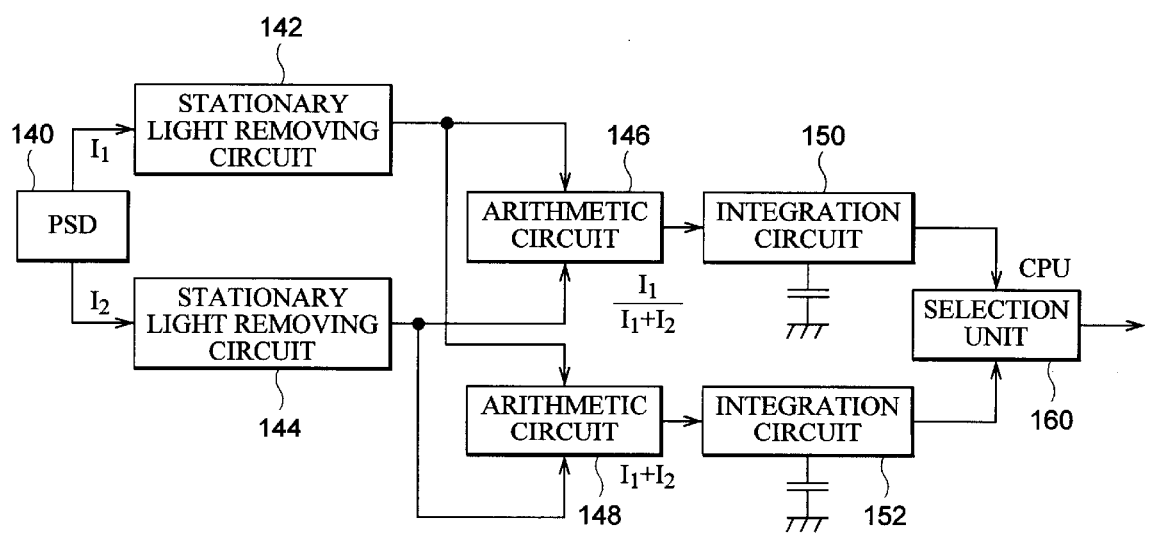
FIG. 86 is a block diagram of a distance measuring apparatus of the second prior art.
Figure 87:
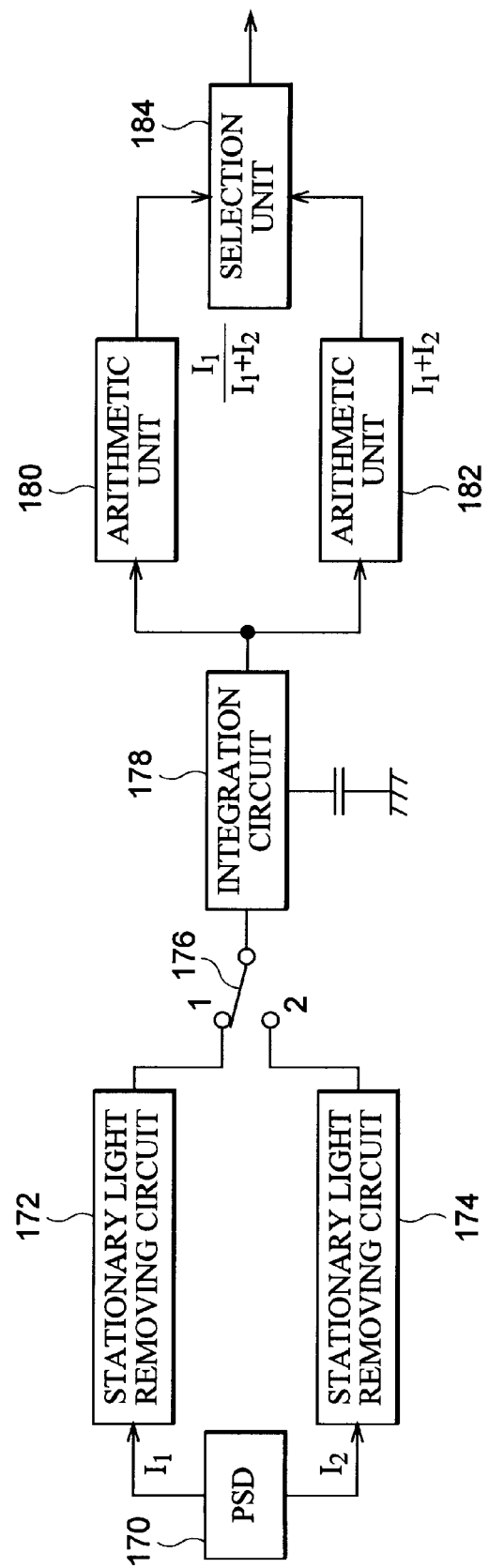
FIG. 87 block diagram of a distance measuring apparatus of the third prior art.

The clamp circuit 13 receives the far-side signal $I_2$ output from the second signal processing circuit 12 and compares the level of a clamp signal $I_c$ at a constant level with that of the far-side signal $I_2$. If the former is higher, the clamp circuit 13 outputs the clamp signal $I_c$; otherwise, the clamp circuit 13 directly outputs the far-side signal $I_2$. The signal output from the clamp circuit 13 will be represented by $I_{2c}$ hereinafter. The clamp signal $I_c$ is at nearly the same level as that of the far-side signal $I_2$ corresponding to the distance $L_4$ shown in FIG. 85.

The arithmetic circuit 14 receives the near-side signal $I_1$ output from the first signal processing circuit 11 and the signal $I_{2c}$ (the far-side signal $I_2$ or the clamp signal $I_c$) output from the clamp circuit 13, calculates the output ratio ($I_1/(I_1+I_{2c})$), and outputs the calculation result. The integration circuit 15 receives the output ratio and integrates the output ratio a number of times together with an integration capacitor 6 connected to a terminal $C_{INT}$ of the AFIC 10, thereby improving the S/N ratio. The integrated output ratio is output from a terminal $S_{OUT}$ of the AFIC 10 as an AF signal.

The CPU 1 receives the AF signal output from the AFIC 10, performs predetermined calculation to convert the AF signal into a distance signal, and sends the distance signal to a lens driving circuit 7. The lens driving circuit 7 brings a photographing lens 8 to a focus on the basis of the distance signal. Conversion calculation from the AF signal to the distance signal by the CPU 1 will described later.

Figure 2:
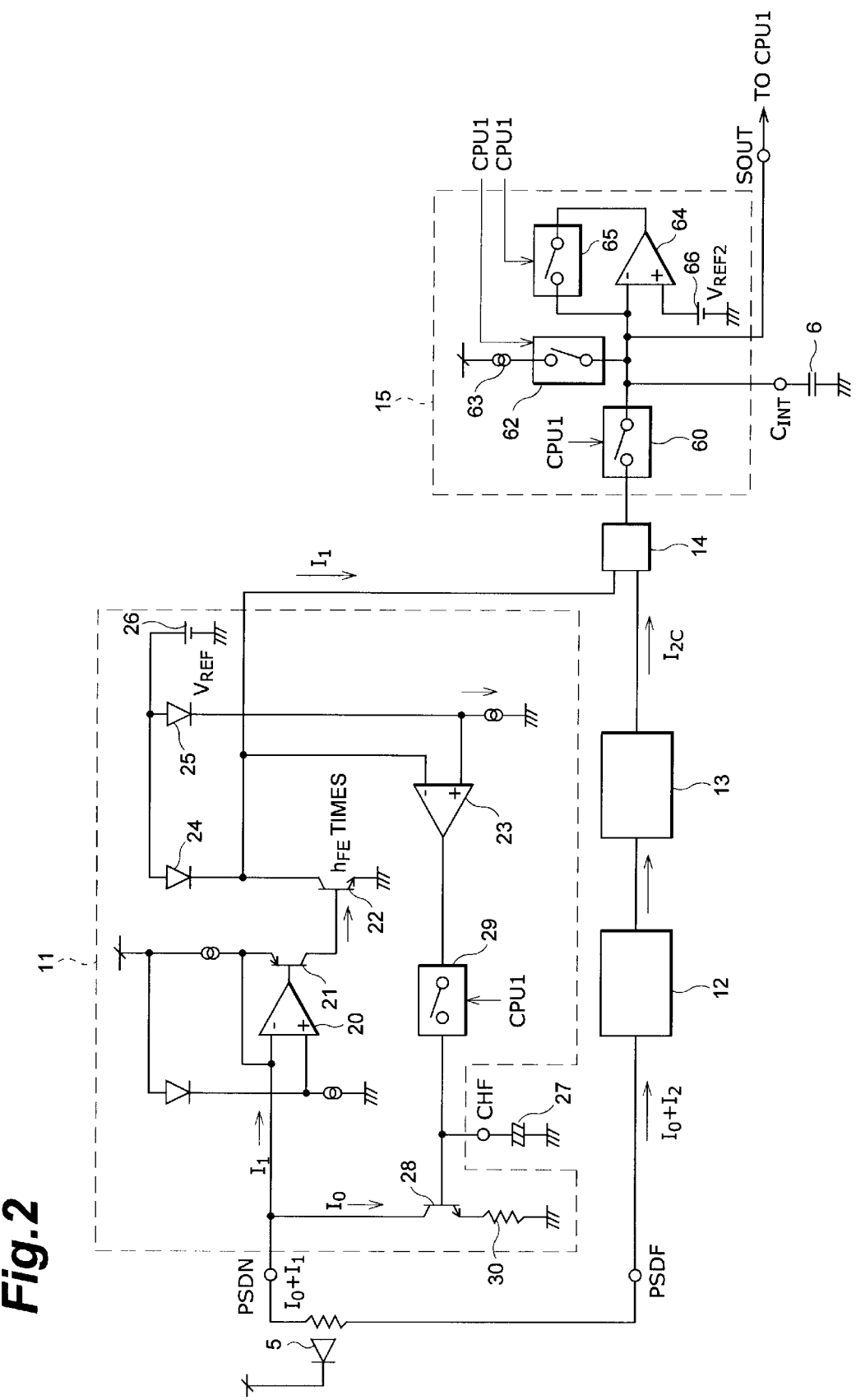
FIG. 2 is a circuit diagram of a first signal processing circuit and an integration circuit in the distance measuring apparatus of the embodiment.
Figure 3:
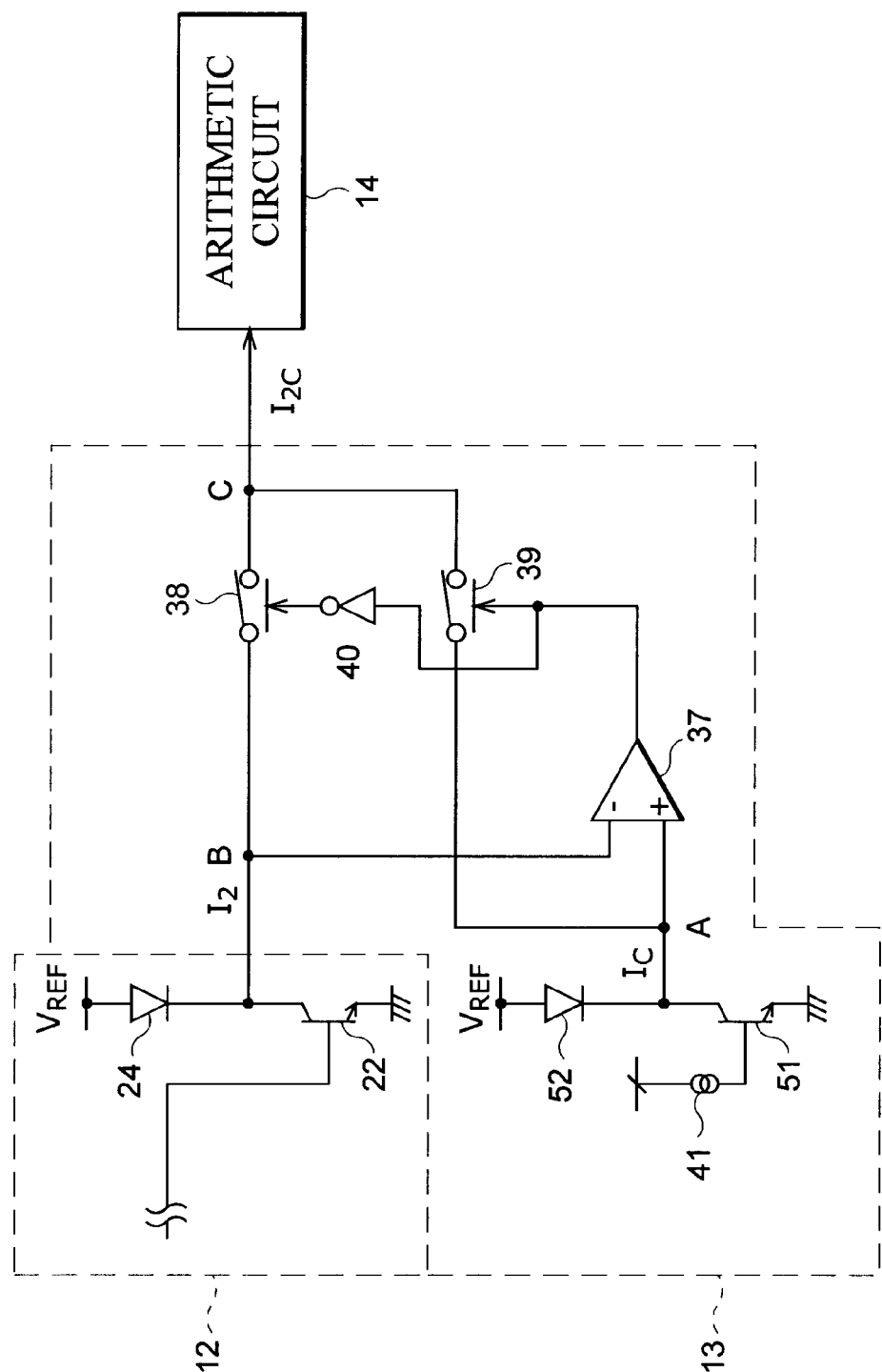
FIG. 3 is a circuit diagram of a clamp circuit in the distance measuring apparatus of the embodiment.

The circuit arrangement of the first signal processing circuit 11, the clamp circuit 13, and the integration circuit 15 of the AFIC 10 will be described next in more detail. FIG. 2 is a circuit diagram of the first signal processing circuit 11 and the integration circuit 15 in the distance measuring apparatus of this embodiment. FIG. 3 is a circuit diagram of the clamp circuit 13 in the distance measuring apparatus of this embodiment. The second signal processing circuit 12 has the same arrangement as that of the first signal processing circuit 11.

The circuit diagram of the first signal processing circuit 11 is shown in FIG. 2. The first signal processing circuit 11 receives the near-side signal $I_1$ containing the stationary light component $I_0$ output from the PSD 5, removes the stationary light component $I_0$ contained in the near-side signal $I_1$, and outputs the near-side signal $I_1$. The current $(I_1+I_0)$ output from near-side terminal of the PSD 5 is input to the – input terminal of an operational amplifier 20 of the first signal processing circuit 11 through the terminal PSDN of the AFIC 10. The output terminal of the operational amplifier 20 is connected to the base terminal of a transistor 21. The collector terminal of the transistor 21 is connected to the base terminal of a transistor 22. The collector terminal of the transistor 21 is connected to the – input terminal of an operational amplifier 23, and the potential of the collector terminal is connected to the arithmetic circuit 14. In addition, the cathode terminal of a compression diode 24 is connected to the collector terminal of the transistor 22, and the cathode terminal of a compression diode 25 is connected to the + input terminal of the operational amplifier 23. A first reference power supply 26 is connected to the anode terminals of the compression diodes 24 and 25.

An external stationary light removing capacitor 27 is connected to a terminal CHF of the AFIC 10. This stationary light removing capacitor 27 is connected to the base terminal of a stationary light removing transistor 28 in the first signal processing circuit 11. The stationary light removing capacitor 27 and the operational amplifier 23 are connected through a switch 29. The switch 29 is ON/OFF-controlled by the CPU 1. The collector terminal of the stationary light removing transistor 28 is connected to the – input terminal of the operational amplifier 20. The emitter terminal of the transistor 28 is connected to a resistor 30 whose other terminal is grounded.

The circuit diagram of the clamp circuit 13 is shown in FIG. 3. The + input terminal of a determination comparator 37 in the clamp circuit 13 is connected to the collector terminal of the transistor 22 in the second signal processing circuit 12 and also connected to the input terminal of the arithmetic circuit 14 through a switch 38. On the other hand, the – input terminal of the determination comparator 37 is connected to the collector terminal of a transistor 51 and the cathode terminal of a compression diode 52 and also connected to the input terminal of the arithmetic circuit 14 through a switch 39, like the + input terminal connected to the transistor 22 and the compression diode 24.

A constant current source 41 is connected to the base terminal of the transistor 51. The predetermined clamp level is set by the constant current source 41 so a current having a predetermined magnitude is input to the base terminal of the transistor 51. This current becomes the base current of the transistor 51, and a collector potential corresponding to the magnitude of the current is input to the – input terminal of the determination comparator 37.

The output terminal of the determination comparator 37 is connected to the switch 39, so the output signal from the determination comparator 37 is input to the switch 39. The output terminal of the determination comparator 37 is connected to the switch 38 through an inverter 40, so the output signal from the determination comparator 37 is inverted and input to the switch 38. Therefore, when one of the switches 38 and 39 is turned on in response to the output signal from the determination comparator 37, the other is turned off.

The circuit arrangement of the integration circuit 15 is shown in FIG. 2. The external integration capacitor 6 connected to the terminal $C_{INT}$ of the AFIC 10 is connected to the output terminal of the arithmetic circuit 14 through a switch 60, connected to a constant current source 63 through a switch 62, connected to the output terminal of an operational amplifier 64 through a switch 65, and also directly connected to the – input terminal of the operational amplifier 64. The potential of the integration capacitor 6 is output from the terminal SOUT of the AFIC 10. The switches 60, 62, and 65 are controlled by a control signal from the CPU 1. A second reference power supply 66 is connected to the + input terminal of the operational amplifier 64.

The function of the AFIC 10 having the above arrangement will be described with reference to FIGS. 2 and 3. While the IRED 4 does not emit light, the CPU 1 turns on the switch 29 of the first signal processing circuit 11. The stationary light component $I_0$ output from the PSD 5 at this time is input to the first signal processing circuit 11, amplified by a current amplifier constituted by the operational amplifier 20 and the transistors 21 and 22, logarithmically compressed by the compression diode 24, and converted into a voltage signal. This voltage signal is input to the – input terminal of the operational amplifier 23. When the signal input to the operational amplifier 20 is large, the VF of the compression diode become large. The signal output from the operational amplifier 23 is large, so the capacitor 27 is charged. At this time, a base current is supplied to the transistor 28. A collector current flows to the transistor 28, and of the signal $I_0$ input to the first signal processing circuit 11, the signal component input to the operational amplifier 20 becomes small. When the operation of this closed loop stabilizes, all components of the signal $I_0$ input to the first signal processing circuit 11 flow to the transistor 28, so charges corresponding to the base current at this time are stored.

When the CPU 1 causes the IRED 4 to emit light and simultaneously turns off the switch 29, the stationary light component $I_0$ of the signal $I_1+I_0$ output from the PSD 5 at this time flows as a collector current to the transistor 28 to which the base potential is applied by charges stored in the stationary light removing capacitor 27. The near-side signal $I_1$ is amplified by the current amplifier constituted by the operational amplifier 20 and the transistors 21 and 22, logarithmically compressed by the compression diode 24, converted into a voltage signal, and output. That is, the first signal processing circuit 11 outputs only the near-side signal $I_1$ after removal of the stationary light component $I_0$. The near-side signal $I_1$ is input to the arithmetic circuit 14. Like the first signal processing circuit 11, the second signal processing circuit 12 outputs only the far-side signal $I_2$ after removal of the stationary light component $I_0$. The far-side signal $I_2$ is input to the clamp circuit 13.

However, when the external light luminance is high, the collector current flowing to the transistor 28 varies, and the stationary light component $I_0$ becomes large. When the temperature varies, the amplifier gain or the amount of light emitted by the IRED 4 varies, a noise component $I_n$ becomes large, and the clamp current varies. When the power supply voltage varies, the amount of light emitted by the IRED 4 varies, and the noise component $I_n$ becomes large. If such an error is generated when the distance to the object is large, and the amount of reflected light incident on the PSD 5 is small, the output ratio approaches 50%, and the infinity determination accuracy lowers. The distance measuring apparatus of this embodiment can obtain a reliable infinity determination result even in such a case.

The far-side signal $I_2$ input to the clamp circuit 13 is input to the + input terminal of the determination comparator 37 in the clamp circuit 13. The signal output from the constant current source 41 flows as the base current of the transistor 51, and the resultant potential (clamp signal Ic) of the collector terminal of the transistor 51 is input to the − input terminal of the determination comparator 37. The level of the far-side signal $I_2$ is compared with that of the clamp signal $I_c$ by the determination comparator 37. In accordance with the comparison result, one of the switches 38 and 39 is turned on, and the other is turned off. More specifically, when the level of the far-side signal $I_2$ is higher than that of the clamp signal $I_c$, the switch 38 is turned on while the switch 39 is turned off, so the far-side signal $I_2$ is output from the clamp circuit 13 as the output signal $I_{2c}$. If the level relationship is reversed, the switch 38 is turned off while the switch 39 is turned on, so the clamp signal $I_c$ is output from the clamp circuit 13 as the output signal $I_{2c}$.

The signal $I_{2c}$ output from the clamp circuit 13 and the near-side signal $I_1$ output from the first signal processing circuit 11 are input to the arithmetic circuit 14. The arithmetic circuit 14 calculates the output ratio ($I_1/(I_1+I_2)$) and outputs the output ratio. The output ratio is input to the integration circuit 15. While the IRED 4 is emitting pulse light a predetermined number of times, the switch 60 of the integration circuit 15 is turned on, and the switches 62 and 65 are turned off. The output ratio signal output from the arithmetic circuit 14 is stored in the integration capacitor 6. When pulse light has been emitted the predetermined number of times, the switch 60 is turned off, and the switch 65 is turned on. The charges stored in the integration capacitor 6 decrease due to charges with the opposite potential supplied from the output terminal of the operational amplifier 64. The CPU 1 monitors charges in the integration capacitor 6 to measure the time required to restore the original potential, calculates the AF signal on the basis of the time, and also calculates the distance to the object.

Figure 4:
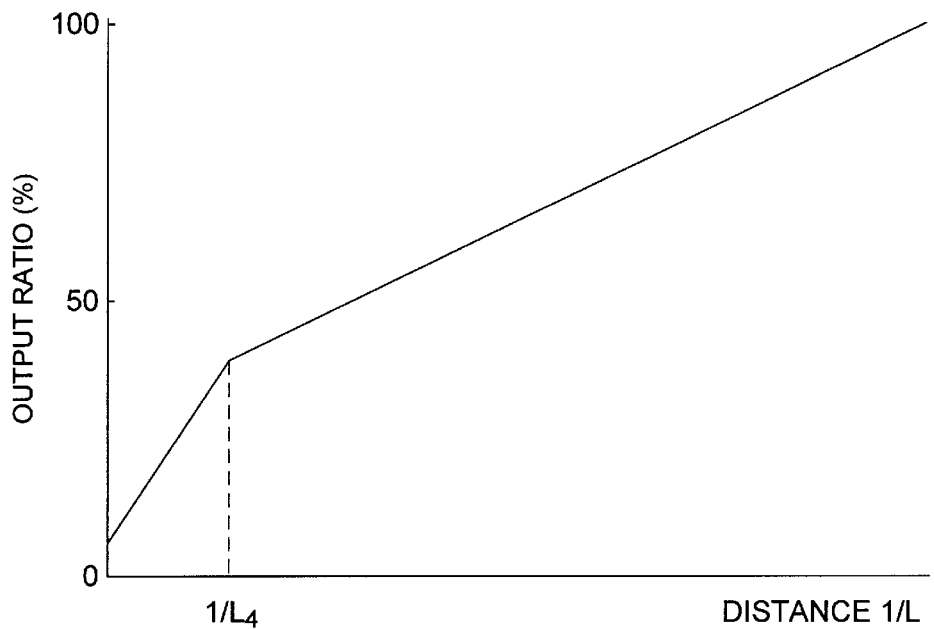
FIG. 4 is a graph showing the relationship between the AF signal output from the integration circuit in the distance measuring apparatus of FIG. 1 and the distance to an object subjected to distance measurement.

FIG. 4 shows the relationship between the AF signal obtained in the above manner and the distance L to the object. FIG. 4 is a graph showing the relationship between the AF signal output from the integration circuit of the distance measuring apparatus of this embodiment and the distance to the object. In the graph shown in FIG. 4, the abscissa indicates the reciprocal (1/L) of the distance L to the object, and the ordinate indicates the output ratio ($I_1/(I_1+I_2)$), i.e., the AF signal. As shown in FIG. 4, when the distance L to the object is smaller than a certain distance $L_4$ ($L \leq L_4$), the signal $I_2$ is output from the clamp circuit 13, the output ratio is $I_1/(I_1+I_2)$, and the reciprocal (1/L) of the distance L and the output ratio have a substantially linear relationship. When the distance L increases (1/L decreases), the output ratio becomes low. When the distance L is larger than the distance $L_4$ ($L \geq L_4$), the signal $I_c$ is output from the clamp circuit 13, and the output ratio is $I_1/(I_1+I_2)$. In this case as well, when the distance L increases, the output ratio becomes low. As described above, the distance L to the object can be uniquely and stably determined from the output ratio (AF signal) using the clamp circuit 13.

Figure 5:
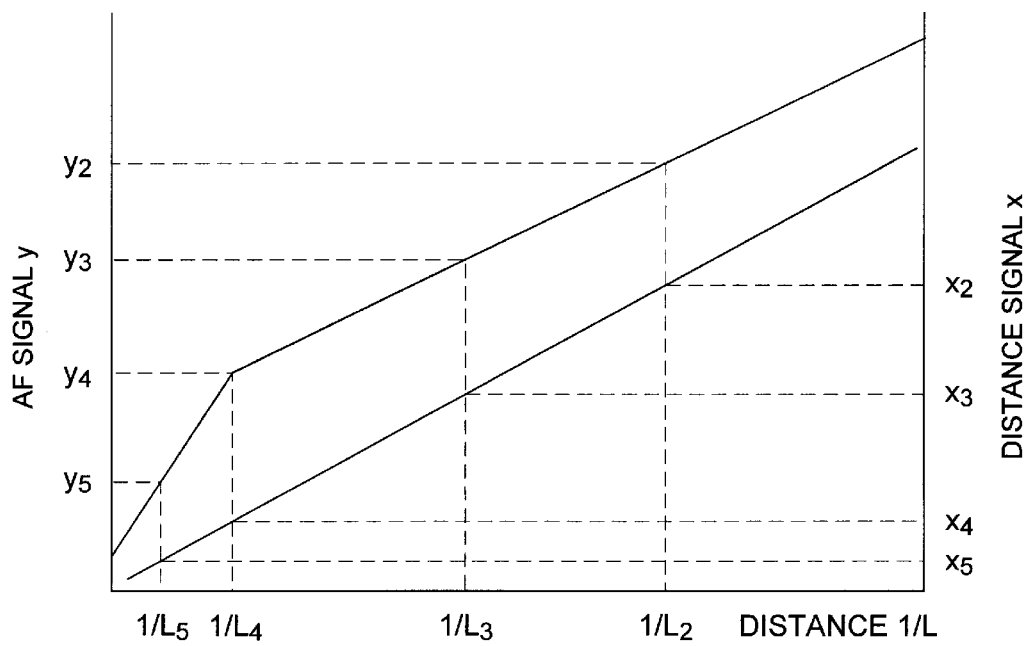
FIG. 5 is a graph for explaining conversion from the AF signal to a distance signal in the distance measuring apparatus of FIG. 1.

The CPU 1 calculates a distance signal representing the driving amount of the photographing lens 8 on the basis of the AF signal obtained in the above manner and sends the distance signal to the lens driving circuit 7 to bring the photographing lens 8 to a focus. FIG. 5 is a graph for explaining conversion from the AF signal to the distance signal in the distance measuring apparatus of this embodiment. In the graph shown in FIG. 5, the abscissa indicates the reciprocal (1/L) of the distance L to the object, the left ordinate indicates the AF signal, and the right ordinate indicates the distance signal. This graph also shows the relationship between the distance L and the AF signal and the relationship between the distance L and the distance signal. Especially, AF signals $Y_2$, $Y_3$, $Y_4$, and $y_5$ and distance signals $x_2$, $X_3$, $X_4$, and $x_5$ correspond to distances $L_2$, $L_3$, $L_4$, and $L_5$ ($L_2<L_3<L_4<L_5$), respectively.

Within each of the ranges $L \leq L_4$ and $L>L_4$, the AF signal and the reciprocal (1/L) of the distance L have a substantially linear relationship. Over the distance L, the distance signal and the reciprocal (1/L) of the distance L have a substantially linear relationship. Therefore, the relationship between the AF signal and the distance signal within each of the ranges $L \leq L_4$ and $L>L_4$ is also substantially linear.

Figure 6:
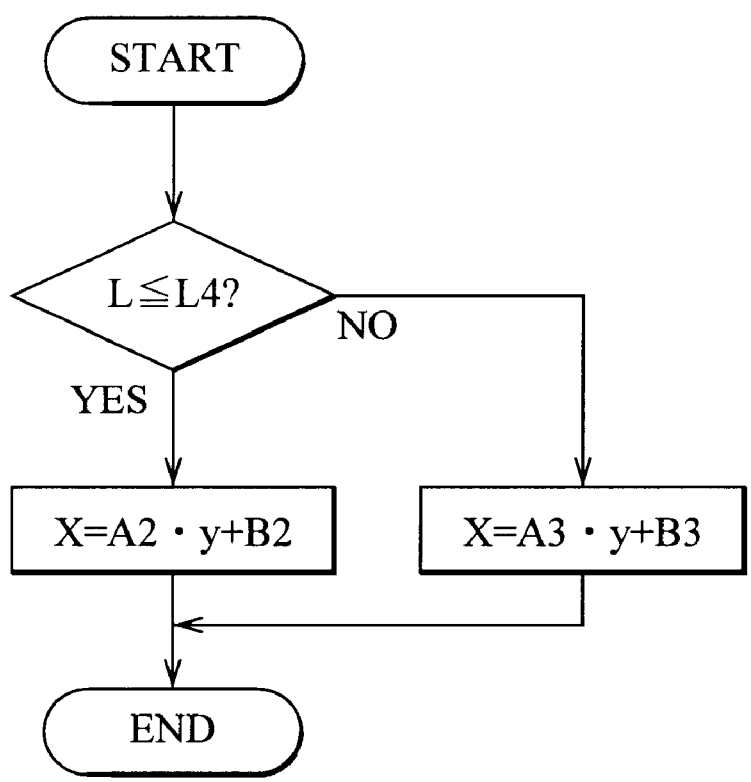
FIG. 6 is a flow chart for explaining calculation of the distance signal.

A clamp effect presence/absence determination reference level COUNT_B which is defined by the reference object reflectivity (36%) is compared with the level of an AF signal y, and the AF signal y is converted into a distance signal x using a transformation formula which changes depending on the comparison result. For the reference object reflectivity, the distance L for the clamp effect presence/absence determination reference level COUNT_B is $L_4$, and COUNT_B equals $y_4$. More specifically, according to the flow chart shown in FIG. 6, within the range $L \leq L_4$, on the basis of parameters $$A2=(x_3-x_2)/(y_3-y_2) \quad (1)$$

and $$B2=x_2-y_2 \cdot A2 \quad (2)$$

the distance signal x is obtained from the AF signal y using:

$$x=A2 \cdot y+B2 \quad (3)$$

In addition, within the range $L>L_4$, on the basis of parameters $$A3=(x_5-x_4)/(y_5-y_4) \quad (4)$$

and $$B3=x_4-y_4 \cdot A3 \quad (5)$$

the distance signal x is obtained from the AF signal y using:

$$x=A3 \cdot y+B3 \quad (6)$$

The parameters A2 (equation (1)), B2 (equation (2)), A3 (equation (4)), and B3 (equation (5)) are obtained in the manufacture in units of cameras in which this distance measuring apparatus is to be incorporated and stored in the EEPROM 2 or the like in advance. These parameters are read out by the CPU 1 in distance measurement to calculate equation (3) or (6), so the AF signal y is converted into the distance signal x.

Calculation examples of the AF signal and the distance signal in the distance measuring apparatus of this embodiment will be described next. FIGS. 7 and 8A to 8C are graphs respectively showing the calculation results of the AF signal and the distance signal for the distance L to an object to be subjected to distance measurement having a reflectivity of 36%. FIGS. 9 and 10A to 10C are graphs respectively showing the calculation results of the AF signal and the distance signal for the distance L to an object to be subjected to distance measurement having a reflectivity of 9%. FIGS. 11 and 12A to 12C are graphs respectively showing the calculation results of the AF signal and the distance signal for the distance L to an object to be subjected to distance measurement having a reflectivity of 90%. FIGS. 8A, 10A, and 12A show calculation results obtained upon calculating the distance signal in accordance with the present invention. FIGS. 8B, 10B, and 12B show calculation results obtained upon calculating the distance signal in accordance with equation (1) to (3). FIGS. 8C, 10C, and 12C show calculation results obtained upon calculating the distance signal by light amount distance measurement when the distance L increases.

Figure 7:
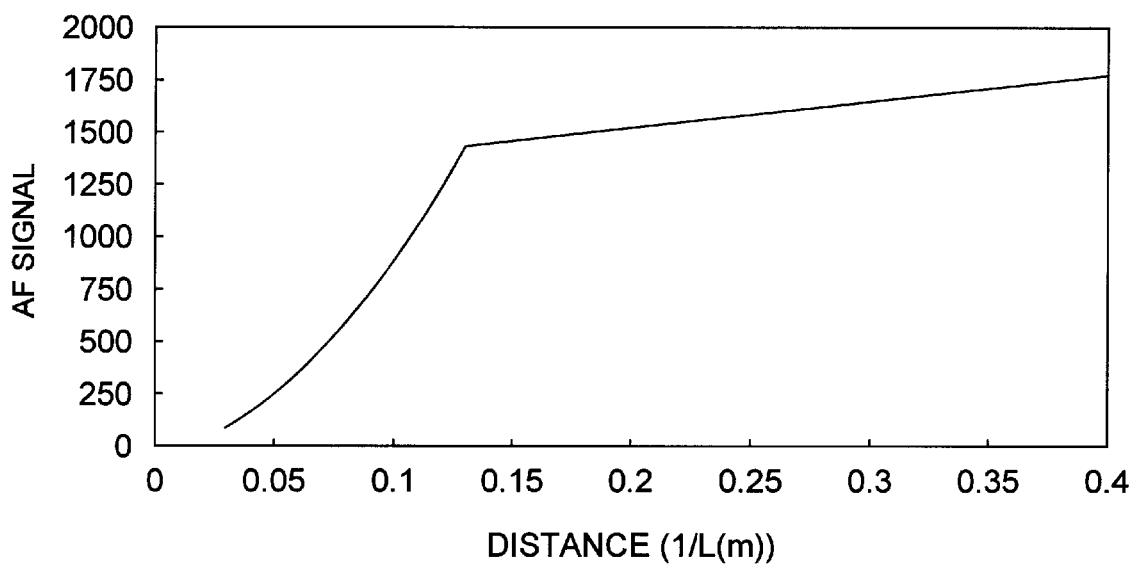
FIG. 7 is a graph showing the calculation result of the AF signal y for a distance L to an object to be subjected to distance measurement having a reflectivity of 36%.
Figure 8A:
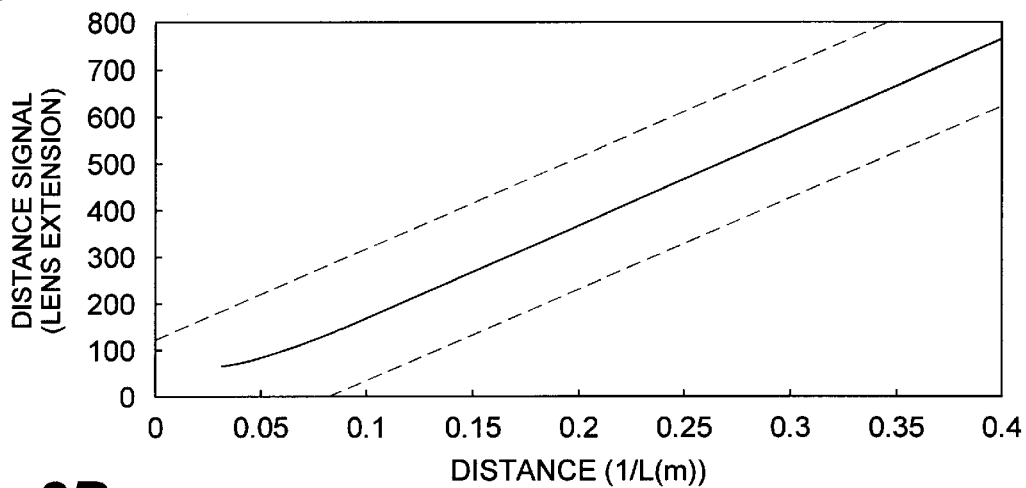
FIGS. 8A to 8C are graphs showing the calculation results of the distance signal for the distance L to the object having a reflectivity of 36% using different translation formulas.
Figure 8B:
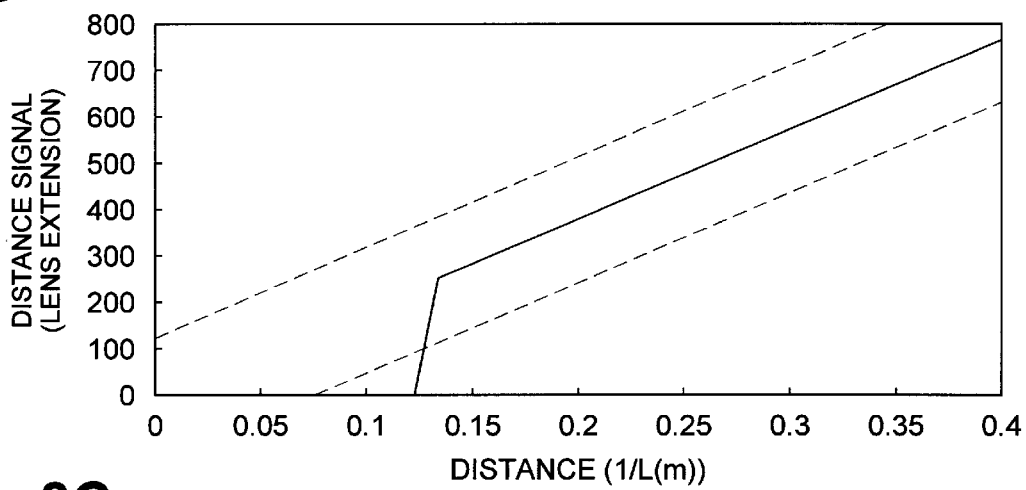
Figure 8C:
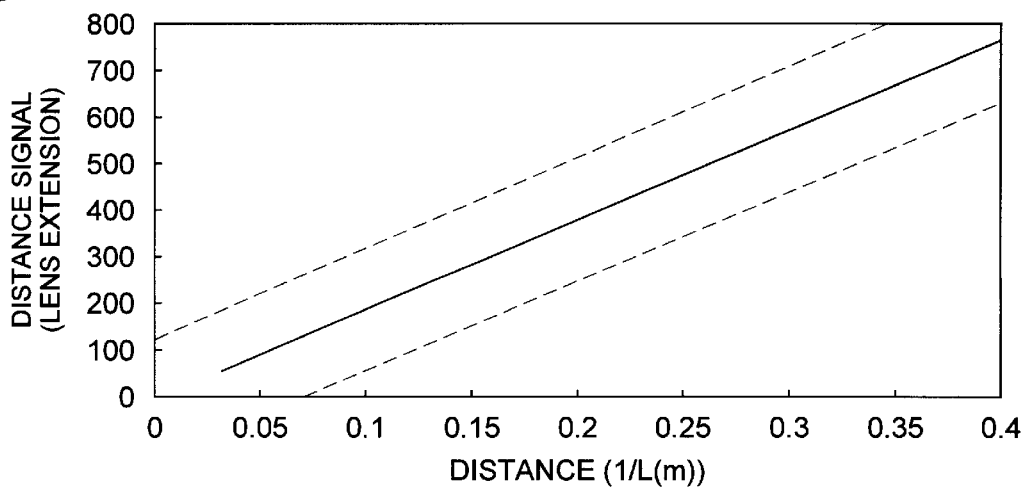

The dependence of the AF signal on the distance in the case shown in FIG. 7 wherein the reflectivity of the object is 36% (i.e., in case of standard condition) will be considered. When the reciprocal (1/L) of the distance L (unit is in m) is about 0.13 or more, a far-side signal $I_2$ is output from the clamp circuit 13. Within this range, the AF signal has a substantially linear relationship to 1/L. When 1/L is about 0.13 or less, a clamp signal $I_c$ is output from the clamp circuit 13. Within this range as well, the AF signal has a substantially linear relationship to 1/L.

When the distance signal is calculated on the basis of this AF signal in accordance with equation (1) to (6), the result shown in FIG. 8A is obtained. This result is considerably concordant with that of the conventional scheme (FIG. 8C) which also uses light amount distance measurement. The two broken lines shown in each of the graphs in FIGS. 8A to 8C indicate the error allowable ranges of the distance measurement, which is obtained from the circle of confusion of the photographing lens 8. The distance signals shown in FIGS. 8A and 8C fall within the allowable ranges. To the contrary, when the distance signal is calculated over the distance L in accordance with equation (1) to (3) (FIG. 8B), the distance signal abruptly becomes small for 1/L of about 0.13 or less, so the error in distance measurement result increases and falls outside the allowable range.

Figure 9:
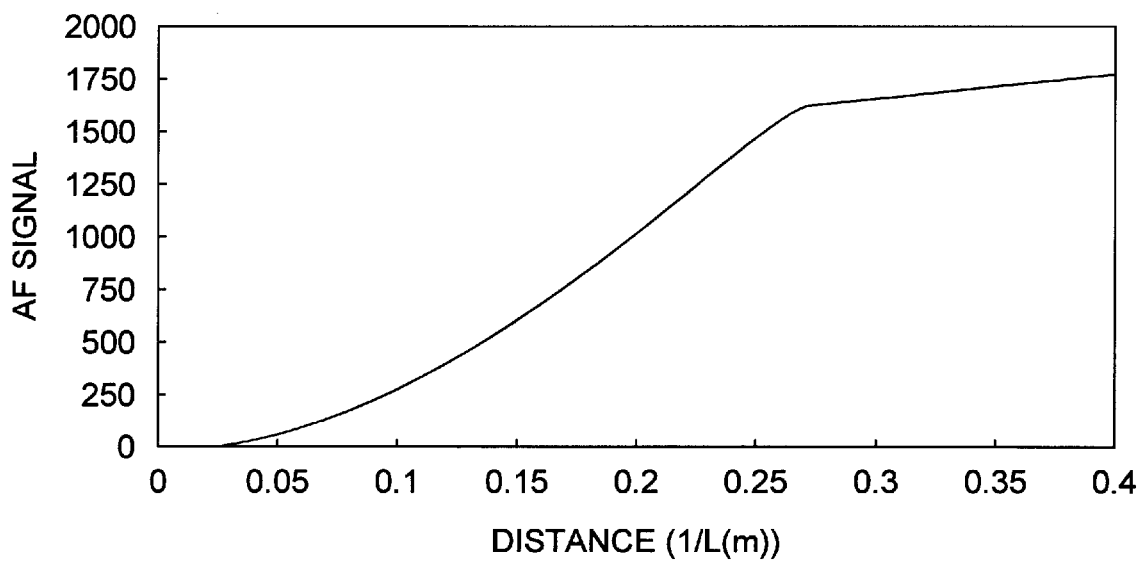
FIG. 9 is a graph showing the calculation result of the AF signal for the distance L to an object to be subjected to distance measurement having a reflectivity of 9%.
Figure 10A:
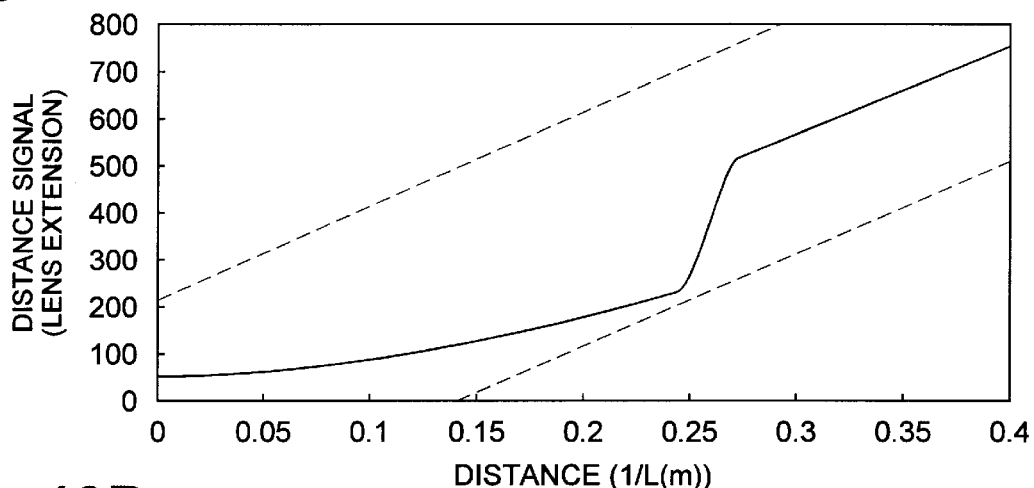
FIGS. 10A to 10C are graphs showing the calculation results of the distance signal for the distance L to the object having a reflectivity of 9% using different translation formulas.
Figure 10B:
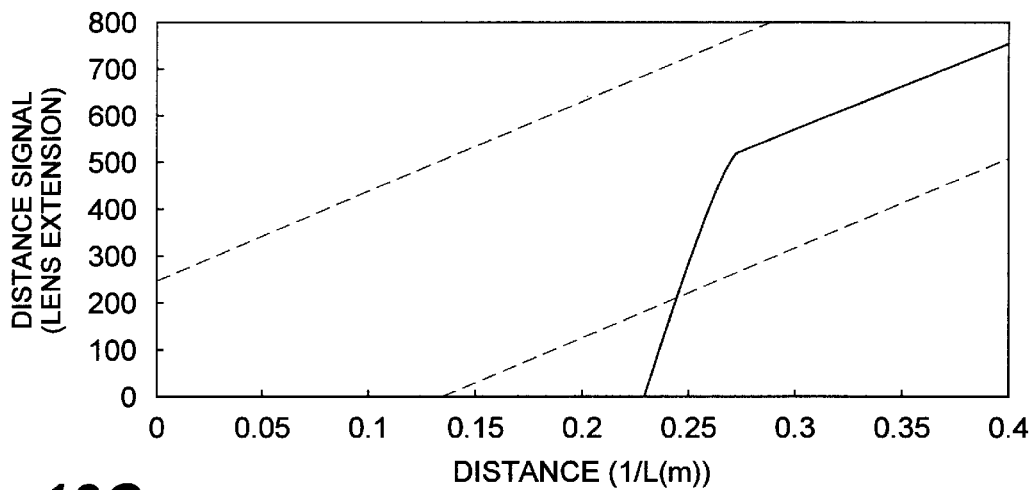
Figure 10C:
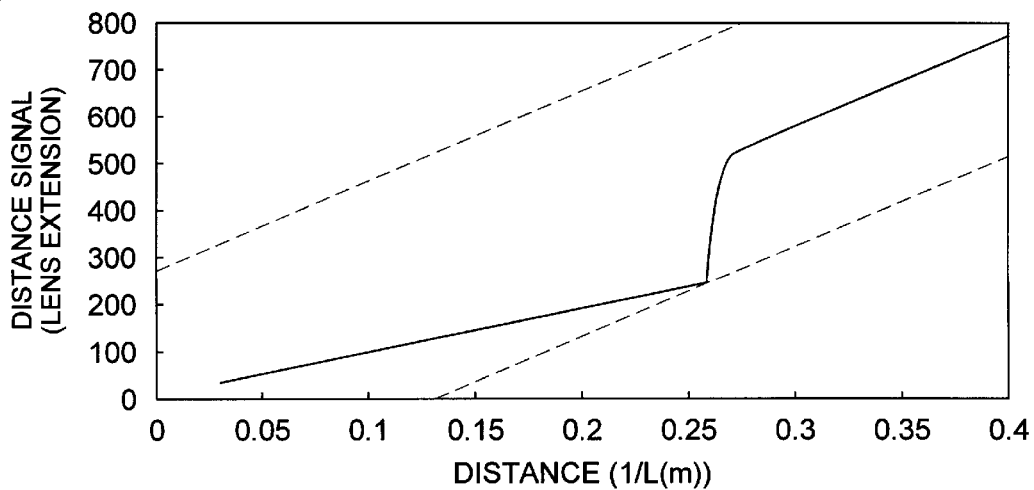

The dependence of the AF signal on the distance in the case shown in FIG. 9 wherein the reflectivity of the object is 9% (i.e., when the reflectivity of the object is low) will be considered. Unlike FIG. 7, the signal output from the clamp circuit 13 is switched at a portion where the distance L is small (1/L=about 0.27). However, in this case as well, the distance signal obtained according to the present invention (FIG. 10A) considerably agrees with that obtained by the conventional scheme which also uses light amount distance measurement (FIG. 10C), and these distance signals fall within the allowable ranges. To the contrary, when the distance signal is calculated over the distance L in accordance with equation (1) to (3) (FIG. 10B), the distance signal abruptly becomes small for 1/L of about 0.26 or less, so the error in distance measurement result increases and falls outside the allowable range for 1/L of about 0.25 or less.

Figure 11:
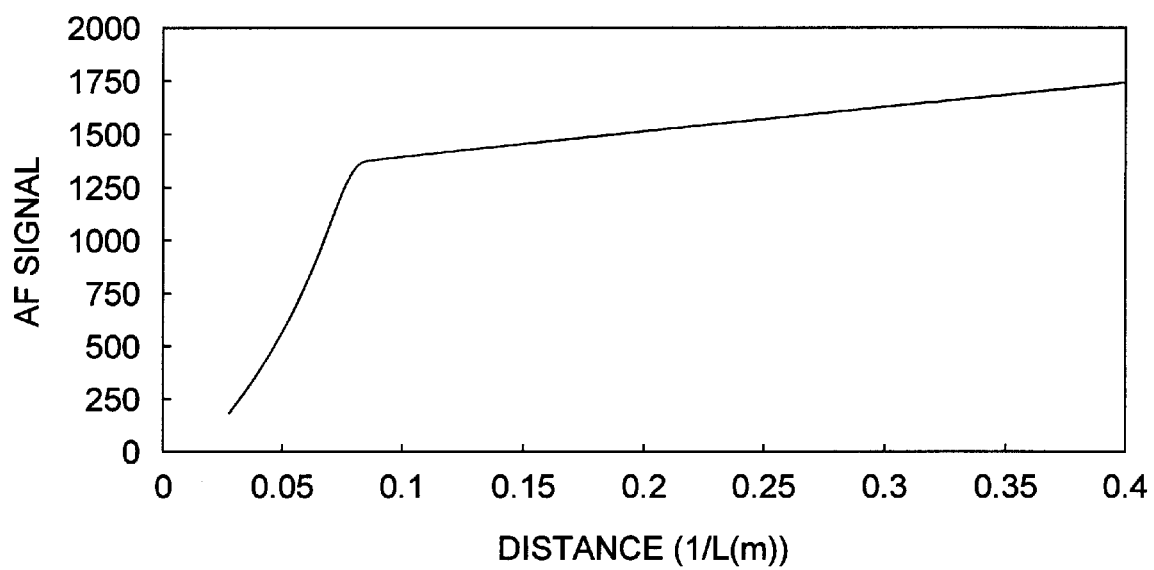
FIG. 11 is a graph showing the calculation result of the AF signal for the distance L to an object to be subjected to distance measurement having a reflectivity of 90%.
Figure 12A:
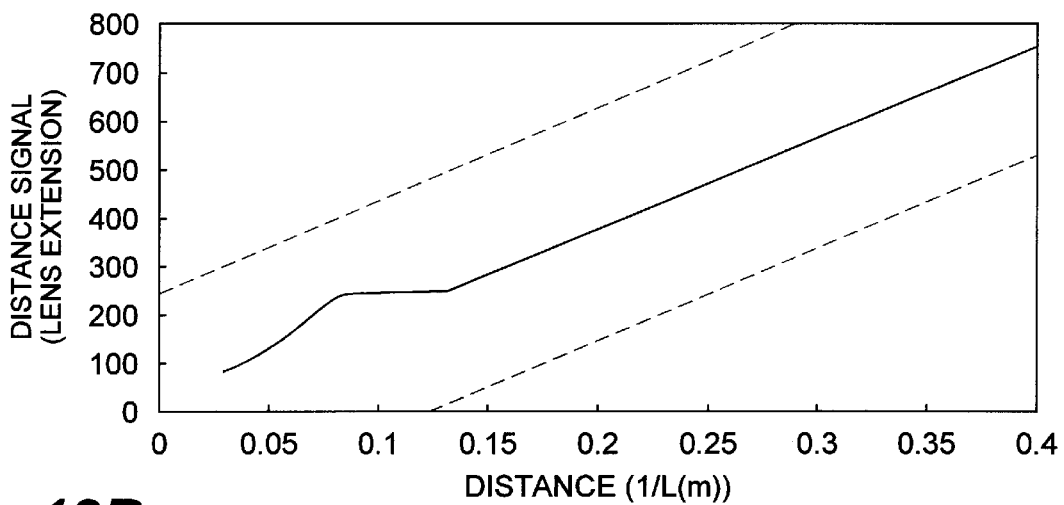
FIGS. 12A to 12C are graphs showing the calculation results of the distance signal for the distance L to the object having a reflectivity of 90% using different translation formulas.
Figure 12B:
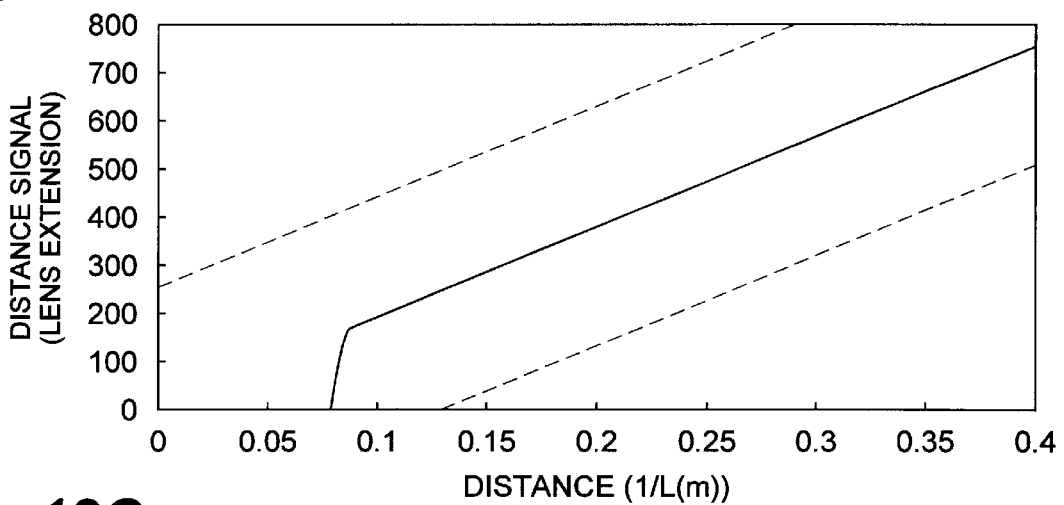
Figure 12C:
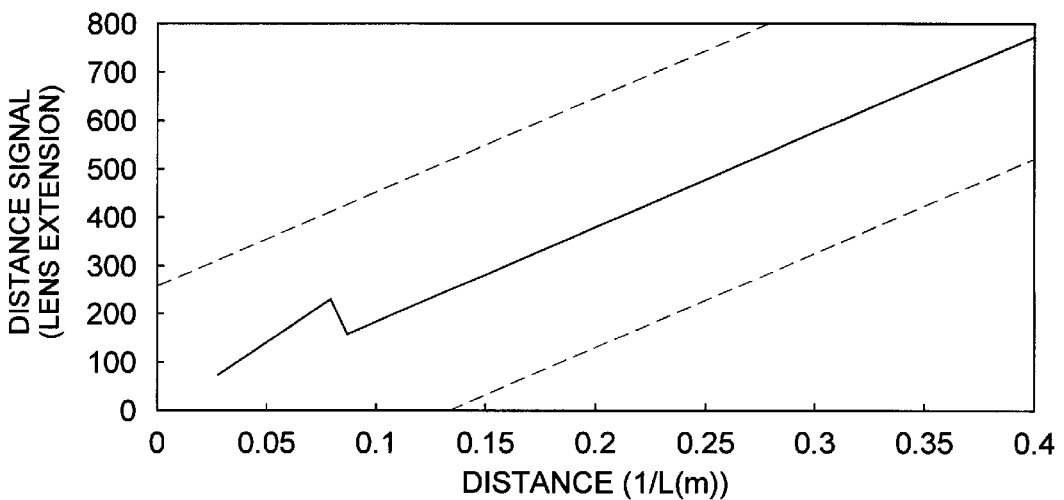

The dependence of the AF signal on the distance in the case shown in FIG. 11 wherein the reflectivity of the object is 90% (i.e., when the reflectivity of the object is high) will be considered. Unlike FIG. 7, the signal output from the clamp circuit 13 is switched at a portion where the distance L is large (1/L=about 0.08). However, in this case as well, the distance signal obtained according to the present invention (FIG. 12A) is considerably congruent with that obtained by the conventional scheme which also uses light amount distance measurement (FIG. 12C), and these distance signals fall within the allowable ranges. Even when the distance signal is calculated over the distance L in accordance with equation (1) to (3) (FIG. 12B), the variation amount is almost the same as in the above cases. As described above, the calculation result of the distance signal according to the present invention relatively satisfactorily agrees with that of the scheme which also uses light amount distance measurement in the wide reflectivity range of the object, i.e., 9% to 90%, and falls within the allowable range.

Figure 13:
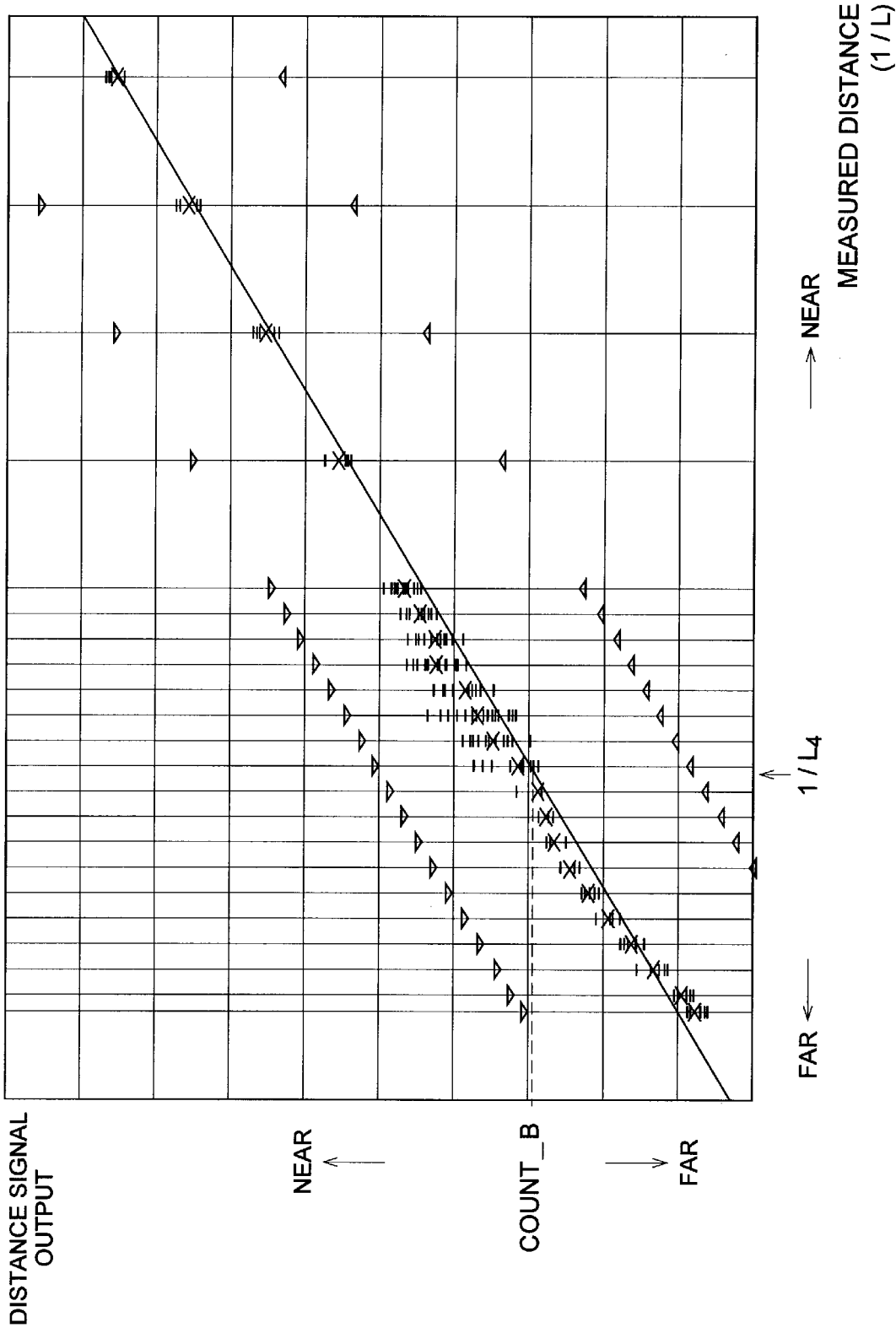
FIG. 13 is a graph showing the actual measurement result of the distance signal for the distance L to the object having a reflectivity of 36%.

Actual measurement examples of the AF signal and the distance signal in the distance measuring apparatus of this embodiment will be described next. FIG. 13 is a graph showing the actual measurement result of the distance signal for the distance L to the object having a reflectivity of 36%. In FIG. 13, the solid line indicates the theoretical value of the distance signal; symbols Δ and ∇, the upper and lower limits of the error allowable range of the distance signal, respectively; –, one of 20 measurement results for the distance L; and x, the average value of the 20 measurement results. As is apparent from FIG. 13, not only the average value but also each actual measurement value of the 20 measurement results is in excellently agreement with the theoretical value and falls within the allowable range.

Figure 14:
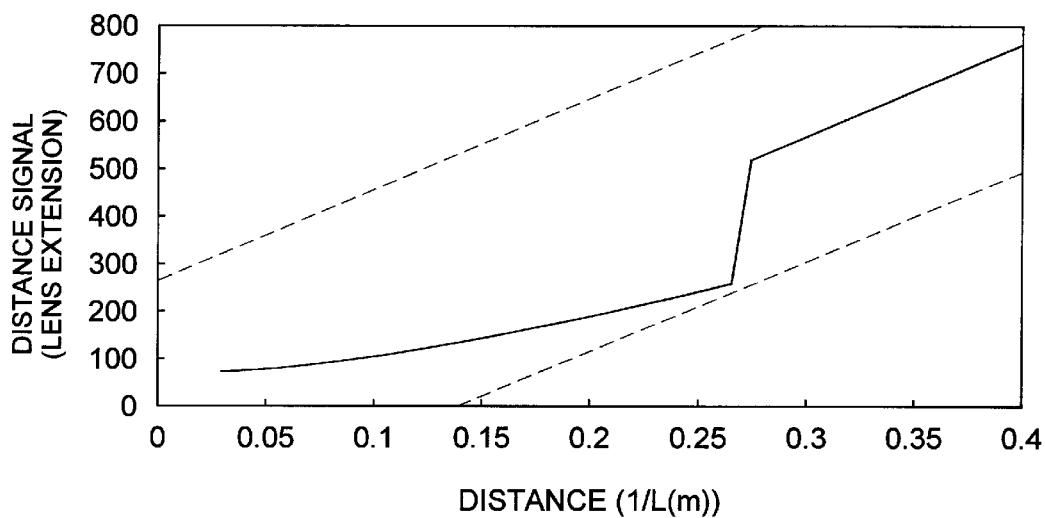
FIG. 14 is a graph showing the calculation result of the distance signal for the distance L to the object having a reflectivity of 9% when the transformation formula is selected on the basis of the level of a far-side signal.
Figure 15:
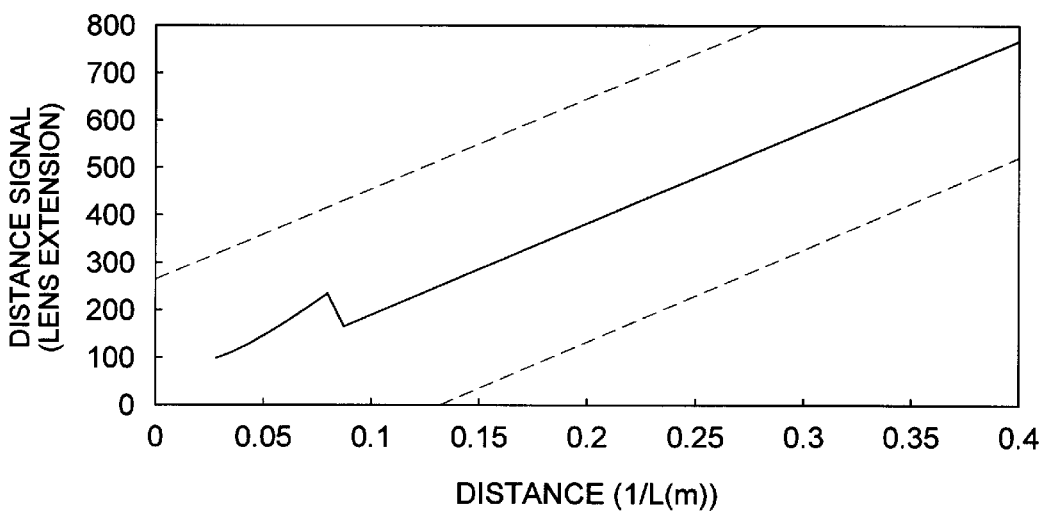
FIG. 15 is a graph showing the calculation result of the distance signal for the distance L to the object having a reflectivity of 90% when the transformation formula is selected on the basis of the level of the far-side signal.

In the above embodiment, in conversion from the AF signal y to the distance signal by the CPU 1, determination of the use of equation (3) or (6) is made on the basis of whether the AF signal y is on the far side of the clamp effect presence/absence determination reference level defined by the reference object reflectivity. However, equation (3) or (6) may be selected on the basis of whether the level of the far-side signal $I_2$ is higher than that of the clamp signal $I_c$. In this case, in FIGS. 1 and 3, the CPU 1 receives the output signal from the determination comparator 37 in the clamp circuit 13, selects equation (3) or (6) on the basis of this signal, and converts the AF signal y into the distance signal x. FIGS. 14 and 15 show calculation examples of the distance signal in this case. FIG. 14 is a graph showing the calculation result of the distance signal for the distance L to the object having a reflectivity of 9%. FIG. 15 is a graph showing the calculation result of the distance signal for the distance L to the object having a reflectivity of 90%. FIGS. 14 and 15 are relatively consistent with FIGS. 10A and 12A, respectively, and these distance signals fall within the allowable ranges.

Figure 19A:
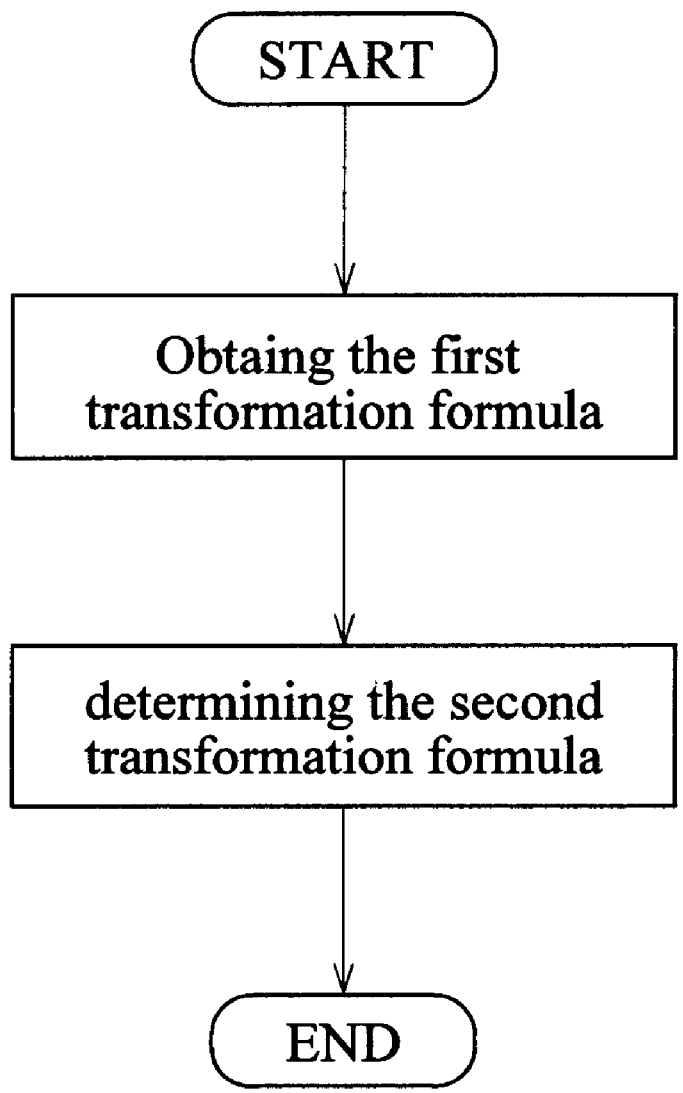
FIG. 19A is a flowchart for explaining a method of adjusting the distance measuring apparatus according to he embodiment.

Since the distance $L_5$ is large (e.g., 10 m or more), the AF signal $y_5$ and the distance signal $x_5$ can hardly be obtained by actual measurement in units of cameras. Therefore, the parameters A3 and B3 are difficult to calculate in accordance with equations (4) and (5), respectively. In this embodiment, the parameters A3 and B3 are obtained in units of cameras in the following manner. FIG. 19A is a flowchart for explaining a method of adjusting the distance measuring apparatus according to the embodiment.

The first method of adjusting the distance measuring apparatus of this embodiment, i.e., the first method of calculating the parameters A2, B2, A3, and B3 will be described next. Since each of the distances $L_2$ and $L_3$ to the object is several m, the AF signals $y_2$ and $y_3$ and the distance signals $x_2$ and $X_3$ can be easily calculated by actual measurement in units of cameras. On the basis of the actual measurement results, the parameters A2 and B2 are calculated in accordance with equations (1) and (2), respectively.

In this case, no measurement is performed at the distance $L_4$. Assuming that the measurement result is linear within the range from the distance $L_2$ to the distance $L_4$, the clamp effect presence/absence determination reference level COUNT_B is obtained by:

$$\text{count\_B} = y_2 - \frac{(y_2 - y_3)(1/(L_2 - L_D) - 1/(L_4 - L_D))}{(1/(L_2 - L_D) - 1/(L_3 - L_D))} \quad (7)$$

where $L_D$ is the distance between the film surface and the principal point of the light-receiving lens, and $L_4$ is the distance at which the clamp effect presence/absence is switched. After this, the parameters A3 and B3 are obtained on the basis of the parameters A2 and B2.

More specifically, average value data B2(avg) of the parameters B2, maximum value data B2(max) of the parameters B2, average value data A3(avg) of the parameters A3, and maximum value data A3(max) of the parameters A3 are measured in advance. The average values of the parameters B2 and A3 are values for a camera which has the average value of each parameter, and the maximum values of the parameters B2 and A3 are values for a camera which has the largest value of each parameter. The parameter A3 is obtained on the basis of these values and the parameter B2 obtained in units of cameras. For example, the parameter A3 is obtained by:

$$A3 = A3(\text{avg})\left[\frac{A3(\text{max})}{A3(\text{avg})}\right] \wedge \left[\frac{B2 - B2(\text{avg})}{B2(\text{max}) - B2(\text{avg})}\right] \quad (8)$$

where symbol $\wedge$ represents the power. In addition, the parameter B3 is obtained by:

$$B3 = x_4 - \text{COUNT\_B} \cdot A3 \quad (9)$$

In this manner, the parameters A3 and B3 can be obtained in units of cameras without calculating the AF signal $y_5$ and the distance signal $x_5$.

Figure 16A:
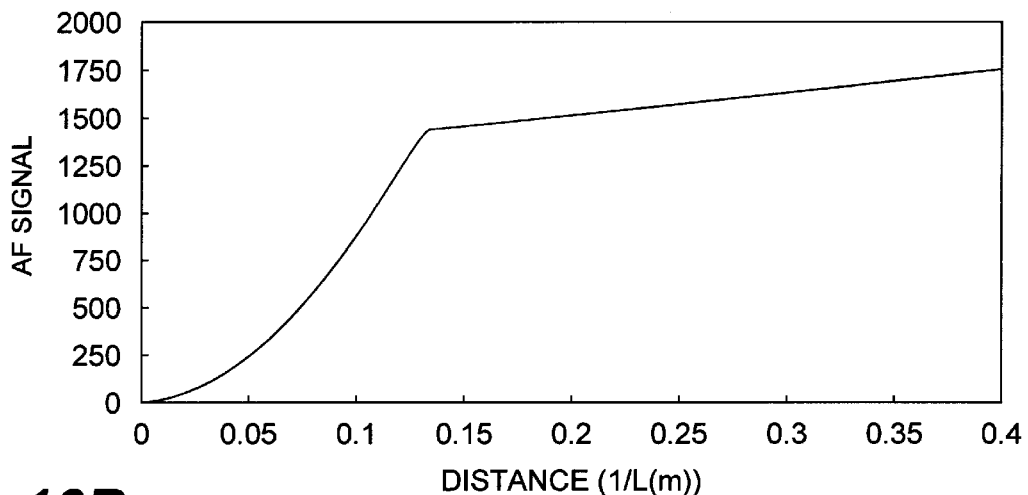
FIGS. 16A to 16C are graphs showing the calculation results of the AF signal and the distance signal for the distance L when a PSD 5 is at a designed position.
Figure 16B:
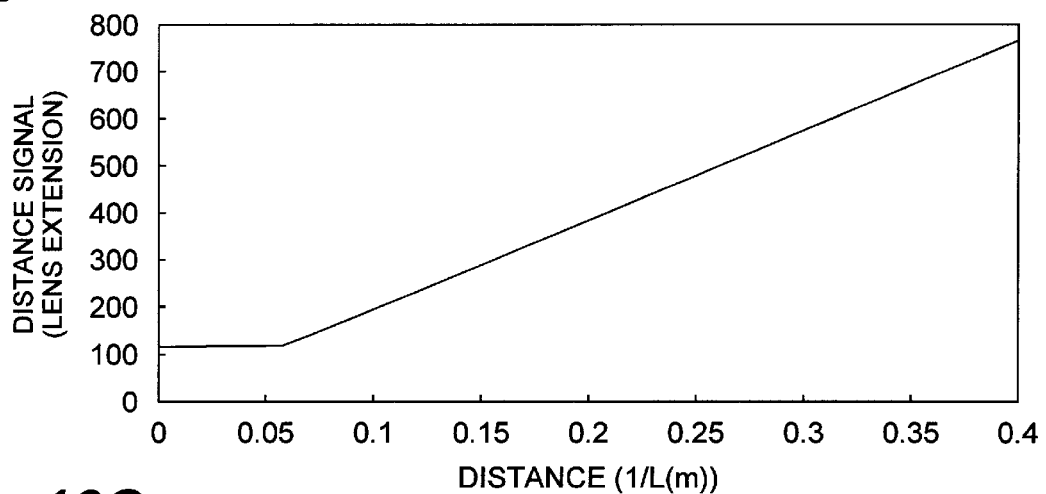
Figure 16C:
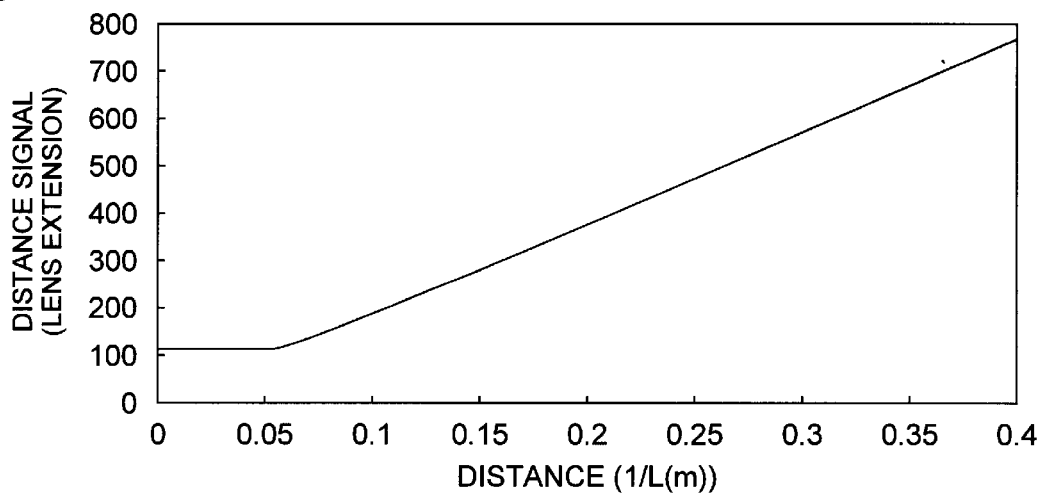
Figure 17A:
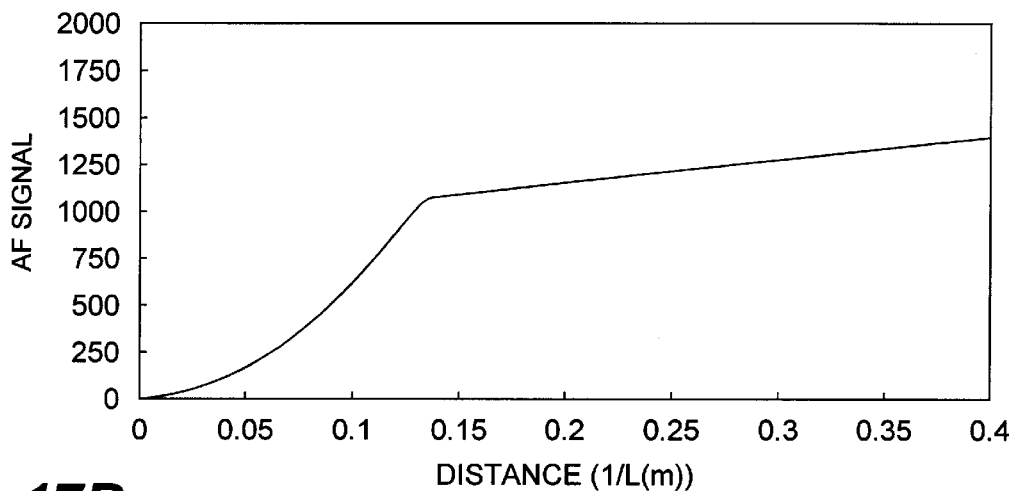
FIGS. 17A to 17C are graphs showing the calculation results of the AF signal and the distance signal for the distance L when the PSD 5 is at a far-side position.
Figure 17B:
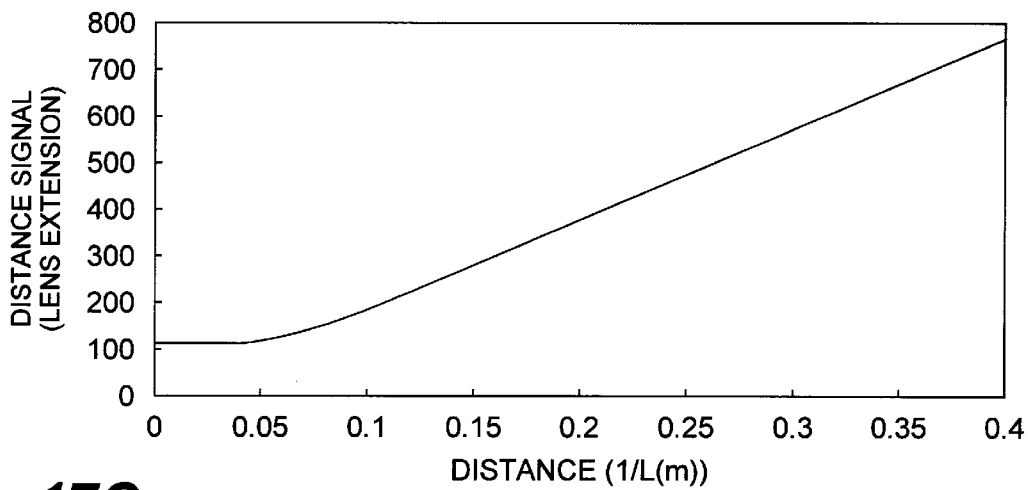
Figure 17C:
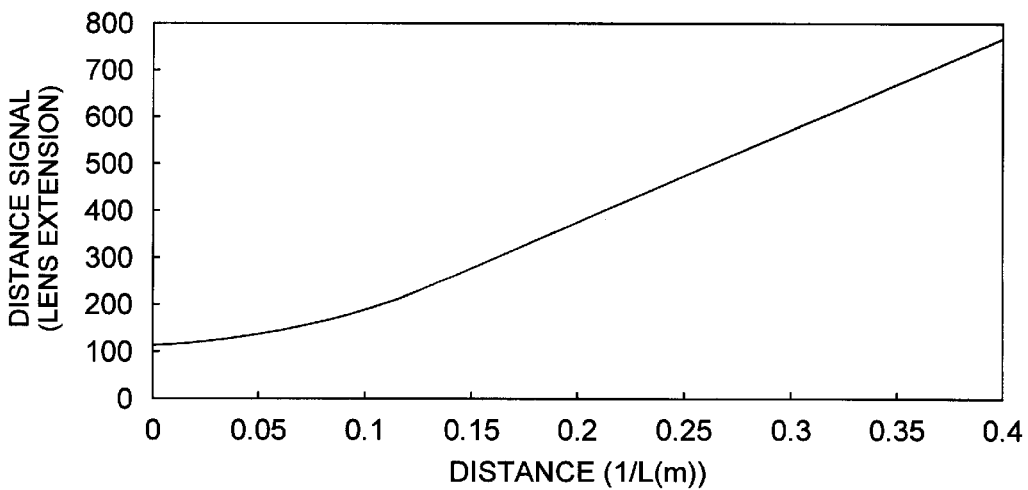
Figure 18A:
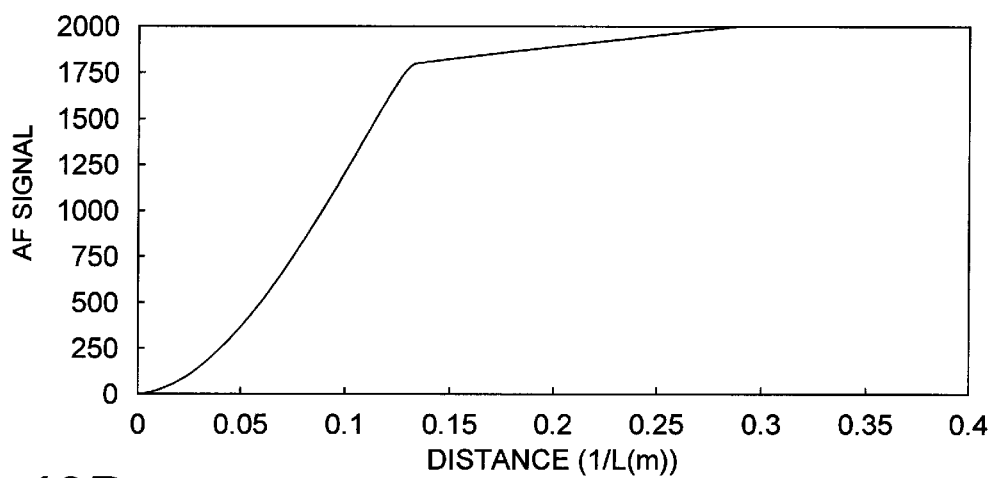
FIGS. 18A to 18C are graphs showing the calculation results of the AF signal and the distance signal for the distance L when the PSD 5 is at a near-side position.
Figure 18B:
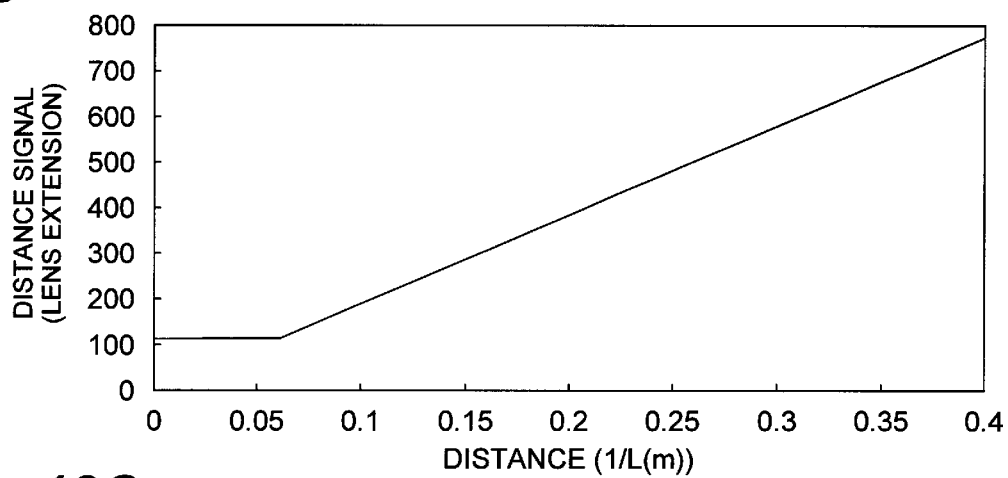
Figure 18C:
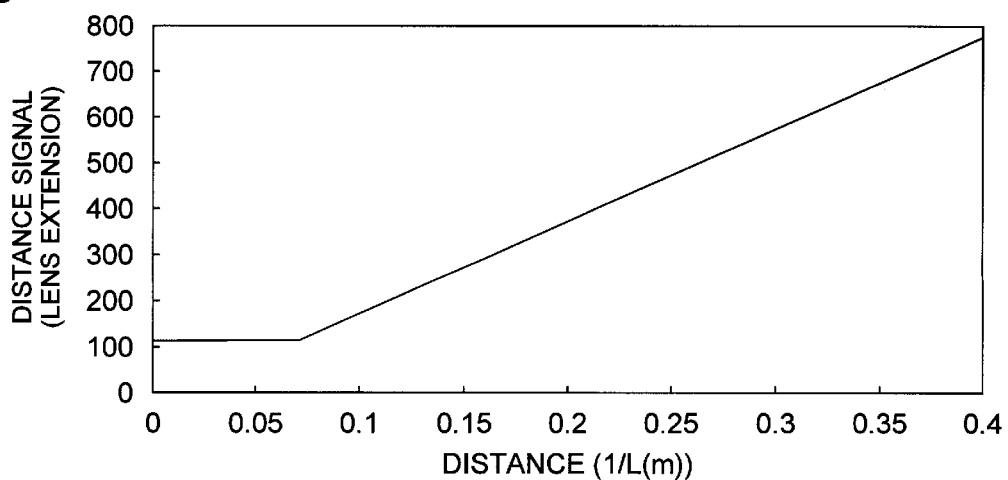

Calculation examples of the AF signal and the distance signal in the first method of adjusting the distance measuring apparatus of this embodiment will be described next. FIGS. 16A to 16C are graphs showing the calculation results of the AF signal and the distance signal for the distance L when the PSD 5 is at the designed position (distance: 0.2225 mm) with respect to the IRED 4. FIGS. 17A to 17C are graphs showing the calculation results of the AF signal and the distance signal for the distance L when the PSD 5 is at a far-side position (distance: 0.3025 mm). FIGS. 18A to 18C are graphs showing the calculation results of the AF signal and the distance signal for the distance L when the PSD 5 is at a near-side position (distance: 0.1425 mm). FIGS. 16A, 17A, and 18A are graphs showing the relationships between the AF signal and the distance L. FIGS. 16B, 17B, and 18B are graphs showing the distance signals converted from the AF signal using the parameters A2, B2, A3, and B3 obtained according to the distance measuring apparatus adjusting method of the present invention. FIGS. 16C, 17C, and 18C are graphs showing the distance signals converted from the AF signal using the parameter A3 fixed at the value when the PSD 5 is at the designed position and the parameter B3 obtained from equation (5).

As shown in these drawings, when the value of the parameter A3 is fixed and the relative positional relationship between the IRED 4 and the PSD 5 varies, as the distance L increases (1/L decreases), the distance signal (FIGS. 16C, 17C, and 18C) becomes large inversely (especially FIG. 17C). However, the distance signal (FIGS. 16B, 17B, and 18B) obtained using the distance measuring apparatus adjusting method of the present invention always becomes small as the distance L increases even when the relative positional relationship between the IRED 4 and the PSD 5 varies, so a satisfactory result can be obtained.

The second method of adjusting the distance measuring apparatus of the present invention will be described next. FIG. 19B is an explanatory view of the second method of adjusting the distance measuring apparatus of this embodiment, i.e., the method of calculating the parameters A3 and B3.

Since each of the distances $L_2$ and $L_3$ to the object is several m, the AF signals y2 and y3 and the distance signals $x_2$ and $x_3$ can be easily obtained by actual measurement in units of cameras. On the basis of the measurement result, the parameters A2 and B2 are obtained in accordance with equations (1) and (2), respectively.

Next, the coefficient of the AF signal is obtained from the difference between the design value and the actual measurement value of the AF signal. More specifically, letting KS2 and KS3 be the design values of the AF signal for the distances $L_2$ and $L_3$, respectively, a gradient coefficient KK is given by:

$$KK = (KS2 - KS3)/(Y_2 - Y_3) \quad (10)$$

A translation coefficient HK is given by:

$$HK = KS2 - y_2 \cdot KK \quad (11)$$

On the basis of an output ratio design value SS2 for the distance $L_2$, an output ratio design value SS3 for the distance $L_3$, and an AF signal design value KSC for a clamp effect actual measurement distance $L_c$, an output ratio SSC for the clamp effect actual measurement distance $L_c$ when the clamp circuit 13 is inactive is obtained by:

$$SSC(\%) = SS2 - \frac{(SS2 - SS3)(KS2 - ((KSC - HK)/HK))}{KS2 - KS3} \quad (12)$$

In addition, an output ratio SDC in the presence of the clamp effect for the clamp effect actual measurement distance $L_c$ when the clamp circuit 13 is active is obtained using an AF signal measurement value $y_c$ for the clamp effect actual measurement distance $L_c$:

$$SDC(\%) = SS2 - \frac{(SS2 - SS3)(KS2 - y_c)}{KS2 - KS3} \quad (13)$$

Let CHNC be the near-side signal $I_1$ output from the PSD 5 for the clamp effect actual measurement distance $L_c$, and CL be the clamp current (this current can have any one of the measurement value and the design value), then $$\text{CHNC}/(\text{CHNC}+\text{CL}) = \text{SDC} \quad (14)$$

From equation (14), equation (15) below representing CHNC can be obtained:

$$\text{CHNC} = \text{CL} \cdot (\text{SDC}/100)/(1-(\text{SDC}/100)) \quad (15)$$

Letting CHFC be the far-side signal $I_2$ output from the PSD 5 for the clamp effect actual measurement distance LC, $$\text{CHNC}/(\text{CHNC}+\text{CHFC}) = \text{SSC} \quad (16)$$

This yields equation (17) below representing CHFC:

$$\text{CHFC} = \text{CHNC}/(\text{SSC}/100) - \text{CHNC} \quad (17)$$

Next, a distance coefficient ND of the input current ratio from the object when the reflectivity is different is obtained in the following manner. When the reflectivity in clamp effect amount actual measurement is different, letting SR be the standard condition reflectivity, and MR be the reflectivity in clamp effect amount actual measurement, the distance coefficient ND is obtained by:

$$\text{ND} = (\text{MR}/\text{SR})^{1/2} \quad (18)$$

Alternatively, when incident light is turned off in clamp effect amount actual measurement, letting DR (%) be the filter lowering rate, the distance coefficient ND is obtained by:

$$\text{ND} = (\text{DR}/100)^{1/2} \quad (19)$$

On the basis of the distance coefficient ND, the adjustment distance $L_5$ is obtained by:

$$L_5 = L_c/\text{ND} \quad (20)$$

Next, on the basis of an AF signal design value KS5 for the adjustment distance $L_5$, an output ratio SS5 without clamp for the adjustment distance $L_5$ is obtained by:

$$SS5(\%) = SS2 - \frac{(SS2 - SS3)(KS2 - ((KS5 - HK)/KK))}{KS2 - KS3} \quad (21)$$

A near-side signal CHN5 for the adjustment distance $L_5$ is obtained by:

$$\text{CHN5} = (SS5/SSC) \cdot \text{CHNC} \quad (22)$$

A far-side signal CHF5 for the adjustment distance $L_5$ is obtained by:

$$\text{CHF5} = (\text{CHN5}/(SS5/100)) - \text{CHN5} \quad (23)$$

An output ratio SD5 with clamp for the adjustment distance $L_5$ is obtained by:

$$SD5(\%) = \text{CHN5}/(\text{CHN5}+\text{CL}) \times 100 \quad (24)$$

The AF signal value y5 with clamp for the adjustment distance $L_5$ is obtained by:

$$y_5 = KS2 - (((KS2-KS3) \cdot (SS2-SD5))/(SS2-SS3)) \quad (25)$$

Assuming that the change in output ratio for each of the distances $L_4$ and $L_5$ is small, only the change in light amount is taken into consideration. From CHF=CL, the distance $L_4$ at which the clamp effect of the clamp circuit 13 is obtained is given by:

$$L_4 = (\text{CHF5}/\text{CL})^{1/2} \cdot L_5 \quad (26)$$

In this case, no measurement is performed at the distance $L_4$. Assuming that the measurement result within the range from the distance $L_2$ to the distance $L_4$ is linear, the clamp effect presence/absence determination reference level COUNT_B is obtained by:

$$\text{COUNT\_B} = y_2 - \frac{(y_2 - y_3)(1/(L_2 - L_D) - 1/(L_4 - L_D))}{1/(L_2 - L_D) - 1/(L_3 - L_D)} \quad (27)$$

where LD is the distance between the film surface and the principal point of the light-receiving lens.

When the distance signal design value at the distance $L_3$ is $x_3$, and the distance signal design value at infinity is 0, an adjustment coefficient A of the distance signal is given by:

$$A = x_3 \cdot (L_3 - L_D) \quad (28)$$

The distance signal design value $x_4$ at the distance $L_4$ at which the clamp effect is obtained is given by:

$$x_4 = A/(L_4 - L_D) \quad (29)$$

The distance signal design value $x_5$ at the adjustment distance $L_5$ is given by:

$$x_5 = A/(L_5 - L_D) \quad (30)$$

On the basis of the above equation, the parameters A3 and B3 are obtained by:

$$A3 = (x_5 - x_4)/(y_5 - \text{COUNT\_B}) \quad (31)$$

and $$B3 = x_4 - \text{COUNT\_B} \cdot A3 \quad (32)$$

By using the transformation formula (equation (6)) using the parameters A3 and B3 which are obtained in the above manner, the AF signal y can be accurately converted into the distance signal x. Therefore, the level of the clamp signal $I_c$ of the clamp circuit 13 can be kept constant. The adjustment time is short, and control can be easily performed without increasing the circuit scale. Within the range of $L \geq L_4$, the clamp effect presence/absence determination reference level COUNT_B, the adjustment distance $L_5$, and the AF signal $y_5$ at the distance $L_4$ are obtained by calculation, and only the AF signal $y_c$ for the distance $L_c$ may be measured, so adjustment can be easily performed in a short time.

Figure 20A:
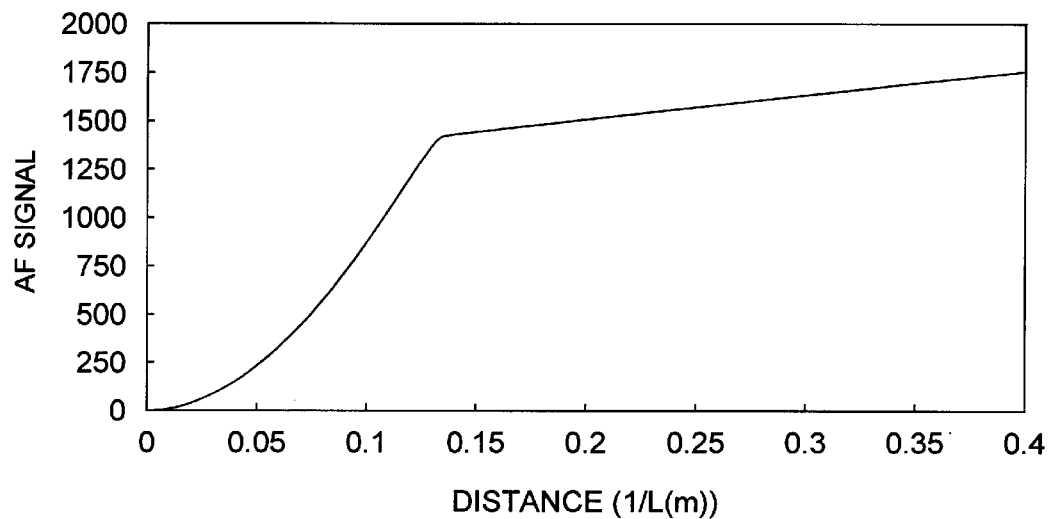
FIGS. 20A and 20B are graphs respectively showing the calculation results of the AF signal and the distance signal for the distance L when the PSD 5 is at a designed position.
Figure 20B:
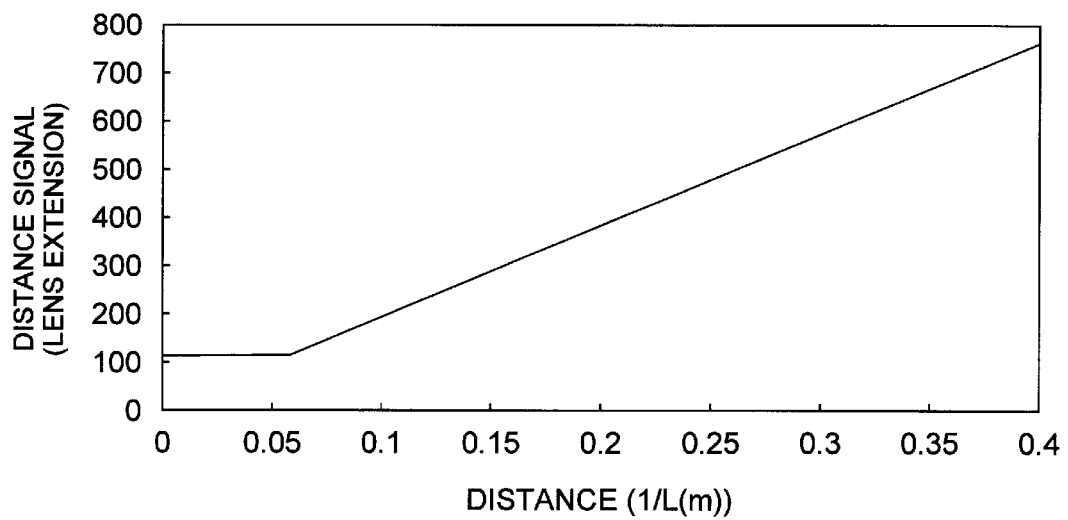
Figure 21A:
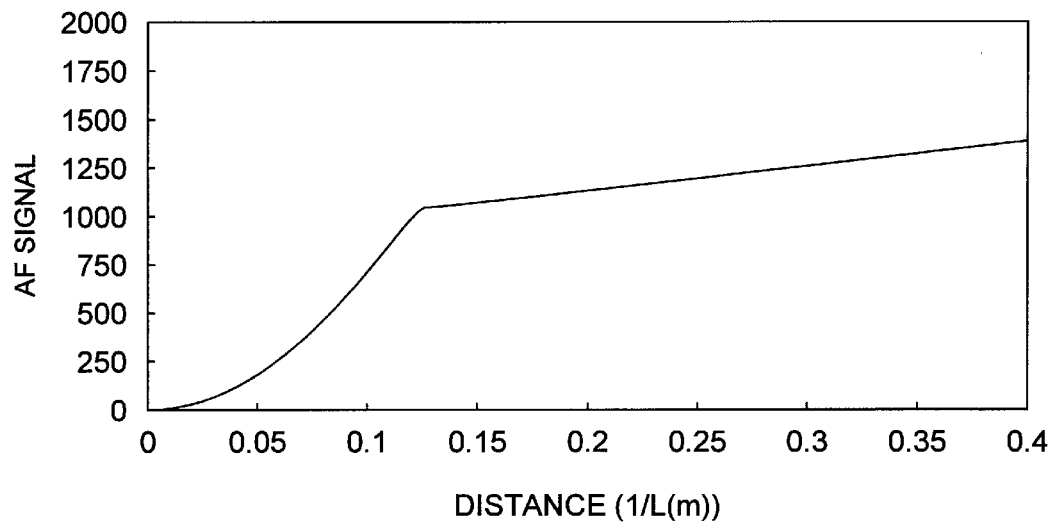
FIGS. 21A and 21B are graphs respectively showing the calculation results of the AF signal and the distance signal for the distance L when the PSD 5 is at a far-side position.
Figure 21B:
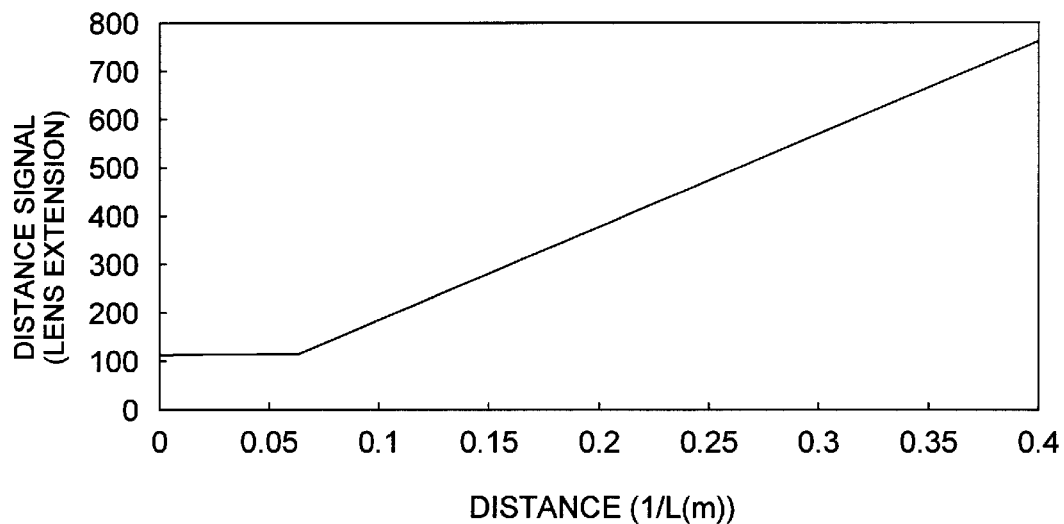
Figure 22A:
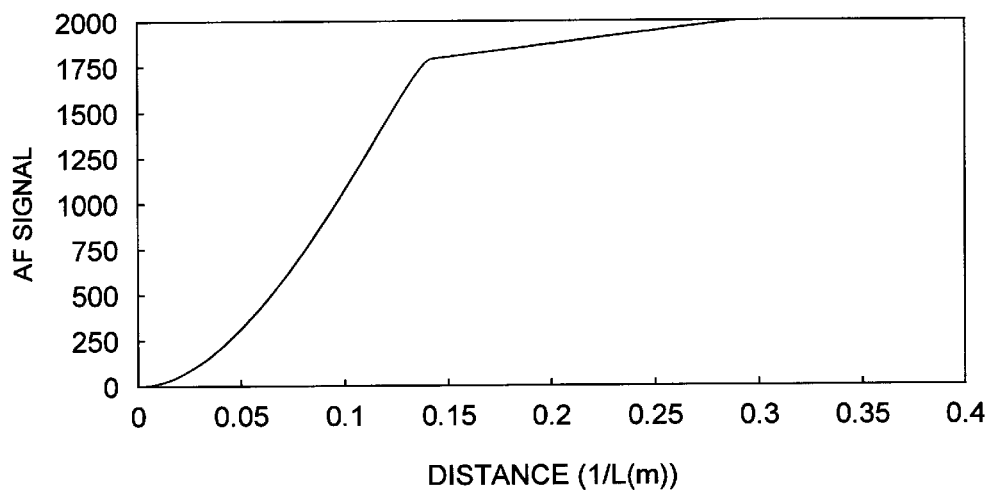
FIGS. 22A and 22B are graphs respectively showing the calculation results of the AF signal and the distance signal for the distance L when the PSD 5 is at a near-side position.
Figure 22B:
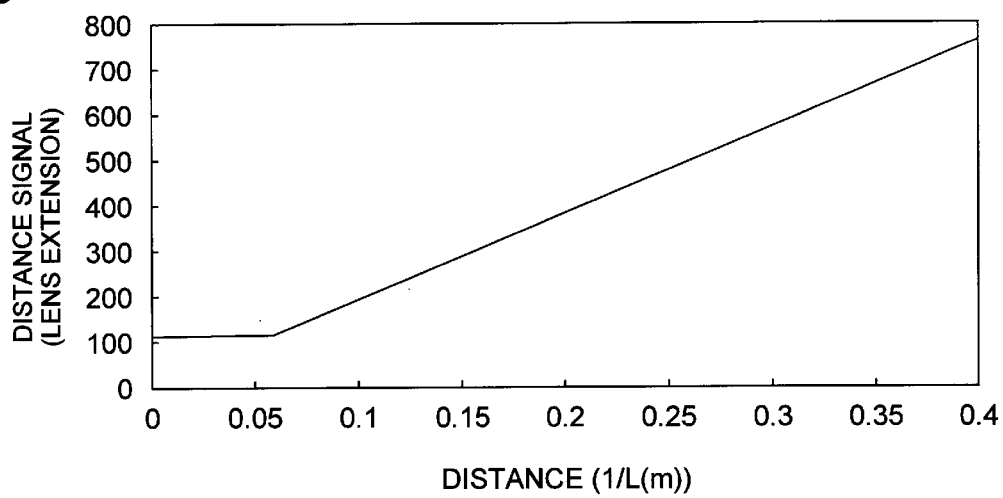

Calculation examples of the AF signal and the distance signal in the second method of adjusting the distance measuring apparatus of this embodiment will be described next. FIGS. 20A, 20B, 21A, 21B, 22A, and 22B show a case wherein the distance between the PSD 5 and the center of the light-receiving lens arranged in front of the PSD 5 varies. FIGS. 20A and 20B are graphs respectively showing the calculation results of the AF signal and the distance signal for the distance L when the PSD 5 is at a designed position. FIGS. 21A and 21B are graphs respectively showing the calculation results of the AF signal and the distance signal for the distance L when the PSD 5 is at a far-side position (distance: 0.3025 mm). FIGS. 22A and 22B are graphs respectively showing the calculation results of the AF signal and the distance signal for the distance L when the PSD 5 is at a near-side position (distance: 0.1425 mm).

Figure 23A:
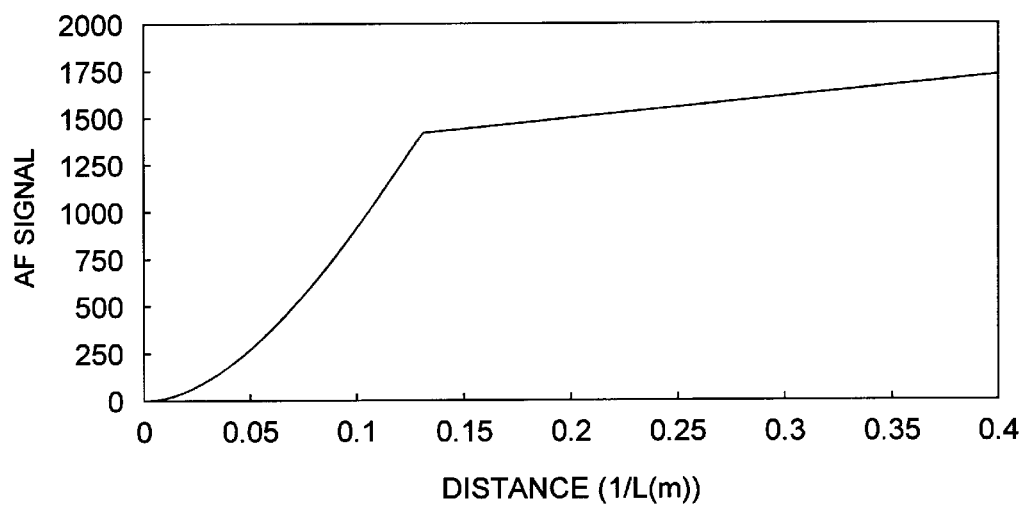
FIGS. 23A and 23B are graphs respectively showing the calculation results of the AF signal and the distance signal for the distance L when the light amount of an IRED 4 has a design value.
Figure 23B:
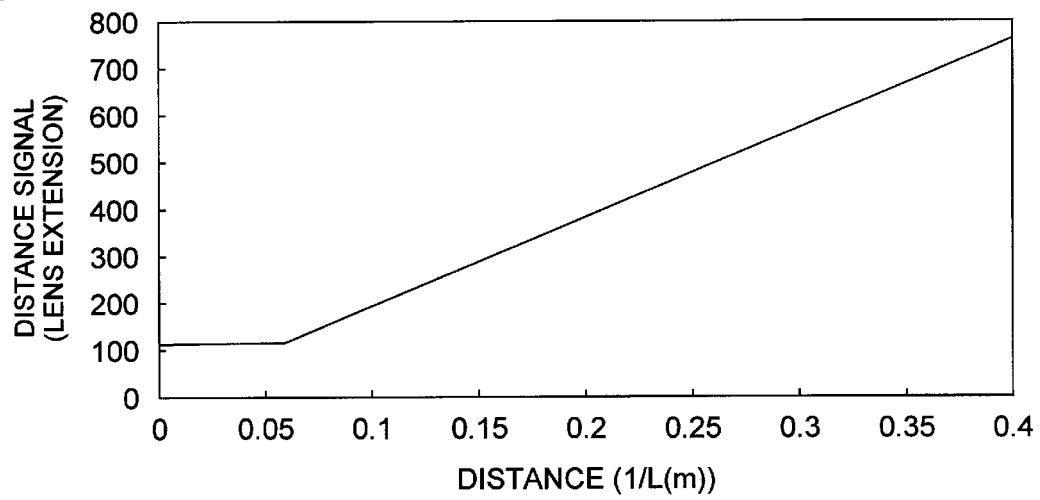
Figure 24A:
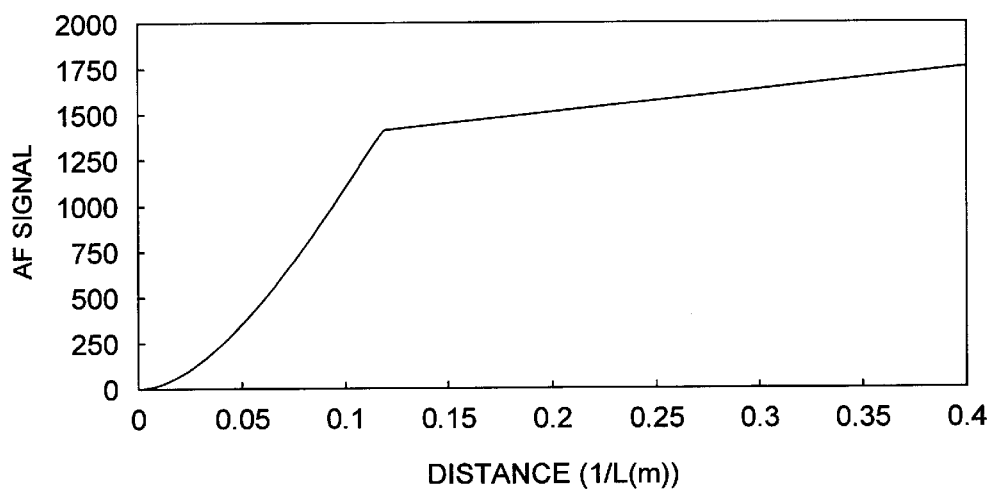
FIGS. 24A and 24B are graphs respectively showing the calculation results of the AF signal and the distance signal for the distance L when the light amount of the IRED 4 has a value larger than the design value.
Figure 24B:
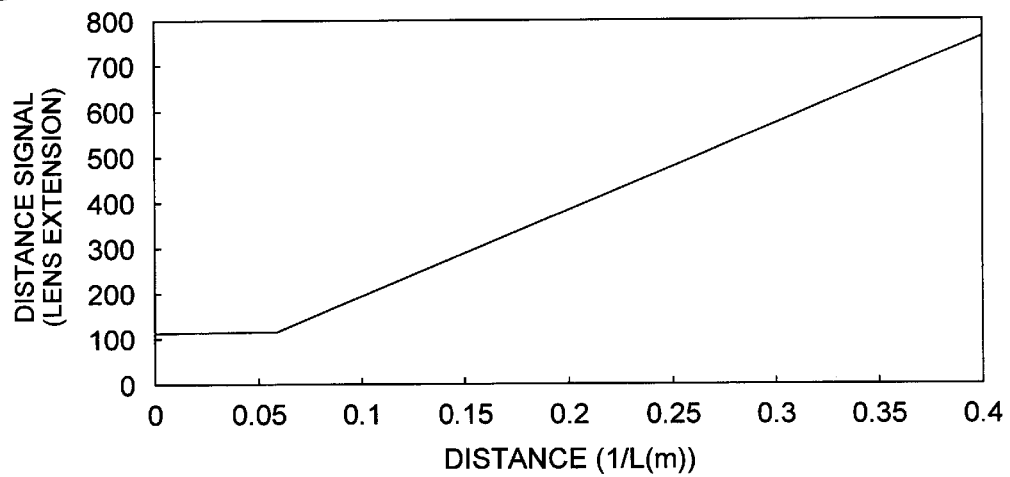
Figure 25A:
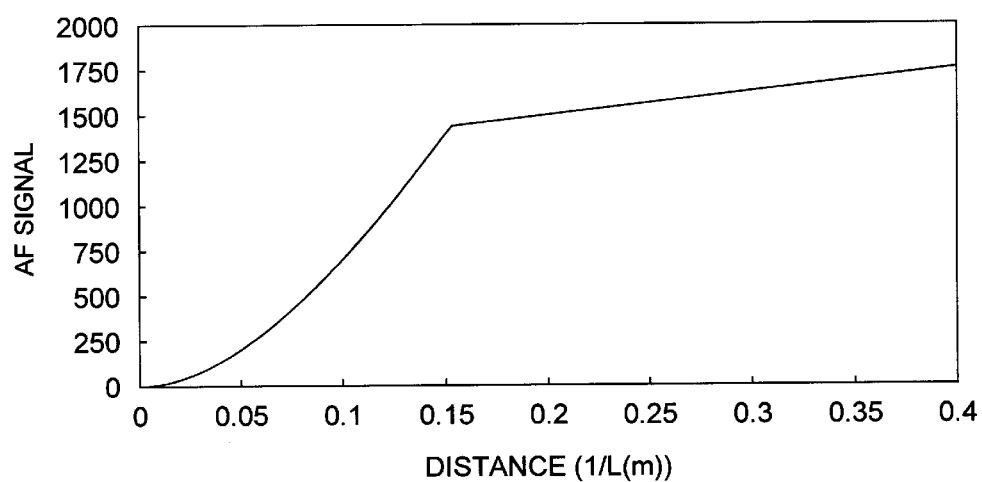
FIGS. 25A and 25B are graphs respectively showing the calculation results of the AF signal and the distance signal for the distance L when the light amount of the IRED 4 has a value smaller than the design value.
Figure 25B:
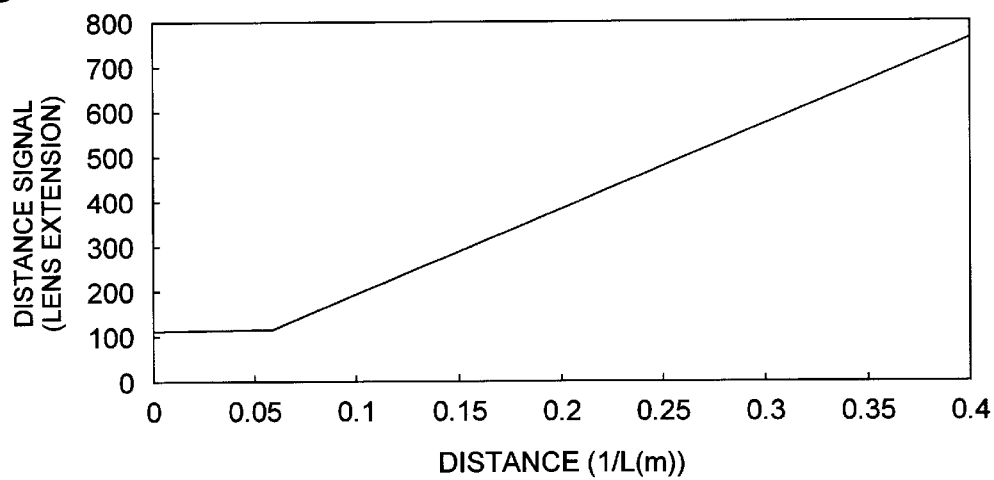

FIGS. 23A, 23B, 24A, 24B, 25A, and 25B show a case wherein the light amount of infrared light output from the IRED 4 varies. FIGS. 23A and 23B are graphs respectively showing the calculation results of the AF signal and the distance signal for the distance L when the light amount of the IRED 4 has a design value (light amount: 1). FIGS. 24A and 24B are graphs respectively showing the calculation results of the AF signal and the distance signal for the distance L when the light amount of the IRED 4 has a value larger than the design value (light amount: 1.25). FIGS. 25A and 25B are graphs respectively showing the calculation results of the AF signal and the distance signal for the distance L when the light amount of the IRED 4 has a value smaller than the design value (light amount: 0.75).

As shown in these drawings, when the method of adjusting the distance measuring apparatus of the present invention is used, the distance signal always becomes small as the distance L increases even when the relative positional relationship between the IRED 4 and the PSD 5 varies, or the light amount of infrared light output from the IRED 4 varies, resulting in a satisfactory result.

Figure 26:
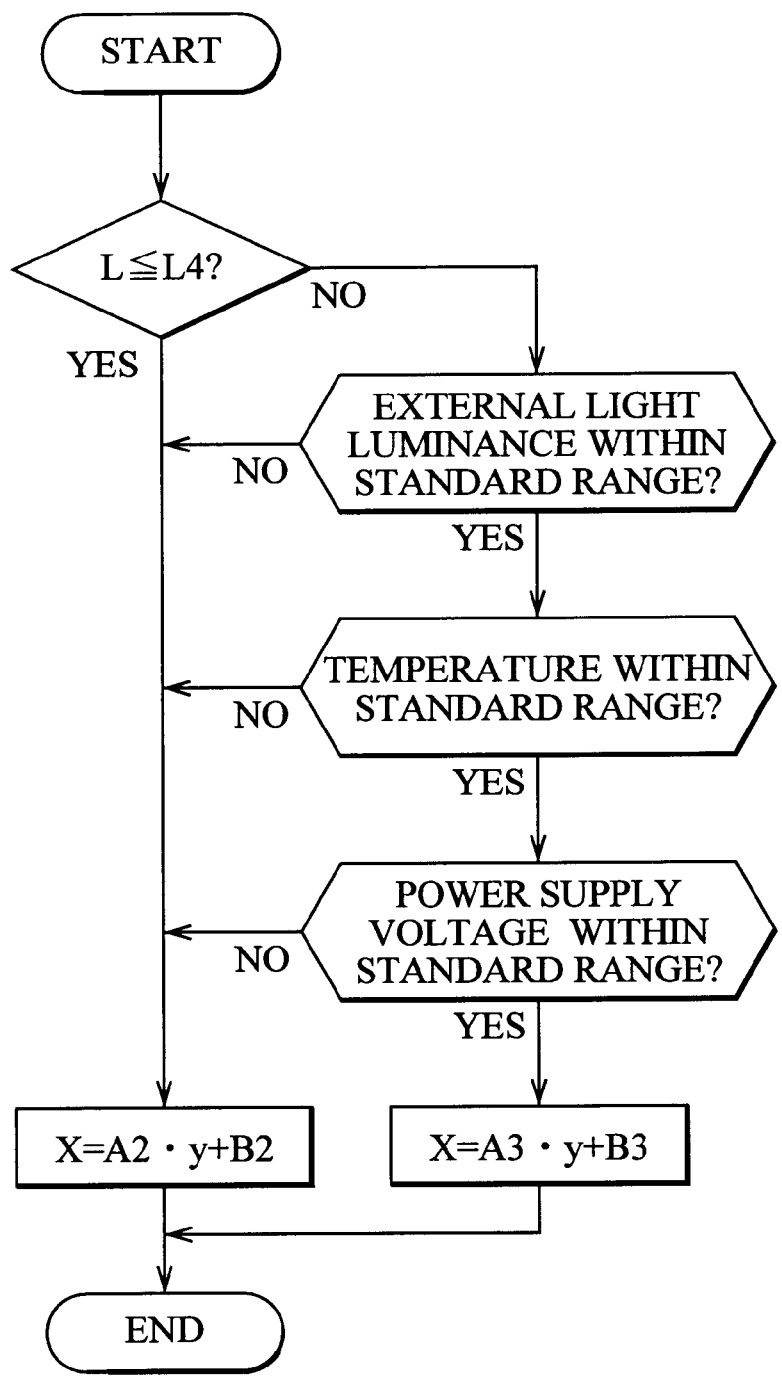
FIG. 26 is a flow chart for explaining calculation of a distance signal.

A distance measuring apparatus according to a second embodiment will be described next. In this embodiment, a distance signal x is obtained from an AF signal y in accordance with the flow chart shown in FIG. 26 using the transformation formula represented by equation (3) within the range of $L \leq L_4$. Within the range of $L > L_4$, the distance signal x is obtained from the AF signal y in accordance with a transformation formula which changes depending on the value of the external light luminance measured by a photometric sensor 71, the value of the temperature measured by a temperature sensor 72, and the value of a power supply voltage input from a driver 3. More specifically, when all of the external light luminance, the temperature, and the power supply voltage fall within the standard ranges, the distance signal x is obtained on the basis of the transformation formula represented by equation (6). When any one of the external light luminance, the temperature, and the power supply voltage falls outside the standard range, the distance signal x is obtained on the basis of the transformation formula represented by equation (3).

Parameters A2 (equation (1)), B2 (equation (2)), A3 (equation (4)), and B3 (equation (5)), and the standard range of each of the external light luminance, the temperature, and the power supply voltage (i.e., the reference for determining selection of equation (3) or (6)) are obtained in the manufacture in units of cameras in which the distance measuring apparatus is to be incorporated and stored in an EEPROM 2 or the like in advance. These parameters are read out by a CPU 1 in distance measurement to calculate equation (3) or (6), so the AF signal y is converted into the distance signal x.

With this arrangement, even when the external light luminance, the temperature, and the power supply voltage vary, the distance can be uniquely determined. At infinity, the distance signal x is set at a predetermined value (e.g., a distance signal value AFINF corresponding to the farthest set point of a photographing lens 8), thereby performing stable focus control of the photographing lens 8.

Calculation examples of the AF signal and the distance signal in the distance measuring apparatus of this embodiment will be described next.

Figure 27:
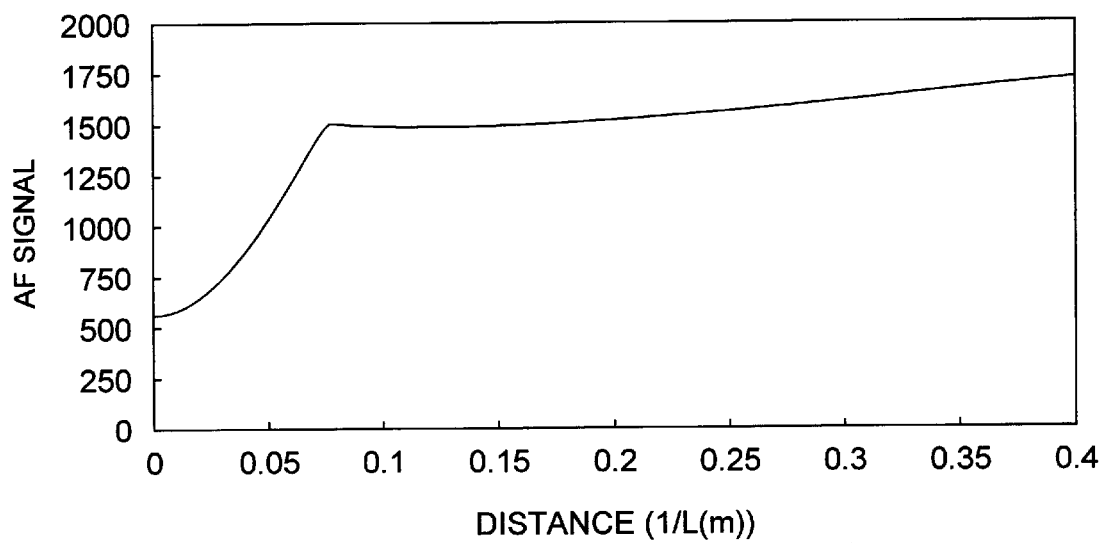
FIG. 27 is a graph showing the calculation result of an AF signal for a distance L to an object to be subjected to distance measurement having a high reflectivity.
Figure 28A:
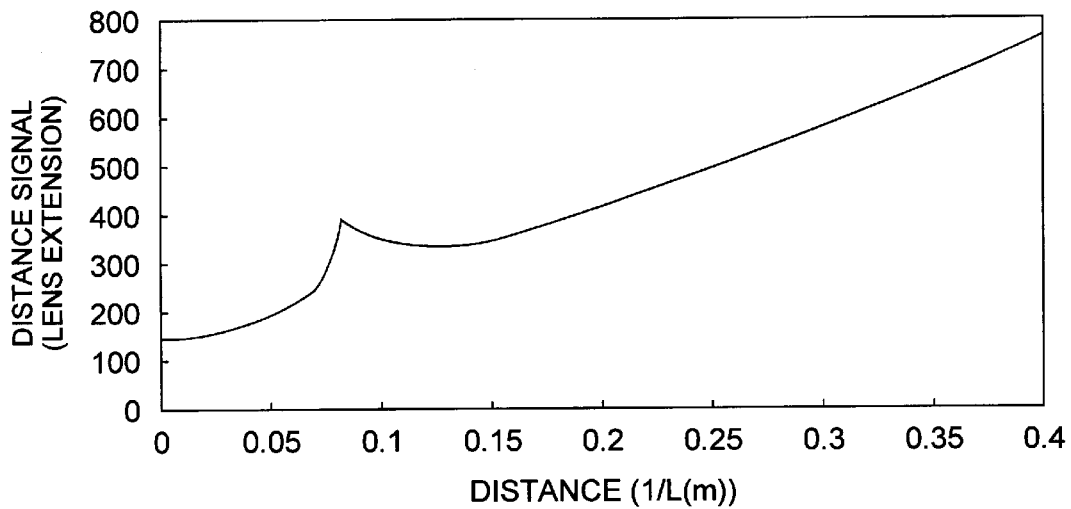
FIGS. 28A and 28B are graphs showing the calculation results of the distance signal for the distance L to the object having a high reflectivity.
Figure 28B:
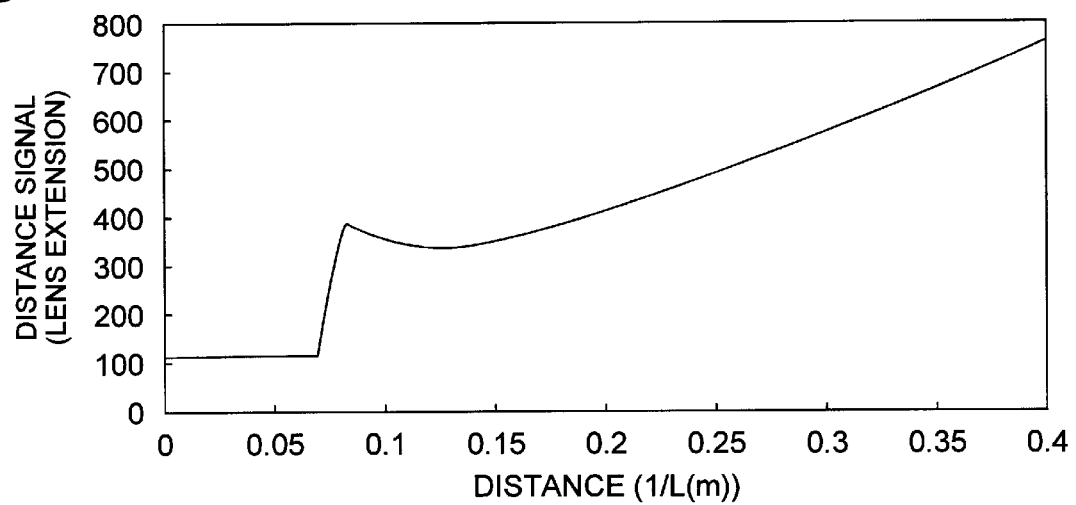

FIGS. 27, 28A, and 28B are graphs showing the calculation results of the AF signal and the distance signal for a distance L to an object to be subjected to distance measurement having a high reflectivity. FIG. 28A shows the result obtained upon converting the AF signal into the distance signal in accordance with the transformation formula represented by equation (6) within the range of $L > L_4$. FIG. 28B shows the result obtained upon converting the AF signal into the distance signal in accordance with the transformation formula represented by equation (3) (i.e., the same transformation formula as that within the range of $L \leq L_4$) within the range of $L > L_4$. In this case, the reflectivity of the object is 90% while the standard reflectivity is 36%, i.e., the external light luminance is high. The level of a clamp signal Ic is 1.5 nA, and an error signal at 0.2 nA is added to each of a near-side signal $I_1$ output from a first signal processing circuit 11 and a far-side signal $I_2$ output from a second signal processing circuit 12.

As shown in these drawings, when the AF signal (FIG. 27) obtained when high-luminance external light is received from the object having a reflectivity of 90% is converted into the distance signal in accordance with the transformation formula represented by equation (6) within the range of $L > L_4$, the distance signal value becomes large for a very large distance L so infinity is not determined (FIG. 28A). To the contrary, when the AF signal (FIG. 27) is converted into the distance signal in accordance with the transformation formula represented by equation (3) even within the range of $L > L_4$, the distance signal has a small constant value AFINF (infinity is determined) for a very large distance L (FIG. 28B).

Figure 29A:
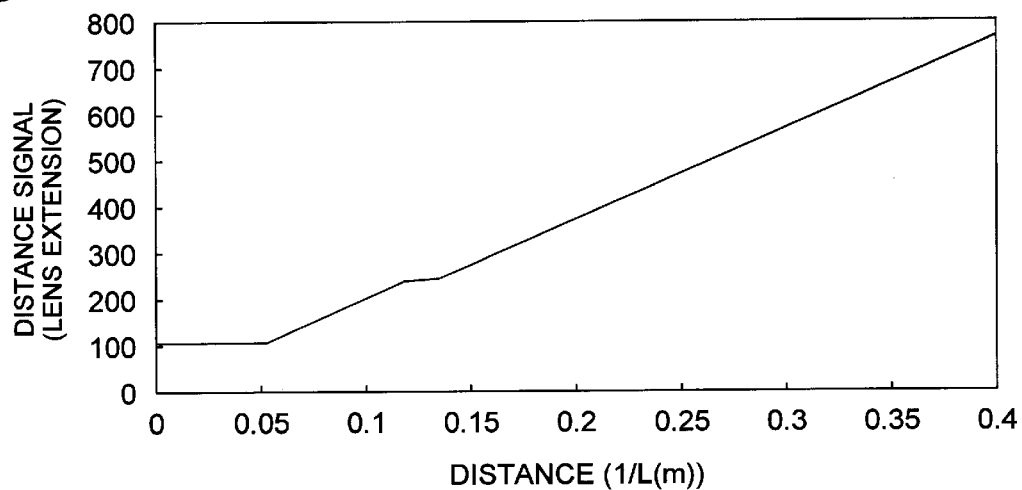
FIGS. 29A and 29B are graphs showing the calculation results of the distance signal for the distance L to the object when the temperature varies.
Figure 29B:
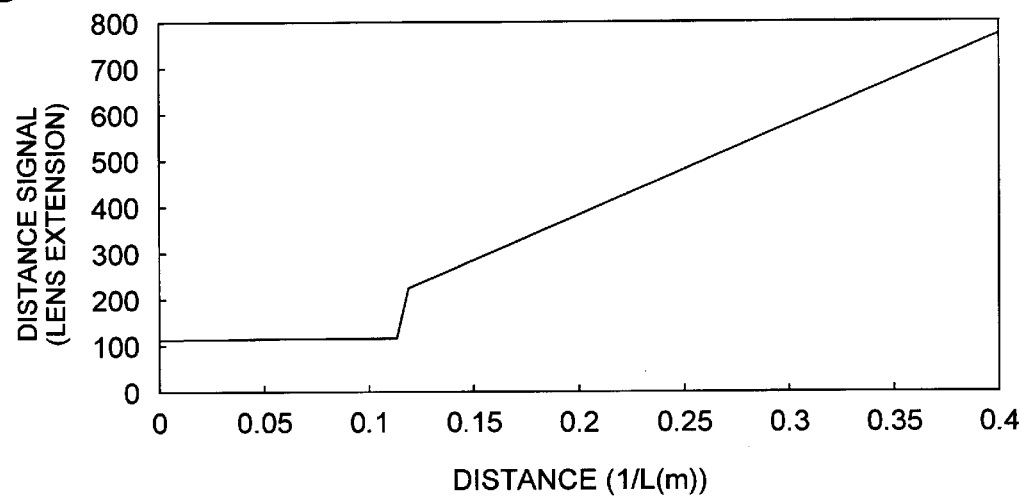

FIGS. 29A and 29B are graphs showing the calculation results of the distance signal for the distance L to the object when the temperature varies. FIG. 29A shows the result obtained upon converting the AF signal into the distance signal in accordance with the transformation formula represented by equation (6) within the range of $L > L_4$. FIG. 29B shows the result obtained upon converting the AF signal into the distance signal in accordance with the transformation formula represented by equation (3) within the range of $L > L_4$. In this case, the temperature is $-10°$ C. while the standard temperature is $20°$ C. The light amount of infrared light emitted by an IRED 4 is 1.25 times, so the level of the clamp signal $I_c$ increases to 1.25 times.

As shown in these drawings, when the AF signal obtained at a temperature lower than the standard temperature by $30°$ C. is converted into the distance signal in accordance with the transformation formula represented by equation (6) within the range of $L > L_4$, the distance signal value becomes large for a very large distance L so infinity is not determined (FIG. 29A). In contrast, when the AF signal is converted into the distance signal in accordance with the transformation formula represented by equation (3) within the range of $L > L_4$, the distance signal has a small constant value (infinity is determined) for a very large distance L (FIG. 29B).

Figure 30A:
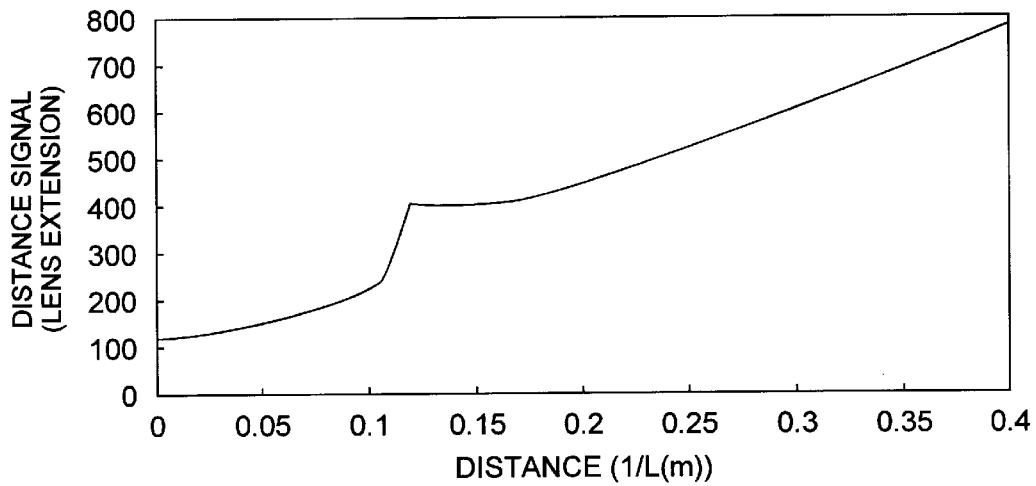
FIGS. 30A and 30B are graphs showing the calculation results of the distance signal for the distance L to the object when the power supply voltage varies.
Figure 30B:
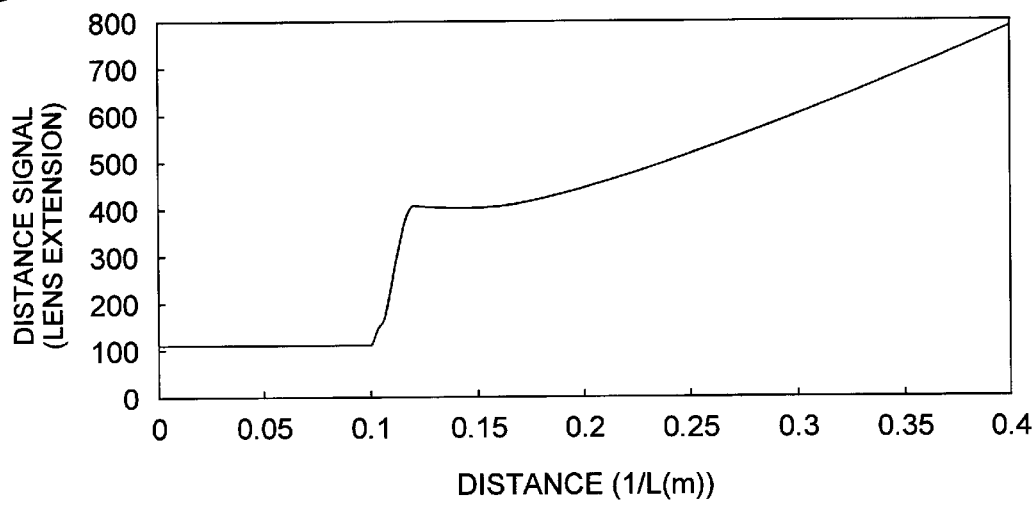

FIGS. 30A and 30B are graphs showing the calculation results of the distance signal for the distance L to the object when the power supply voltage varies. FIG. 30A shows the result obtained upon converting the AF signal into the distance signal in accordance with the transformation formula represented by equation (6) within the range of $L>L_4$. FIG. 30B shows the result obtained upon converting the AF signal into the distance signal in accordance with the transformation formula represented by equation (3) within the range of $L>L_4$. In this case, the voltage is 3.2 V while the standard voltage is 2.85 V. The light amount of infrared light emitted by the IRED 4 is 1.15 times, and the power supply noise is 0.15 nA.

As shown in these drawings, when the AF signal obtained at the voltage higher than the standard voltage by 0.35 V is converted into the distance signal in accordance with the transformation formula represented by equation (6) within the range of $L>L_4$, the distance signal value becomes large for a very large distance L so infinity is not determined (FIG. 30A). To the contrary, when the AF signal is converted into the distance signal in accordance with the transformation formula represented by equation (3) within the range of $L>L_4$, the distance signal has a small constant value (infinity is determined) for a very large distance L (FIG. 30B).

As described above, according to the distance measuring apparatus of this embodiment, even when the external light luminance, the temperature, or the power supply voltage varies, reliable infinity determination is enabled with high long distance measurement accuracy.

In the above embodiment, in conversion from the AF signal y to the distance signal by the CPU 1, determination of the use of equation (3) or (6) is made on the basis of whether the AF signal y is on the far side of the clamp effect presence/absence determination reference level defined by the reference object reflectivity. However, equation (3) or (6) may be selected on the basis of whether the level of the far-side signal $I_2$ is higher than that of the clamp signal $I_c$. In this case, in FIGS. 1 and 3, the CPU 1 receives the output signal from a determination comparator 37 in a clamp circuit 13, selects equation (3) or (6) on the basis of this signal, and converts the AF signal y into the distance signal x.

Figure 31:
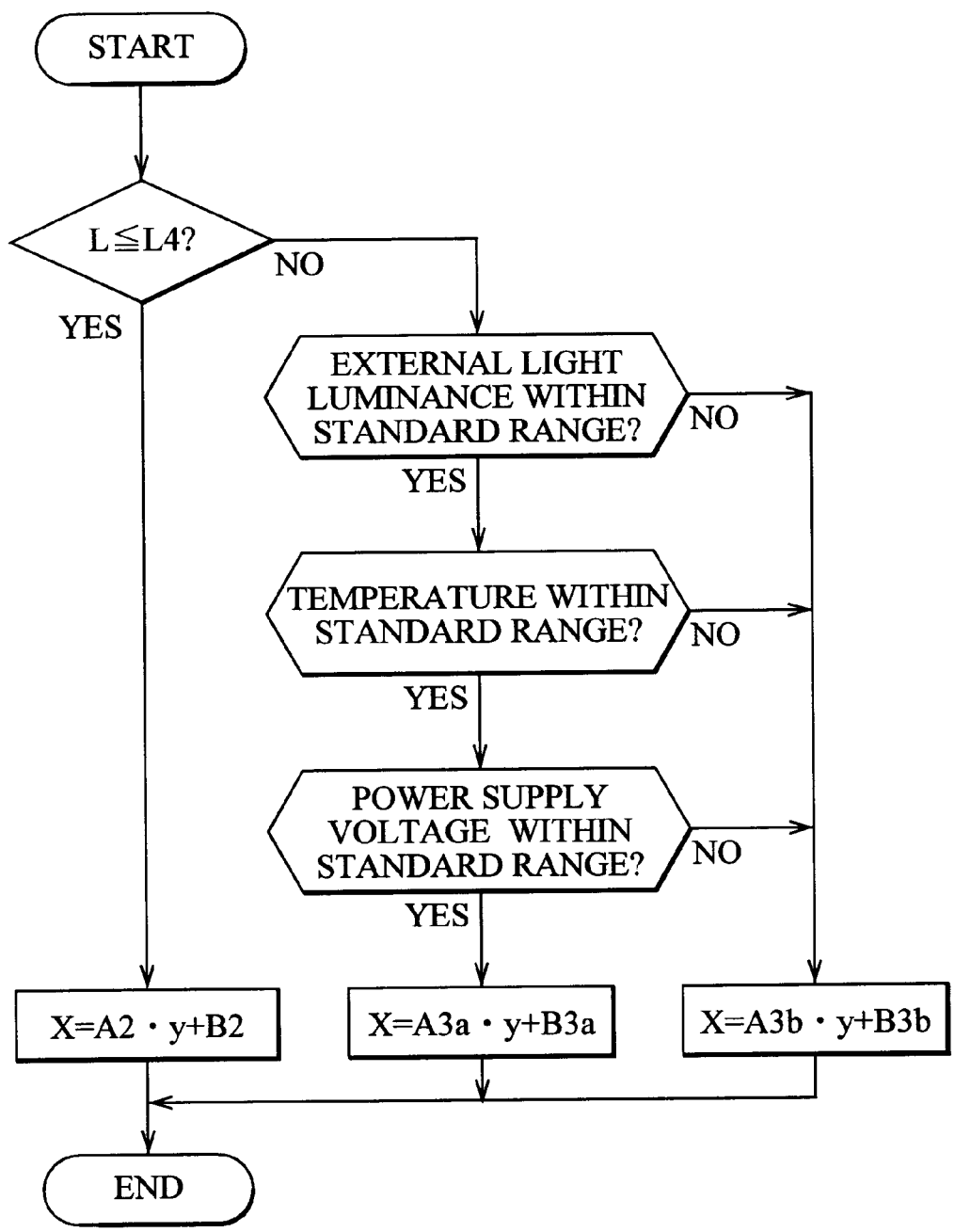
FIG. 31 is a flow chart for explaining calculation of a distance signal.

A distance measuring apparatus according to a third embodiment will be described next. In this embodiment, a distance signal x is obtained from an AF signal y in accordance with the flow chart shown in FIG. 31 using the transformation formula represented by equation (3) within the range of $L \leq L_4$. Within the range of $L>L_4$, the distance signal x is obtained from the AF signal y in accordance with a transformation formula which changes depending on the value of the external light luminance measured by a photometric sensor 71, the value of the temperature measured by a temperature sensor 72, and the value of a power supply voltage input from a driver 3. More specifically, when all of the external light luminance, the temperature, and the power supply voltage fall within the standard ranges, on the basis of parameters:

$$A3a=(x_5-x_4)/(y_5-y_4) \quad (33)$$

$$B3a=x_4-y_4 \cdot A3a \quad (34)$$

the distance signal x is obtained from the AF signal y by the transformation formula:

$$x=A3a \cdot y+B3a \quad (35)$$

When any one of the external light luminance, the temperature, and the power supply voltage falls outside the standard range, the distance signal x is obtained on the basis of the transformation formula:

$$x=A3b \cdot y+B3b \quad (36)$$

Equations (3), (35), and (36) are different from each other.

Parameters A2, B2, A3a, B3a, A3b, and B3b, and the standard range of each of the external light luminance, the temperature, and the power supply voltage (i.e., the reference for determining selection of equation (35) or (36)) are obtained in the manufacture in units of cameras in which the distance measuring apparatus is to be incorporated and stored in an EEPROM 2 or the like in advance. These parameters are read out by a CPU 1 in distance measurement to calculate equation (35) or (36), so the AF signal y is converted into the distance signal x.

With this arrangement, even when the external light luminance, the temperature, and the power supply voltage vary, the distance can be uniquely determined. In addition, when the AF signal y has a predetermined value (e.g., an AF signal value INFDATA corresponding to the farthest set point of a photographing lens 8) or less, the distance signal x is set at a predetermined value (e.g., a distance signal value AFINF corresponding to the farthest set point of the photographing lens 8), thereby attaining stable focus control of the photographing lens 8.

Calculation examples of the AF signal and the distance signal in the distance measuring apparatus of this embodiment will be described next.

Figure 32:
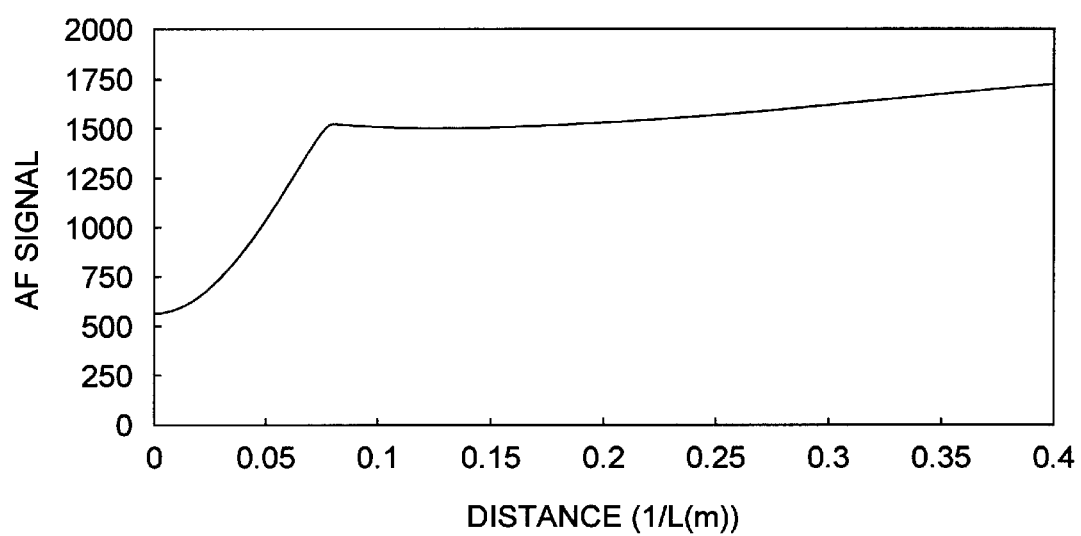
FIG. 32 is a graph showing the calculation result of an AF signal for a distance L to an object to be subjected to distance measurement having a high reflectivity.
Figure 33A:
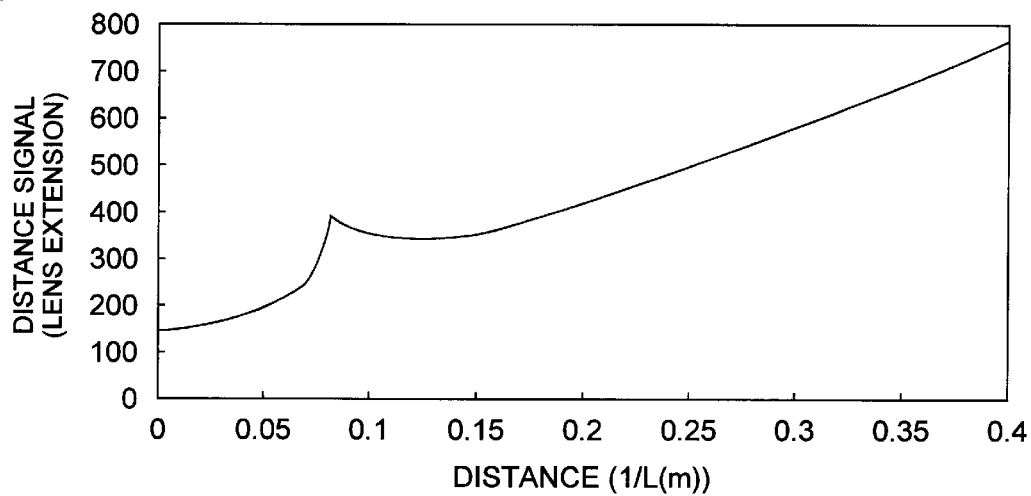
FIGS. 33A and 33B are graphs showing the calculation results of a distance signal for the distance L to the object having a high reflectivity.
Figure 33B:
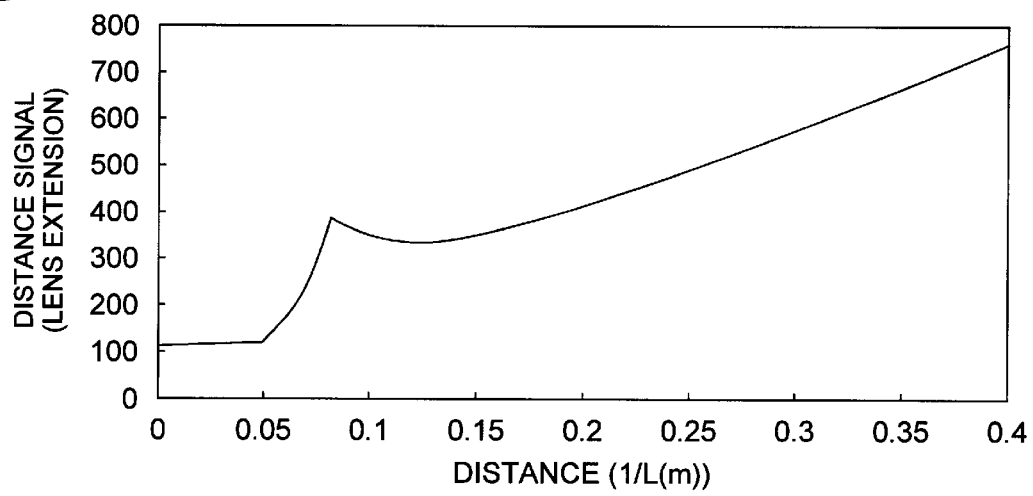

FIGS. 32, 33A, and 33B are graphs showing the calculation results of the AF signal and the distance signal for a distance L to an object to be subjected to distance measurement having a high reflectivity. FIG. 33A shows the result obtained upon converting the AF signal into the distance signal in accordance with the transformation formula represented by equation (35) (A3a=0.122379, B3a=76.6, INFDATA=305.608) within the range of $L>L_4$. FIG. 33B shows the result obtained upon converting the AF signal into the distance signal in accordance with the transformation formula represented by equation (36) (A3b=0.301245, B3b=−182.7, INFDATA=984.9126) within the range of $L>L_4$. In this case, the reflectivity of the object is 90% while the standard reflectivity is 36%, i.e., the external light luminance is high. The level of a clamp signal $I_c$ is 1.5 nA, and an error signal at 0.2 nA is added to each of a near-side signal $I_1$ output from a first signal processing circuit 11 and a far-side signal $I_2$ output from a second signal processing circuit 12.

As shown in these drawings, when the AF signal (FIG. 32) obtained when high-luminance external light comes from the object having a reflectivity of 90% is converted into the distance signal in accordance with the transformation formula represented by equation (35) within the range of $L>L_4$, the distance signal value becomes large for a very large distance L so infinity is not determined (FIG. 33A). To the contrary, when the AF signal (FIG. 32) is converted into the distance signal in accordance with the transformation formula represented by equation (36) even within the range of $L>L_4$, the distance signal has a small constant value AFINF (infinity is determined) for a very large distance L (FIG. 33B).

Figure 34A:
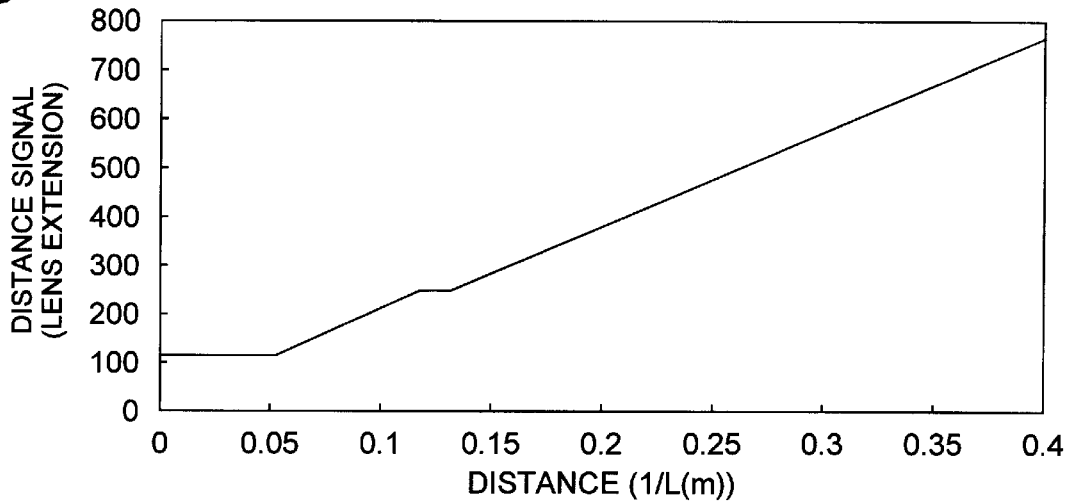
FIGS. 34A to 34C are graphs showing the calculation results of the distance signal for the distance L to the object when the temperature varies.
Figure 34B:
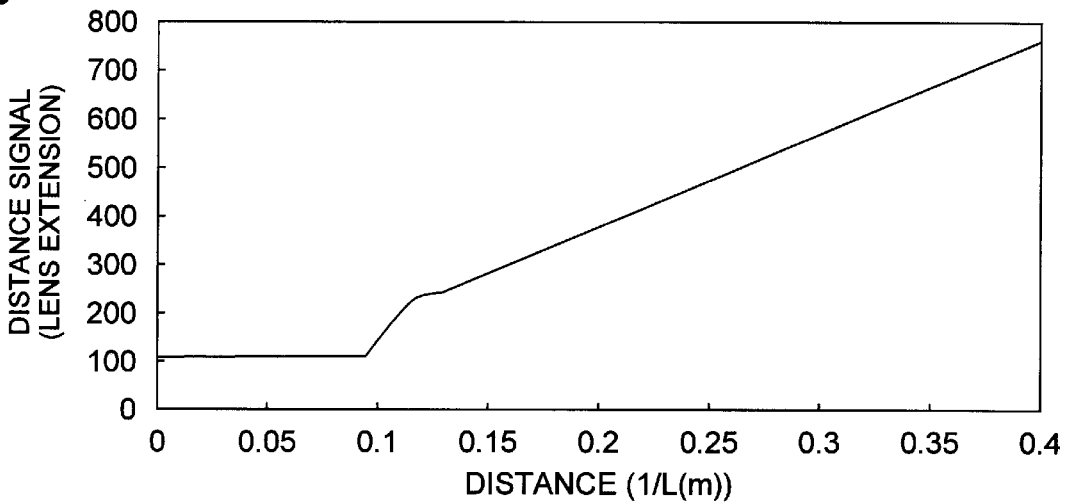
Figure 34C:
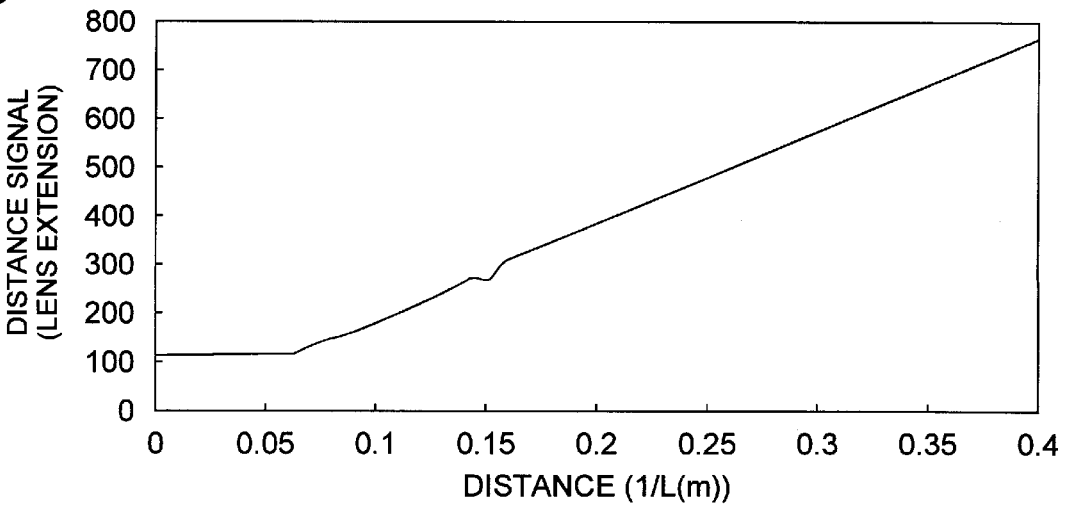

FIGS. 34A to 34C are graphs showing the calculation results of the distance signal for the distance L to the object when the temperature varies. In FIGS. 34A and 34B, the temperature is −10° C. while the standard temperature is 20° C., and the light amount of infrared light emitted by an IRED 4 is 1.25 times, so the level of the clamp signal $I_c$ increases to 1.25 times. FIG. 34A shows the result obtained upon converting the AF signal into the distance signal in accordance with the transformation formula represented by equation (35) (A3a=0.122379, B3a=76.6, INFDATA=305.608) within the range of $L>L_4$. FIG. 34B shows the result obtained upon converting the AF signal into the distance signal in accordance with the transformation formula represented by equation (36) (A3b=0.301245, B3b=−182.7, INFDATA=984.9126) within the range of L>L$_4$. As shown in these drawings, when the AF signal obtained at a temperature lower than the standard temperature by 30° C. is converted into the distance signal in accordance with the transformation formula represented by equation (35) within the range of L>L$_4$, the distance signal value becomes large for a very large distance L so infinity is not determined (FIG. 34A). To the contrary, when the AF signal is converted into the distance signal in accordance with the transformation formula represented by equation (36) within the range of L>L$_4$, the distance signal has a small constant value (infinity is determined) for a very large distance L (FIG. 34B).

In FIG. 34C, the temperature is 50° C. while the standard temperature is 20° C., and the light amount of infrared light emitted by the IRED 4 is 0.75 times, so the level of the clamp signal I$_c$ decreases to 0.75 times. FIG. 34C shows the result obtained upon converting the AF signal into the distance signal in accordance with the transformation formula represented by equation (36) (A3b=0.142, B3b=80, INFDATA=305.608) within the range of L>L$_4$. As shown in FIG. 34C, when the AF signal obtained at a temperature higher than the standard temperature by 30° C. is converted into the distance signal in accordance with the transformation formula represented by equation (36), the distance signal has a small constant value for a very large distance L.

Figure 35A:
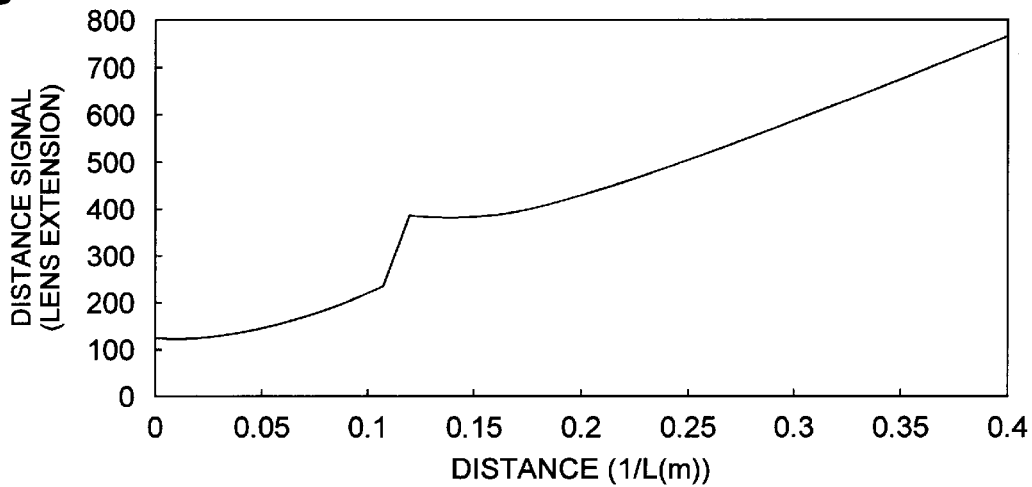
FIGS. 35A to 35C are graphs showing the calculation results of the distance signal for the distance L to the object when the power supply voltage varies.
Figure 35B:
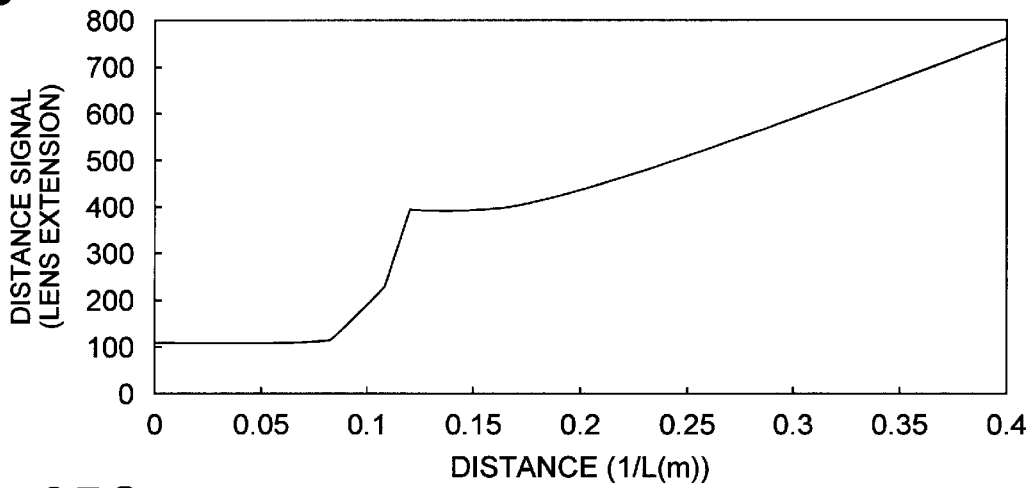
Figure 35C:
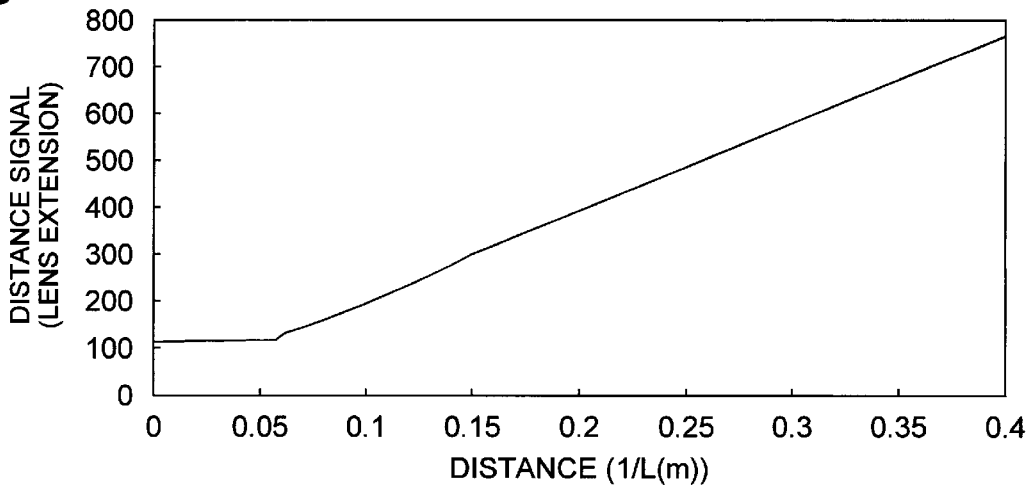

FIGS. 35A to 35C are graphs showing the calculation results of the distance signal for the distance L to the object when the power supply voltage varies. In FIGS. 35A and 35B, the voltage is 3.2 V while the standard voltage is 2.85 V, the light amount of infrared light emitted by the IRED 4 is 1.15 times, and the power supply noise is 0.15 nA. FIG. 35A shows the result obtained upon converting the AF signal into the distance signal in accordance with the transformation formula represented by equation (35) (A3a=0.122379, B3a=76.6, INFDATA=305.608) within the range of L>L$_4$. FIG. 35B shows the result obtained upon converting the AF signal into the distance signal in accordance with the transformation formula represented by equation (36) (A3b=0.301245, B3b=−182.7, INFDATA=984.9126) within the range of L>L$_4$. As shown in these drawings, when the AF signal obtained at a voltage higher than the standard voltage by 0.35 V is converted into the distance signal in accordance with the transformation formula represented by equation (35) within the range of L>L$_4$, the distance signal value becomes large for a very large distance L (FIG. 35A). To the contrary, when the AF signal is converted into the distance signal in accordance with the transformation formula represented by equation (36) within the range of L>L$_4$, the distance signal has a small constant value (infinity is determined) for a very large distance L (FIG. 35B).

In FIG. 35C, the voltage is 2.45 V while the standard voltage is 2.85 V, the light amount of infrared light emitted by the IRED 4 is 0.85 times, and the power supply noise decreases to 0.01 nA. FIG. 35C shows the result obtained upon converting the AF signal into the distance signal in accordance with the transformation formula represented by equation (36) (A3b=0.135217, B3b=84.6, INFDATA=305.608) within the range of L>L$_4$. As shown in FIG. 35C, when the AF signal obtained at a voltage lower than the standard voltage by 0.40 V is converted into the distance signal in accordance with the transformation formula represented by equation (36), the distance signal has a small constant value for a very large distance L.

As described above, according to the distance measuring apparatus of this embodiment, even when the external light luminance, the temperature, or the power supply voltage varies, reliable infinity determination is enabled with high long distance measurement accuracy.

In the above embodiment, in conversion from the AF signal y to the distance signal by the CPU 1, determination of the use of equation (3) or (35) (or (36)) is made on the basis of whether the AF signal y is on the far side of the clamp effect presence/absence determination reference level defined by the reference object reflectivity. However, equation (3) or (35) (or (36)) may be selected on the basis of whether the level of the far-side signal I$_2$ is higher than that of the clamp signal I$_c$. In this case, in FIGS. 1 and 3, the CPU 1 receives the output signal from a determination comparator 37 in a clamp circuit 13, selects equation (3) or (35) (or (36)) on the basis of this signal, and converts the AF signal y into the distance signal x.

Three or more transformation formulas may be switched depending on the values of the external light luminance, the temperature, and the power supply voltage.

A distance measuring apparatus according to still another embodiment will be described next. In this embodiment, when an AF signal y is a predetermined value (e.g., an AF signal value INFDATA corresponding to the farthest set point of a photographing lens 8) or less, a distance signal x is set at a predetermined value (e.g., a distance signal value AFINF corresponding to the farthest set point of the photographing lens 8), thereby stably focus-controlling the photographing lens 8. More specifically, equation (6) becomes:

$$X = \begin{cases} A3 \cdot y + B3 & (y > INFDATA) \\ AFINF & (y \le INFDATA) \end{cases} \quad (37)$$

In addition, the value INFDATA is switched in accordance with the value of the external light luminance, the temperature, or the power supply voltage. If the value of the AF signal y is equal to or smaller than the value INFDATA, the value of the distance signal x is preferably fixed at the predetermined value AFINF and stabilized.

Within the range of L>L$_4$, the distance signal x is obtained from the AF signal y in accordance with the transformation formula represented by equation (37) which has the value INFDATA depending on the value of the external light luminance measured by a photometric sensor 71, the value of the temperature measured by a temperature sensor 72, or the value of a power supply voltage input from a driver 3. For example, the value INFDATA (to be referred to as a value INFDATA_a hereinafter) when all of the external light luminance, the temperature, and the power supply voltage fall within the standard ranges is different from the value INFDATA (to be referred to as a value INFDATA_b hereinafter) when any one of the external light luminance, the temperature, and the power supply voltage falls outside the standard range.

Parameters A2 (equation (1)), B2 (equation (2)), A3 (equation (4)), B3 (equation (5)), the values INFDATA_a and INFDATA_b, and the standard range of each of the external light luminance, the temperature, and the power supply voltage (i.e., the reference for determining selection of one of the values INFDATA) are obtained in the manufacture in units of cameras in which the distance measuring apparatus is to be incorporated and stored in an EEPROM 2 or the like in advance. These parameters are read out by a CPU 1 in distance measurement to calculate equation (3) or (37), so the AF signal y is converted into the distance signal x. With this arrangement, even when the external light luminance, the temperature, and the power supply voltage vary, the distance can be uniquely determined.

Calculation examples of the AF signal and the distance signal in the distance measuring apparatus of this embodiment will be described next.

Figure 36:
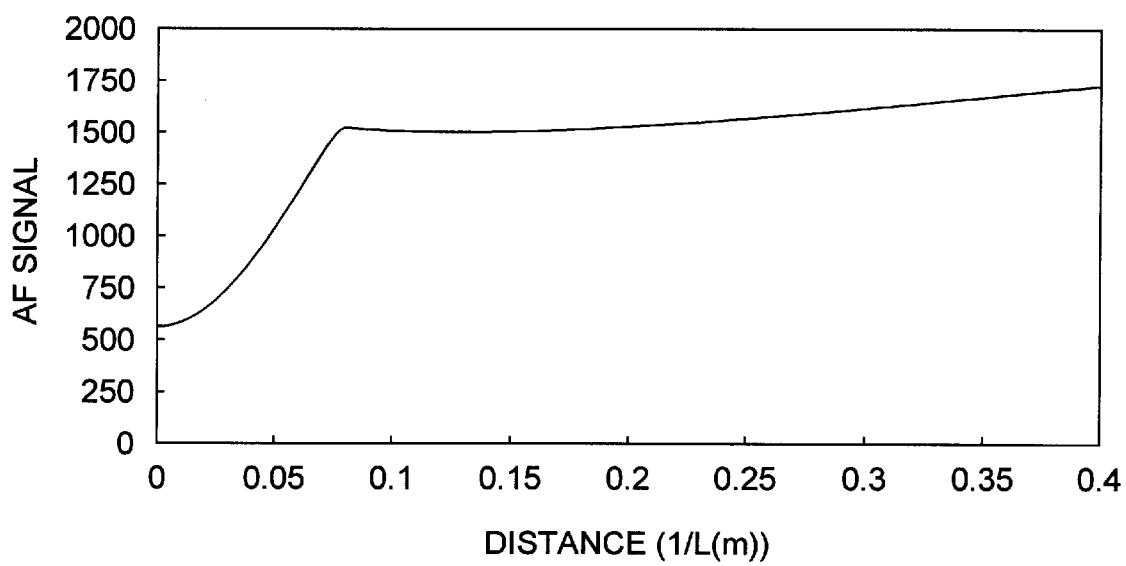
FIG. 36 is a graph showing the calculation result of an AF signal for a distance L to an object to be subjected to distance measurement having a high reflectivity.
Figure 37A:
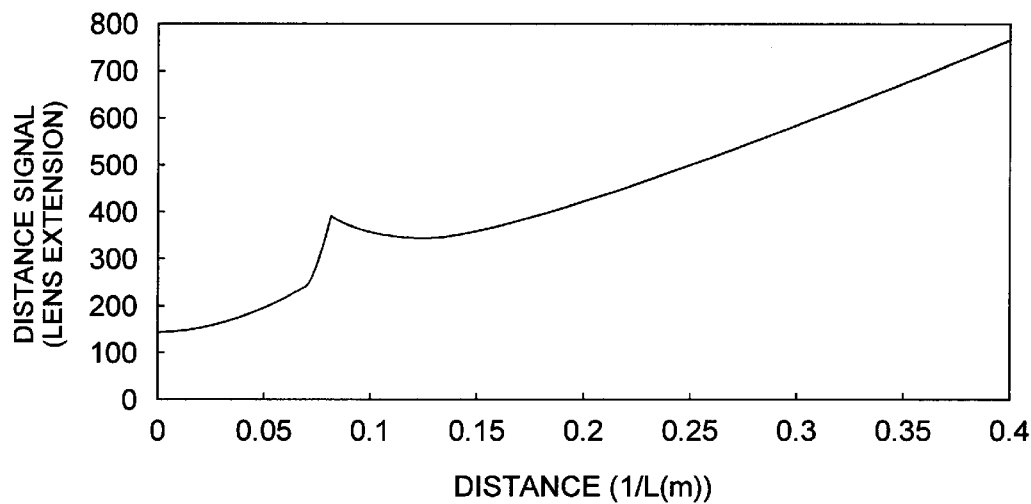
FIGS. 37A and 37B are graphs showing the calculation results of a distance signal for the distance L to the object having a high reflectivity.
Figure 37B:
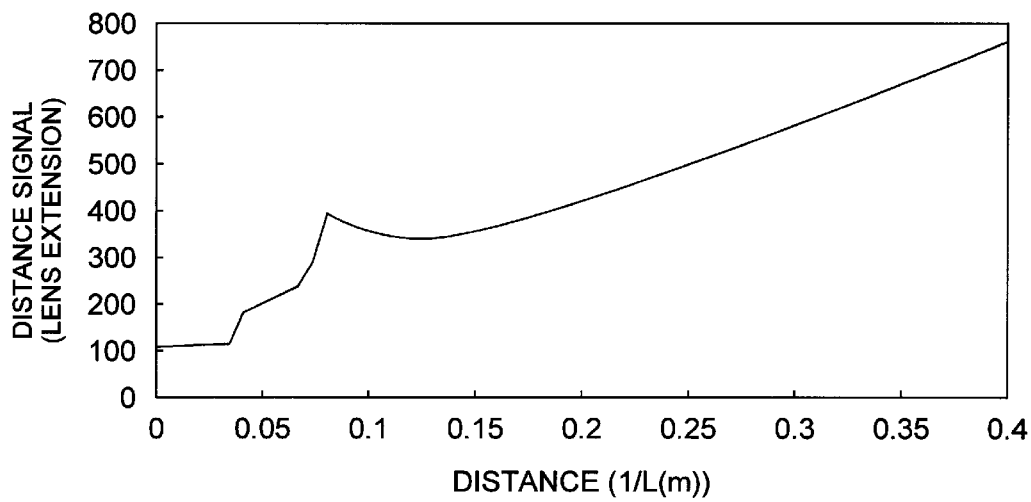

FIGS. 36, 37A, and 37B are graphs showing the calculation results of the AF signal and the distance signal for a distance L to an object to be subjected to distance measurement having a high reflectivity. FIG. 37A shows the result obtained upon converting the AF signal into the distance signal in accordance with the transformation formula represented by equation (37) (INFDATA_a=305.608) within the range of L>$L_4$. FIG. 37B shows the result obtained upon converting the AF signal into the distance signal in accordance with the transformation formula represented by equation (37) (INFDATA_b=820.4022) within the range of L>$L_4$. In this case, the reflectivity of the object is 90% while the standard reflectivity is 36%, i.e., the external light luminance is high. The level of a clamp signal $I_c$ is 1.5 nA, and an error signal at 0.2 nA is added to each of a near-side signal $I_1$ output from a first signal processing circuit 11 and a far-side signal $I_2$ output from a second signal processing circuit 12.

As shown in these drawings, when the AF signal (FIG. 36) obtained when high-luminance external light is received from the object having the reflectivity of 90% is converted into the distance signal in accordance with the transformation formula represented by equation (37) within the range of L>$L_4$ directly using the value INFDATA_a for the external light luminance, the temperature, and the power supply voltage within the standard ranges, the distance signal value becomes large for a very large distance L so infinity is not determined (FIG. 37A). To the contrary, when the AF signal (FIG. 36) is converted into the distance signal in accordance with the transformation formula represented by equation (37) within the range of L>$L_4$ using the value INFDATA_b different from the value INFDATA_a, the distance signal has a small constant value AFINF (infinity is determined) for a very large distance L (FIG. 37B).

Figure 38A:
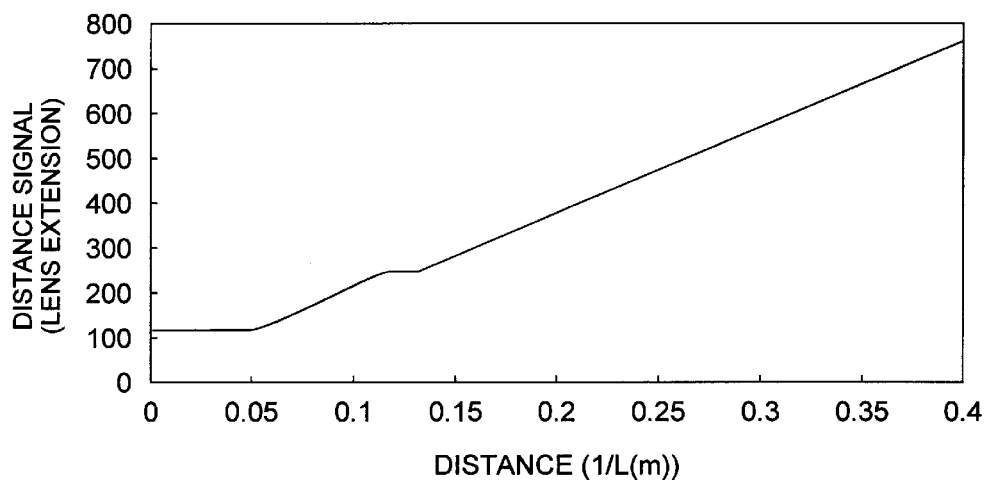
FIGS. 38A and 38B are graphs showing the calculation result of the distance signal for the distance L to the object when the temperature varies.
Figure 38B:
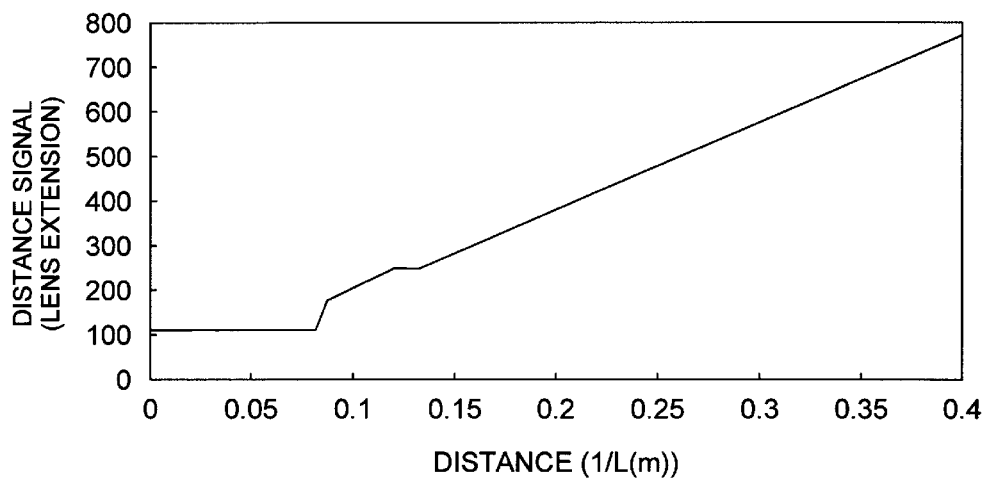

FIGS. 38A and 38B are graphs showing the calculation results of the distance signal for the distance L to the object when the temperature varies. FIG. 38A shows the result obtained upon converting the AF signal into the distance signal in accordance with the transformation formula represented by equation (37) (INFDATA_a=305.608) within the range of L>$L_4$. FIG. 38B shows the result obtained upon converting the AF signal into the distance signal in accordance with the transformation formula represented by equation (37) (INFDATA_b=820.4022) within the range of L>$L_4$. In this case, the temperature is −10° C. while the standard temperature is 20° C. The light amount of infrared light emitted by an IRED 4 is 1.25 times, so the level of the clamp signal $I_c$ increases to 1.25 times.

As shown in these drawings, when the AF signal obtained at a temperature lower than the standard temperature by 30° C. is converted into the distance signal in accordance with the transformation formula represented by equation (37) within the range of L>$L_4$ directly using the value INFDATA_a for the external light luminance, the temperature, and the power supply voltage within the standard ranges, the distance signal value becomes large for a very large distance L so infinity is not determined (FIG. 38A). To the contrary, when the AF signal is converted into the distance signal in accordance with the transformation formula represented by equation (37) within the range of L>$L_4$ using the value INFDATA_b different from the value INFDATA_a, the distance signal has a small constant value (infinity is determined) for a very large distance L (FIG. 38B).

Figure 39A:
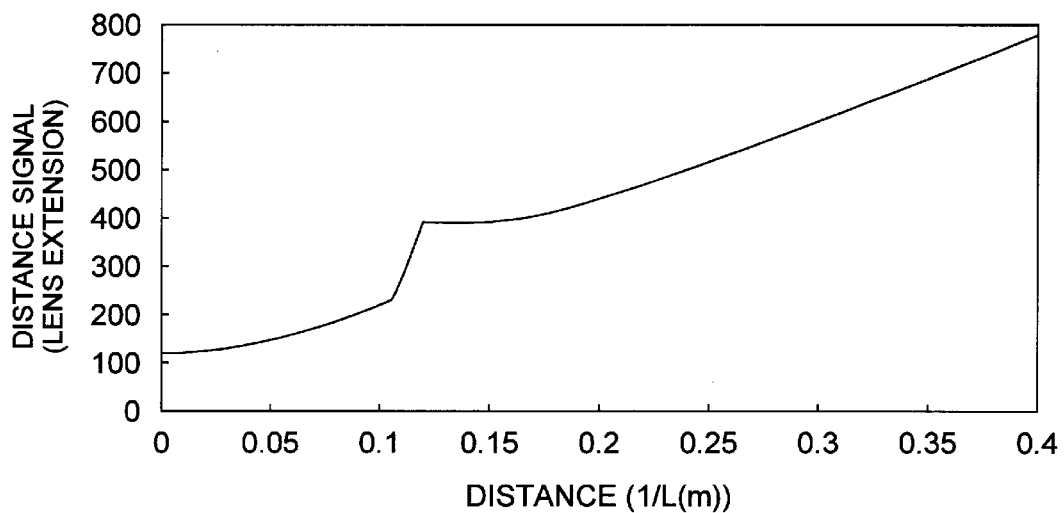
FIGS. 39A and 39B are graphs showing the calculation result of the distance signal for the distance L to the object when the power supply voltage varies.
Figure 39B:
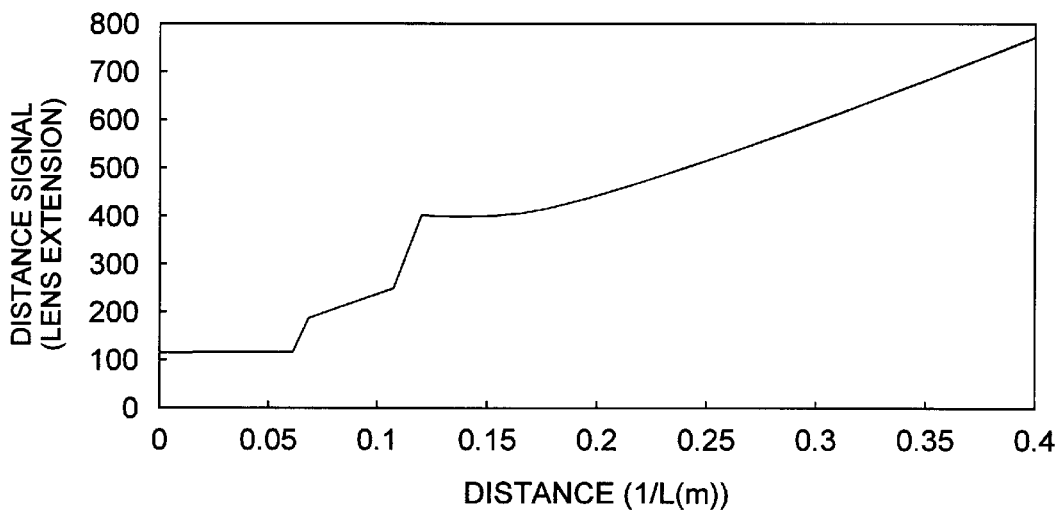

FIGS. 39A and 39B are graphs showing the calculation results of the distance signal for the distance L to the object when the power supply voltage varies. FIG. 39A shows the result obtained upon converting the AF signal into the distance signal in accordance with the transformation formula represented by equation (37) (INFDATA_a=305.608) within the range of L>$L_4$. FIG. 39B shows the result obtained upon converting the AF signal into the distance signal in accordance with the transformation formula represented by equation (37) (INFDATA_b=820.4022) within the range of L>$L_4$. In this case, the voltage is 3.2 V while the standard voltage is 2.85 V. The light amount of infrared light emitted by the IRED 4 is 1.15 times, and the power supply noise is 0.15 nA.

As shown in these drawings, when the AF signal obtained at a voltage higher than the standard voltage by 0.35 V is converted into the distance signal in accordance with the transformation formula represented by equation (37) within the range of L>$L_4$ directly using the value INFDATA_a for the external light luminance, the temperature, and the power supply voltage within the standard ranges, the distance signal value becomes large for a very large distance L so infinity is not determined (FIG. 39A). On the other hand, when the AF signal is converted into the distance signal in accordance with the transformation formula represented by equation (37) within the range of L>$L_4$ using the value INFDATA_b different from the value INFDATA_a, the distance signal has a small constant value (infinity is determined) for a very large distance L (FIG. 39B).

As described above, according to the distance measuring apparatus of this embodiment, even when the external light luminance, the temperature, or the power supply voltage varies, reliable infinity determination is enabled with high long distance measurement accuracy.

In the above embodiment, in conversion from the AF signal y to the distance signal by the CPU 1, determination of the use of equation (3) or (37) is made on the basis of whether the AF signal y is on the far side of the clamp effect presence/absence determination reference level defined by the reference object reflectivity. However, equation (3) or (37) may be selected on the basis of whether the level of the far-side signal $I_2$ is higher than that of the clamp signal Ic. In this case, in FIGS. 1 and 3, the CPU 1 receives the output signal from a determination comparator 37 in a clamp circuit 13, selects equation (3) or (37) on the basis of this signal, and converts the AF signal y into the distance signal x.

Figure 40:
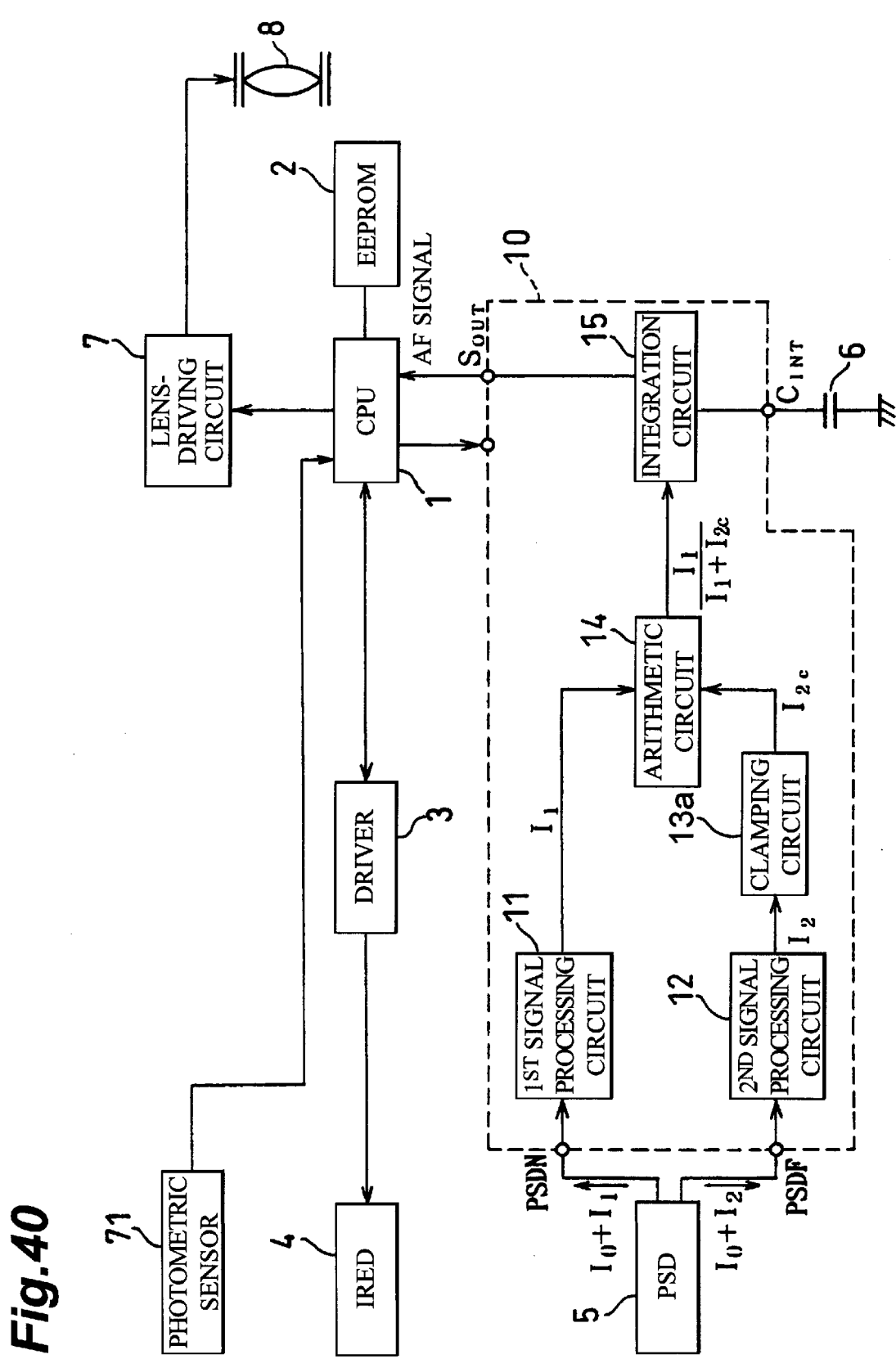
FIG. 40 is a block diagram of a distance measuring apparatus according to another embodiment.

Next, another embodiment according to the present invention will be described. FIG. 40 is a block diagram of the distance measuring apparatus of this embodiment.

Figure 41:
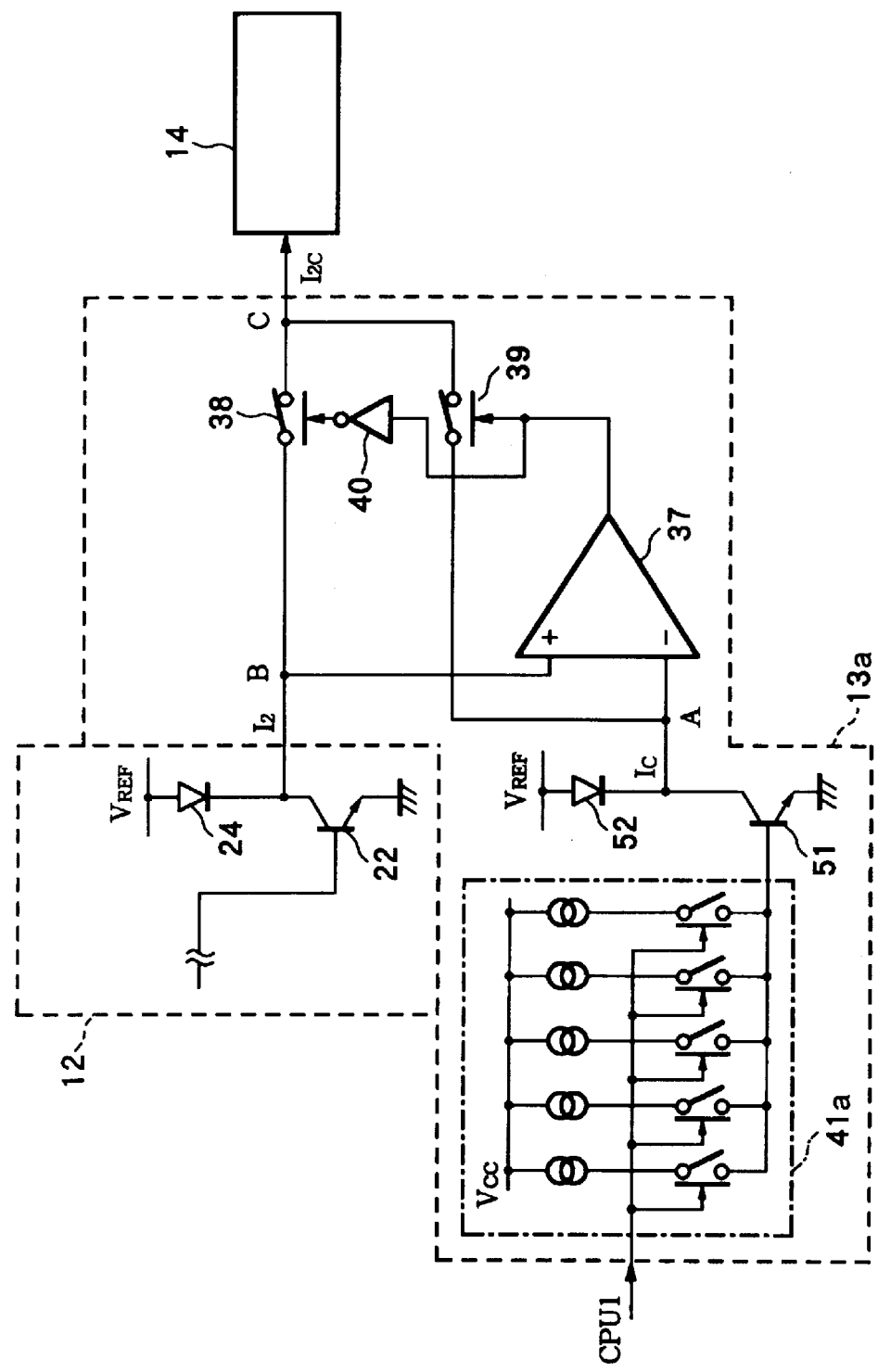
FIG. 41 is a circuit diagram of the clamping circuit in the apparatus of FIG. 40.

This embodiment is identical to the first embodiment shown in FIG. 1 except that it does not have temperature sensor 72 and it has another clamp circuit 13a. FIG. 41 is a circuit diagram of the clamping circuit 13 in this embodiment. The dissimilarities between clamping circuit 13 (shown in FIG. 3) and 13a (shown in FIG. 41) is configuration of current source 41 and 41a. The "clamping" current source 41a comprises a plurality of sets, connected in parallel, of constant-current sources and switches, each set being constituted by a constant-current source and a switch which are connected in series. The individual switches open and close under the control of the CPU 1. The clamping current source 41a feeds the base terminal of the transistor 51 with a clamp current which is the sum of the respective currents from the constant-current sources corresponding to the closed switches. This clamp current becomes a base current for the transistor 51, and a collector potential corresponding to the magnitude of the base current is fed to the − input terminal of the judging comparator 37.

In particular, in this embodiment, a clamping effect judgment reference level COUNT_B which is determined by a reference sample reflectivity (36%) and the AF signal y are compared with each other in terms of magnitude, a value $L_v$ of external luminance measured by the photometric sensor 71 and a luminance switching judgment value AEDATA are compared with each other in terms of magnitude, and the AF signal y is converted into the distance signal x according to a conversion expression corresponding to the results of these comparisons. Here, at the reference sample reflectivity (36%), the distance L corresponding to the clamping effect judgment reference level COUNT_B is $L_4$, and the clamping effect judgment reference level COUNT_B equals an AF signal of $y_4$. On the other hand, the luminance switching judgment value AEDATA is set according to the relative positional relationship between the IRED 4 and the PSD 5. Further, in the case where the clamp current supplied from the clamping current source 41 in the clamping circuit 13 is variable, the luminance switching judgment value AEDATA is set according the level of the clamp signal $I_c$ (or the clamp current outputted from the clamping current source 41a) as well.

The method of setting the value of luminance switching judgment value AEDATA will now be explained. For example, the distance between the IRED 4 and the PSD 5 may actually be measured, and the luminance switching judgment value AEDATA may be set according to the result of measurement. Alternatively, the luminance switching judgment value AEDATA may be set according to a parameter determined on the basis of the relative positional relationship between the IRED 4 and the PSD 5. An example of such a parameter is a farthest AF signal value INFDATA corresponding to the farthest setting point of the taking lens 8. In this case, when the AF signal value y is not greater than the farthest AF signal value INFDATA, then the distance signal x is set to a value corresponding to the farthest setting point of the taking lens 8, so as to effect more stable focusing control of the taking lens 8. In the following, in the case where the clamp current supplied from the clamping current source 41a is variable, the method of setting the luminance switching judgment value AEDATA according to the farthest AF signal value INFDATA and clamp current value will be explained.

Figure 42:
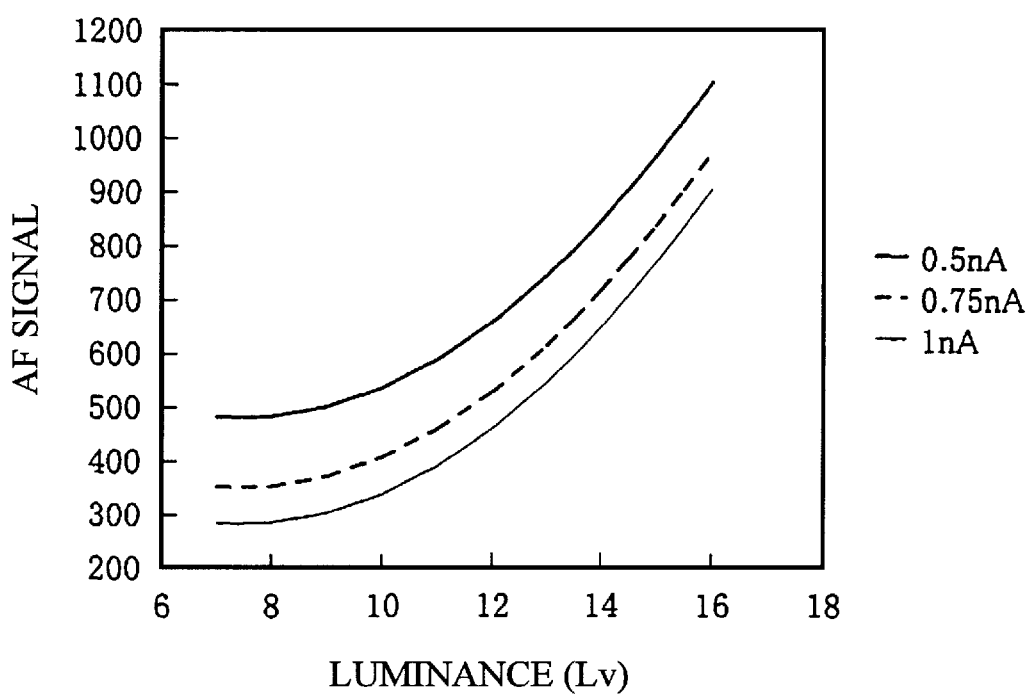
FIG. 42 is a graph showing relationships between the external light luminance and the AF signal when the distance L to the object subjected to range-finding is at a predetermined constant value not smaller than $L_4$.

FIG. 42 is a graph showing the relationship between the external light luminance and the AF signal in the case where the distance L to the object subjected to range-finding is a predetermined constant length not shorter than $L_4$ for each of the clamp current values 0.5 nA, 0.75 nA, and 1 nA in the clamping circuit 13. As shown in this graph, the AF signal y is approximated by the following expression:

$$y = KKA \cdot Lv^2 + KKB \cdot Lv + KKC \quad (38)$$

which is a quadratic expression of external light luminance Lv. Here, the coefficients KKA and KKB are constant values independent of the clamp current value, and the coefficient KKC is a constant value determined according to the clamp current value.

Hence, the respective values of the coefficients KKA and KKB, and the values of coefficient KKC corresponding to the individual clamp current values are determined beforehand according to relationships between the external light luminance and AF signal, such as those shown in FIG. 42, determined for a number of distance measuring apparatus. Then, y in the above-mentioned expression (38) is substituted by the farthest signal value INFDATA, and the resulting value of external light luminance Lv is defined as the luminance switching judgment value AEDATA. Namely, the luminance switching judgment value AEDATA is set by the following expression:

$$AEDATA = \frac{-KKB + [KKB^2 - 4 \cdot KKA(KKC - INFDATA)]^{1/2}}{2 \cdot KKA} \quad (39)$$

In the following, some of the procedures for converting the AF signal y into the distance signal x will be explained specifically.

EMBODIMENT A

Figure 43:
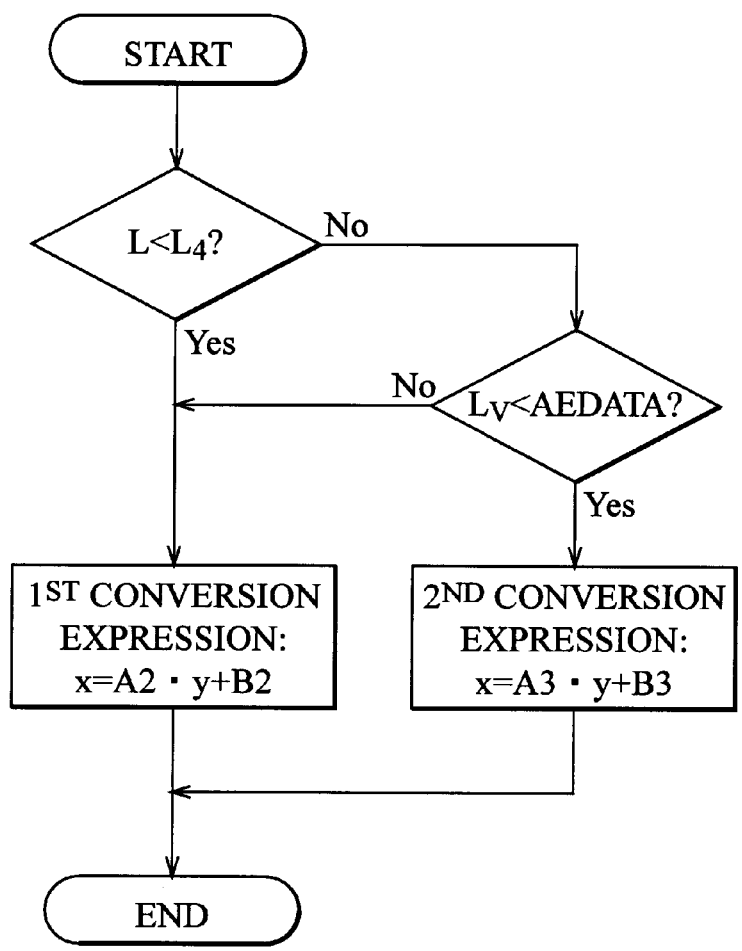
FIGS. 43 to 45 are flowcharts explaining the conversion from the AF signal y to the distance signal x in this embodiment, respectively.

FIG. 43 is a flowchart for explaining the conversion from the AF signal y into the distance signal x in Embodiment A. In the range where the AF signal y exceeds the clamping effect judgment reference level COUNT_B, i.e., the distance L is less than $L_4$, the distance signal x is determined from the AF signal y according to the parameters A2 (equation (1)) and B2 (equation (2)) by using equation (3).

On the other hand, in the range where the AF signal y is not greater than the clamping effect judgment reference level COUNT_B, i.e., the distance L is not shorter than $L_4$, the distance signal x is determined from the AF signal y further in conformity to a conversion expression which varies depending on the relationship in terms of magnitude between the value Lv of external light luminance determined by the photometric sensor 71 and the luminance switching judgment value AEDATA. Namely, when the measured value Lv of external light luminance is less than the luminance switching judgment value AEDATA, then the distance signal x is determined from the AF signal y according to the parameters A3 (equation (4)) and B3 (equation (5) by using equation (6).

When the measured value Lv of external light luminance is not smaller than the luminance switching judgment value AEDATA, on the other hand, then the distance signal x is determined from the AF signal y according to the conversion expression represented by the equation (4).

Here, the parameters A2, B2, A3, and B3, luminance switching judgment value AEDATA, farthest AF signal value INFDATA, and farthest distance signal value AFINF are determined for each camera, in which the distance measuring apparatus is to be incorporated, at the time of its manufacture and are prestored in the EEPROM 2 or the like. At the time of distance-measuring, these parameters are read out by the CPU 1, and the computation of equation (4) or (6) is carried out, whereby the AF signal y is converted into the distance signal x.

EMBODIMENT B

Figure 44:
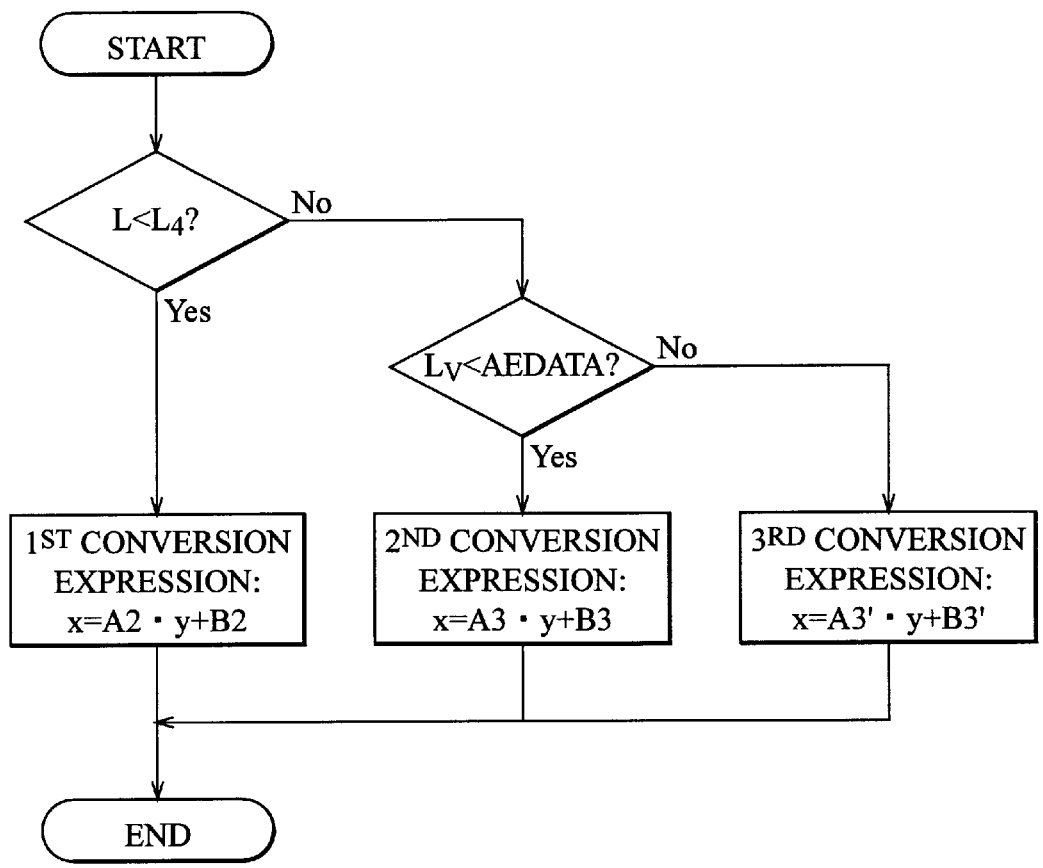

FIG. 44 is a flowchart for explaining the conversion from the AF signal y into the distance signal x in Embodiment B. In the range where the AF signal y exceeds the clamping effect judgment reference level COUNT_B, i.e., the distance L is less than $L_4$, the distance signal x is determined from the AF signal y according to the parameters A2 (equation (1)) and B2 (equation (2)) by using equation (3), as with Embodiment A.

On the other hand, in the range where the AF signal y is not greater than the clamping effect judgment reference level COUNT_B, i.e., the distance L is not shorter than $L_4$, the distance signal x is determined from the AF signal y further in conformity to a conversion expression which varies depending on the relationship in terms of magnitude between the value Lv of external light luminance determined by the photometric sensor 71 and the luminance switching judgment value AEDATA. Namely, when the measured value Lv of external light luminance is less than the luminance switching judgment value AEDATA, then the distance signal x is determined from the AF signal y according to the parameters A3 (equation (4)) and B3 (equation (5)) by using equation (6), as with Embodiment A. When the value Lv of the measured external light luminance is not smaller than the luminance switching judgment value AEDATA, then the distance signal x is determined from the AF signal y by the following conversion expression:

$$x = A3' \cdot y + B3' \quad (40)$$

wherein at least the parameter A3' is a value greater than the parameter A3.

These parameters are determined for each camera, in which the distance measuring apparatus is to be incorporated, at the time of its manufacture and are prestored in the EEPROM 2 or the like. At the time of range-finding, they are read out by the CPU 1, and the AF signal y is converted into the distance signal x.

EMBODIMENT C

Figure 45:
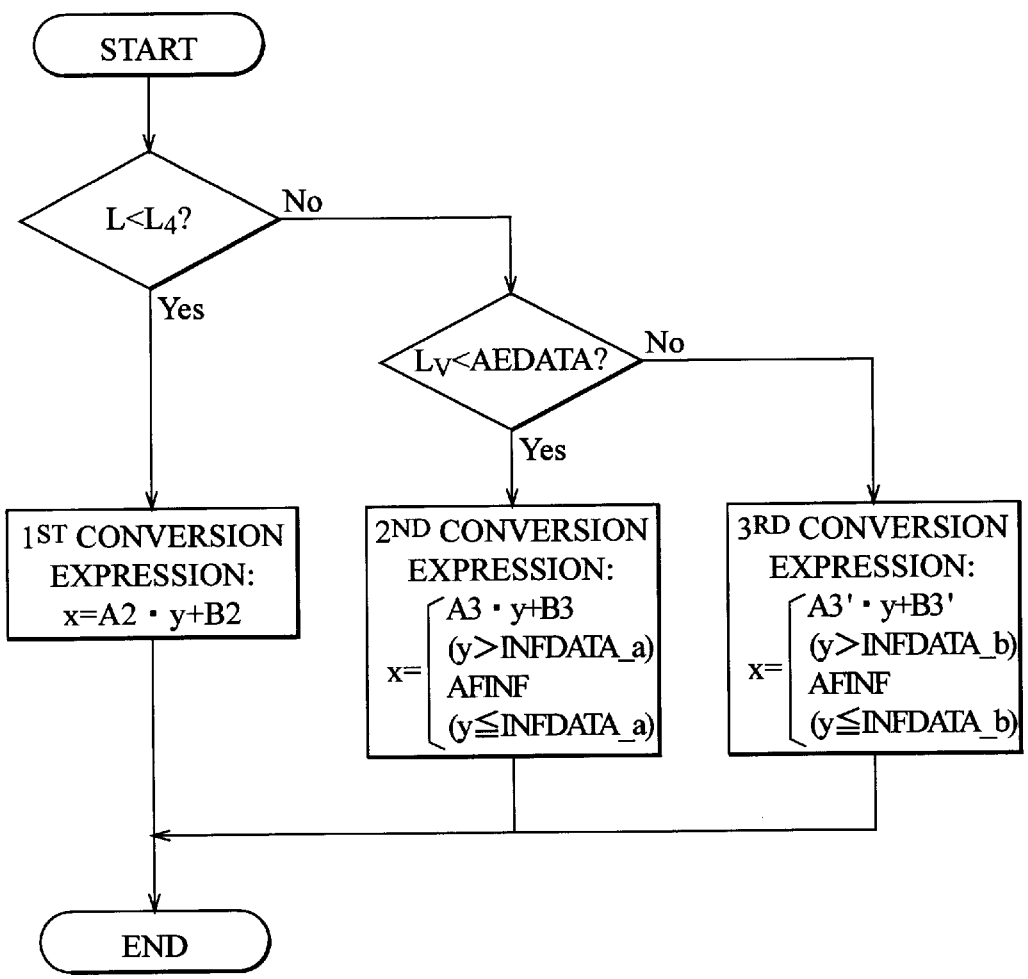

FIG. 45 is a flowchart for explaining the conversion from the AF signal y into the distance signal x in Embodiment C. Here, the AF signal y is computed basically in a manner similar to that in Embodiment A.

Here, when the AF signal y is not greater than the farthest AF signal value INFDATA corresponding to the farthest setting value of the taking lens 8, further stable focusing control of the taking lens 8 can be effected if the distance signal x is set to the farthest distance signal value AFINF corresponding to the farthest setting value of the taking lens 8. Namely, in place of the equation (6), the equation (37) is employed. The farthest AF signal value INFDATA is a value corresponding to the relationship in terms of magnitude between the external light luminance value Lv measured by the photometric sensor 71 and the luminance switching judgment value AEDATA, and becomes greater as the value obtained by subtracting the luminance switching judgment value AEDATA from the external light luminance value Lv is greater.

For example, the farthest AF signal value INFDATA may be any value selected from at least two values according to the difference between the external light luminance value Lv and the luminance switching judgment value AEDATA or may be computed according to the difference between the external light luminance value Lv and the luminance switching judgment value AEDATA. In this embodiment, the farthest AF signal value INFDATA is assumed to be selected from one of two values according to the difference between the external light luminance value Lv and the luminance switching judgment value AEDATA, such that the farthest AF signal value INFDATA is INFDATA _a when the external light luminance value Lv is less than the luminance switching judgment value AEDATA, whereas it is INFDATA_b, which is greater than the above-mentioned INFDATA_a, when the external light luminance value Lv is not smaller than the luminance switching judgment value AEDATA.

These parameters and the like are determined for each camera, in which the distance measuring apparatus is to be incorporated, at the time of its manufacture and are prestored in the EEPROM 2 or the like. At the time of range-finding, these parameters are read out by the CPU 1, whereby the AF signal y is converted into the distance signal x.

Examples of calculation of the distance signal with respect to the distance to the object subjected to range-finding in each embodiment will now be shown. For comparison, examples of calculation (hereinafter referred to as Comparative Examples A, B, and C, respectively) in which the computational expressions in the respective embodiments are used with only the luminance switching judgment value AEDATA being set to a constant value of 13.5 regardless of the relative positional relationship between the IRED 4 and PSD 5 will be shown as well. In each chart, three broken lines indicate the upper limit of the permissible range, the theoretical value, and the lower limit of the permissible range, respectively.

Figure 88A:
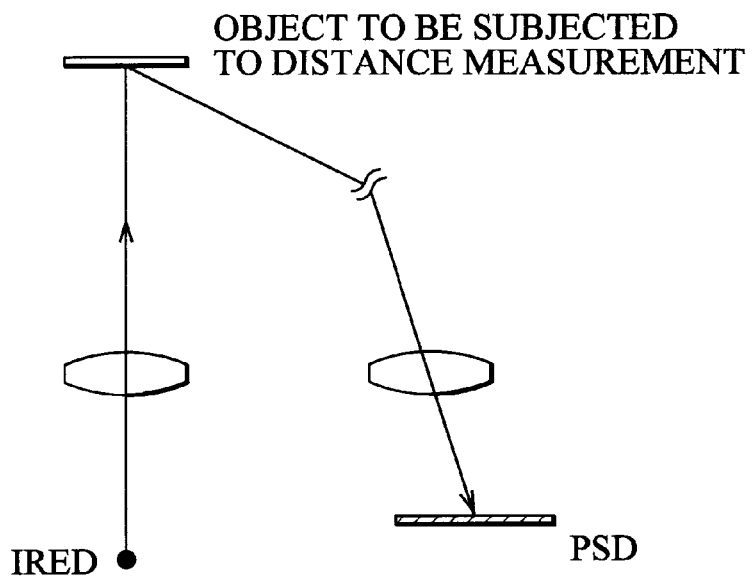
FIGS 88A to 88D are explanatory view of a measurement error due to a shift of the relative positional relationship between an IRED and a PSD.
Figure 88B:
Figure 88C:
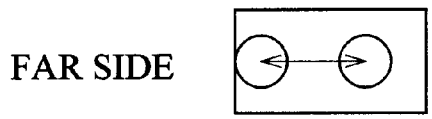

First, the examples of calculation of the distance signal with respect to the distance to the object subjected to range-finding in the case where the PSD 5 is shifted on the farther side in the measurement direction (see FIG. 88C) will be explained with reference to FIGS. 46 to 54. In this case, the luminance switching judgment value AEDATA obtained by the equation (39) in accordance with Embodiments A to C is 15.4. The relationship among the charts, the comparative examples and embodiments, and the external light luminance Lv are shown in the following table.

TABLE 1

Figure 46:
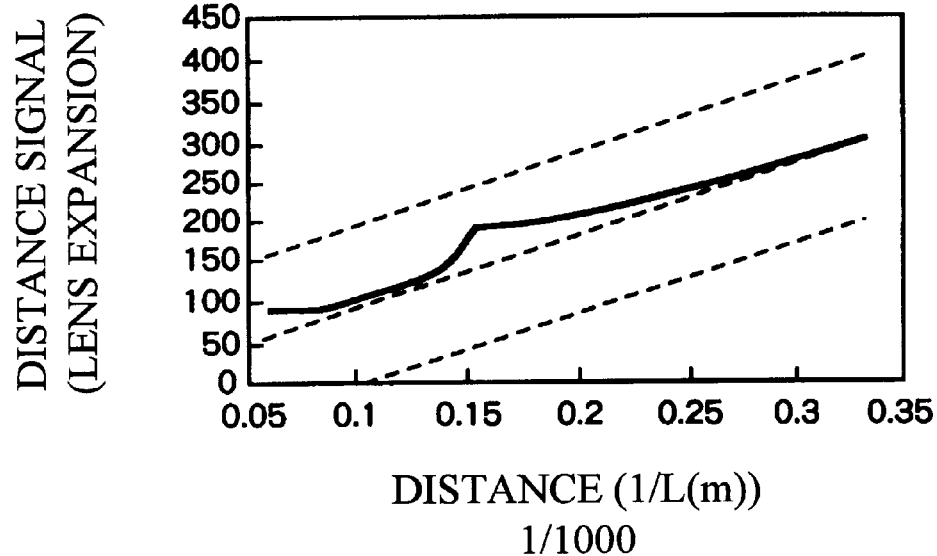
FIGS. 46 to 54 are charts showing respective examples of calculation of the distance signal with respect to the distance to the object subjected to range-finding in the case where a PSD is located on the farther measurement side in Embodiments and Comparative Examples.
Figure 47:
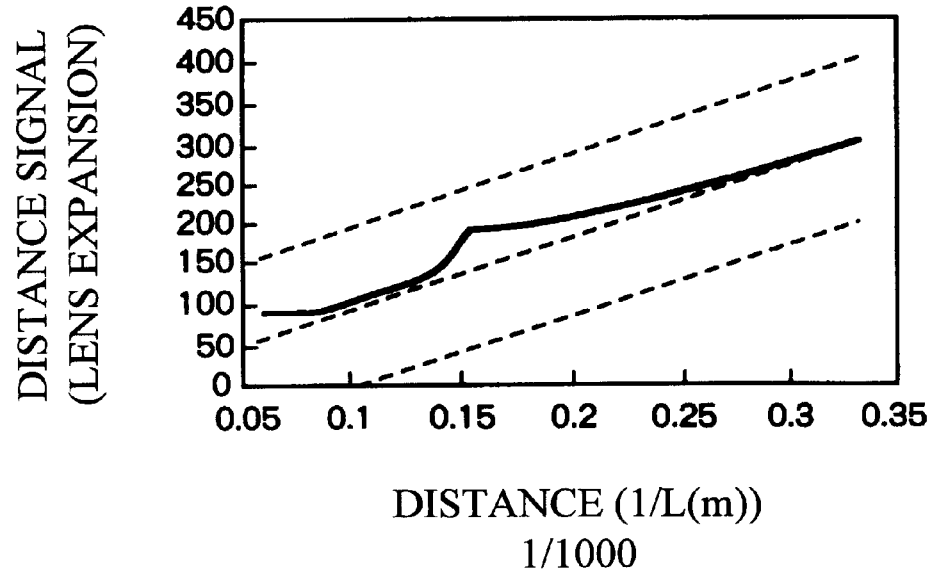
Figure 48:
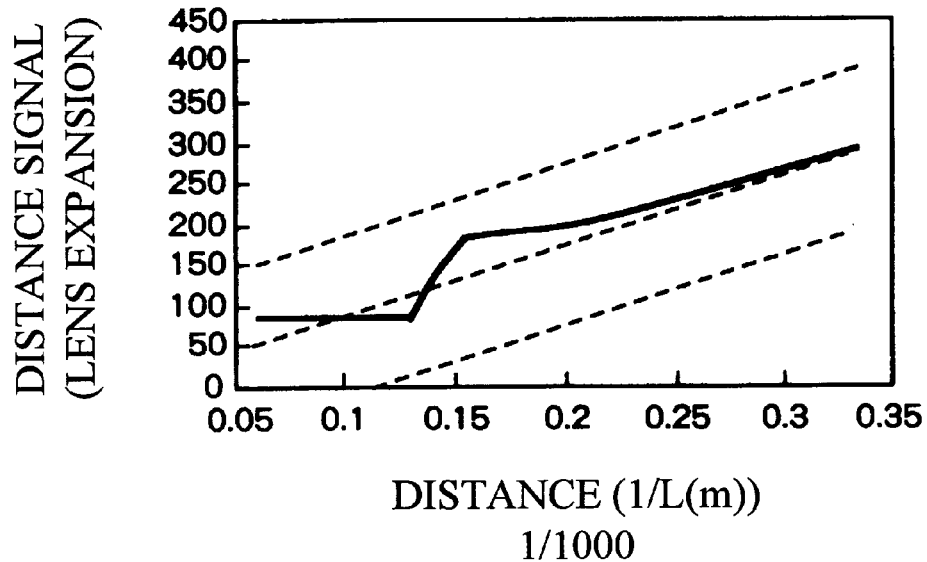
Figure 49:
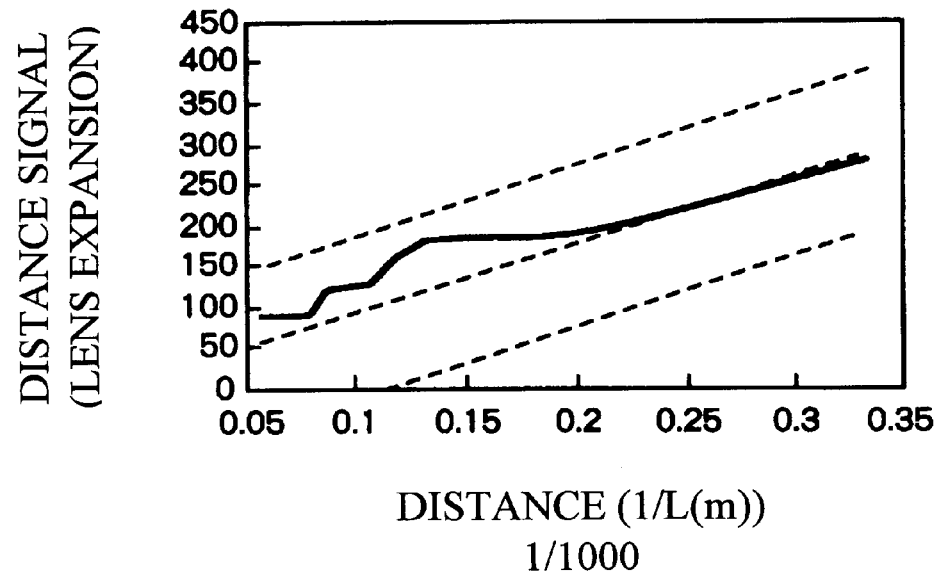
Figure 50:
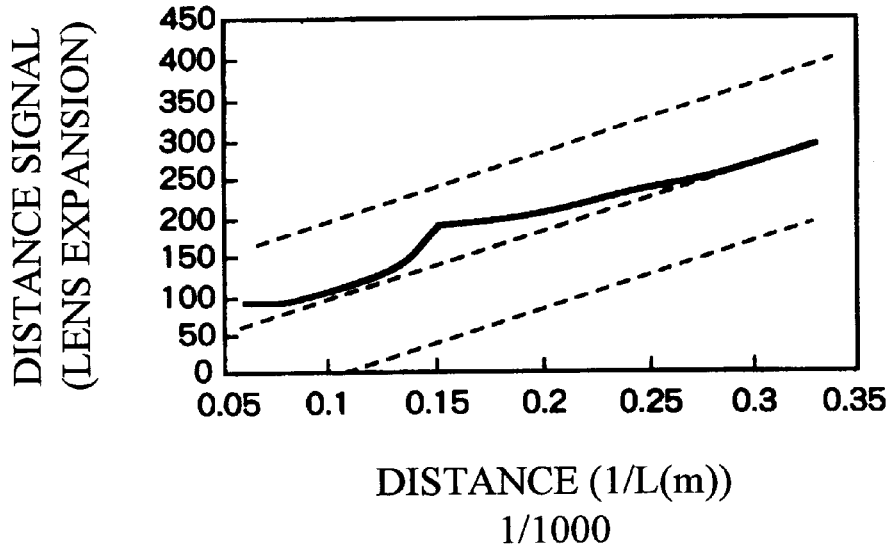
Figure 51:
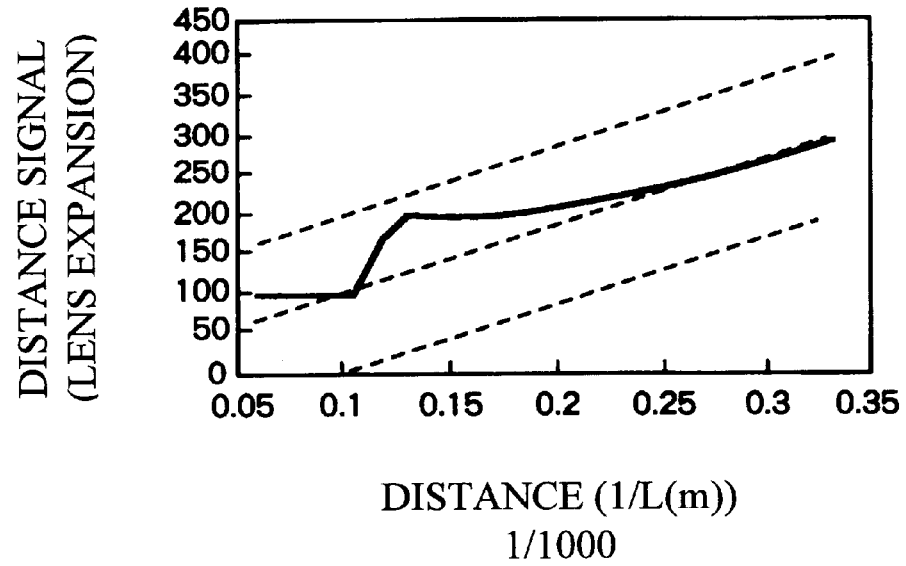
Figure 52:
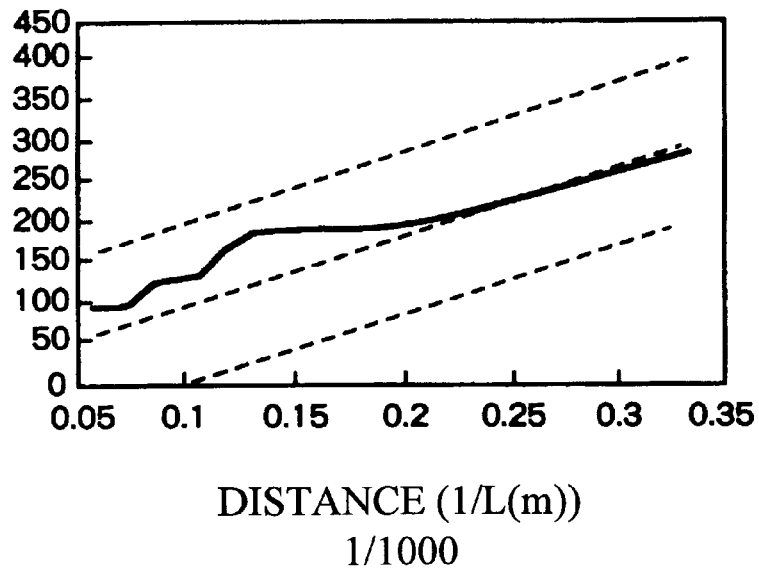
Figure 53:
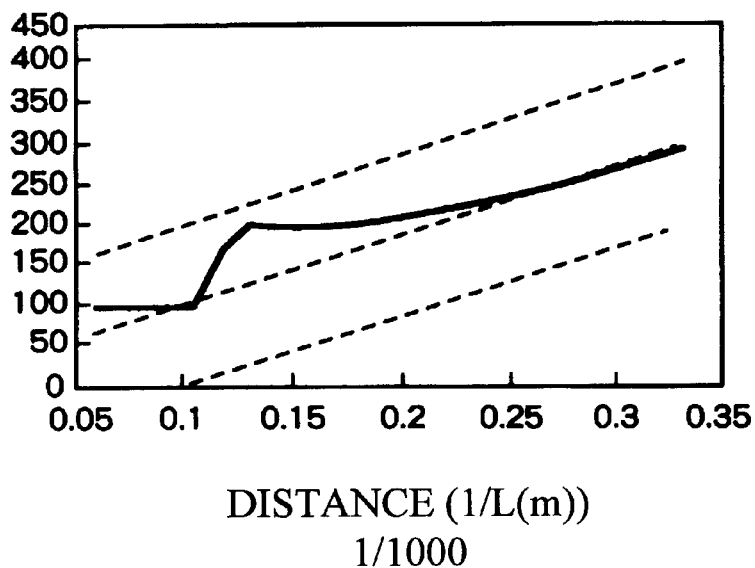
Figure 54:
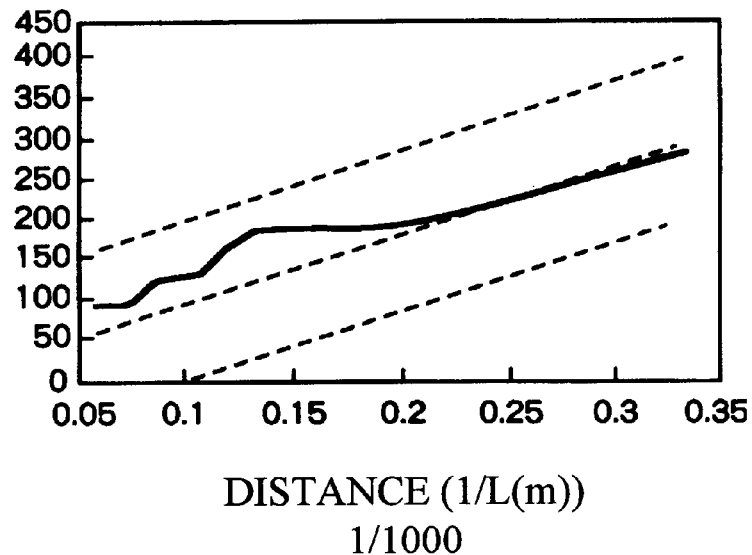

| | Lv | | |
|---|---|---|---|
| | Lv < 13.5 | 13.5 ≦ Lv < 15.4 | 15.4 ≦ Lv |
| Comparative Example A | FIG. 46 | FIG. 48 | FIG. 51 |
| Comparative Example B | | | |
| Example C | | FIG. 49 | FIG. 52 |
| Embodiment A | FIG. 47 | FIG. 50 | FIG. 53 |
| Embodiment B | | | |
| Embodiment C | | | FIG. 54 |

Next, the examples of calculation of the distance signal with respect to the distance to the object subjected to range-finding in the case where the PSD 5 is located at the center (see FIG. 88B) will be explained with reference to FIGS. 55 to 66. In this case, the luminance switching judgment value AEDATA obtained by the equation (39) in accordance with Embodiments A to C is 19.2. The relationship among the charts, the comparative examples and embodiments, and the external light luminance Lv are shown in the following table.

TABLE 2

Figure 55:
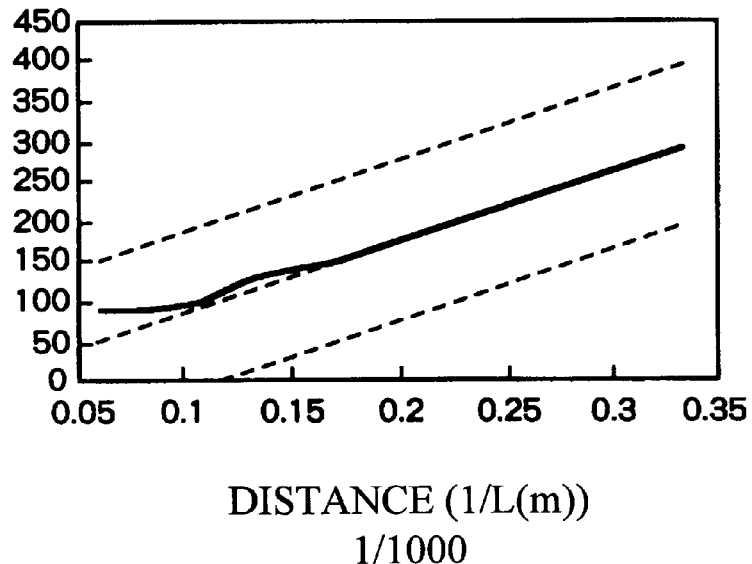
FIGS. 55 to 66 are charts showing respective examples of calculation of the distance signal with respect to the distance to the object subjected to range-finding in the case where the PSD is located at the center in Embodiments and Comparative Examples.
Figure 56:
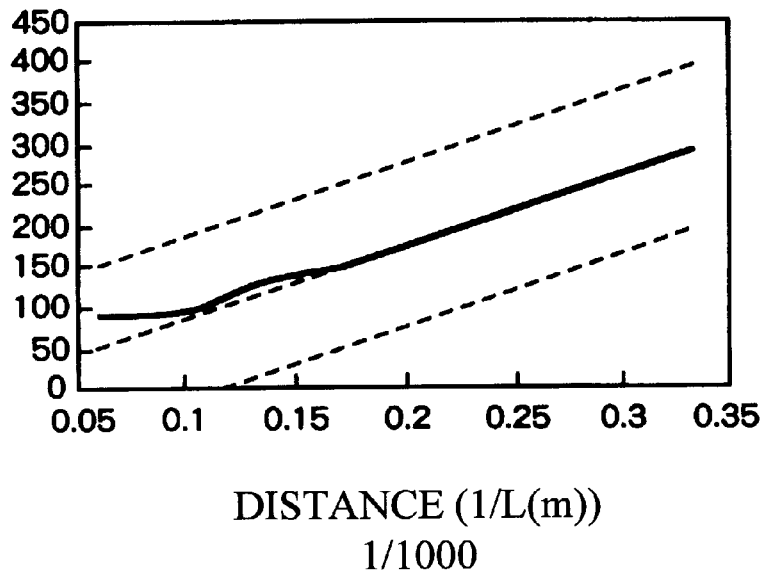
Figure 57:
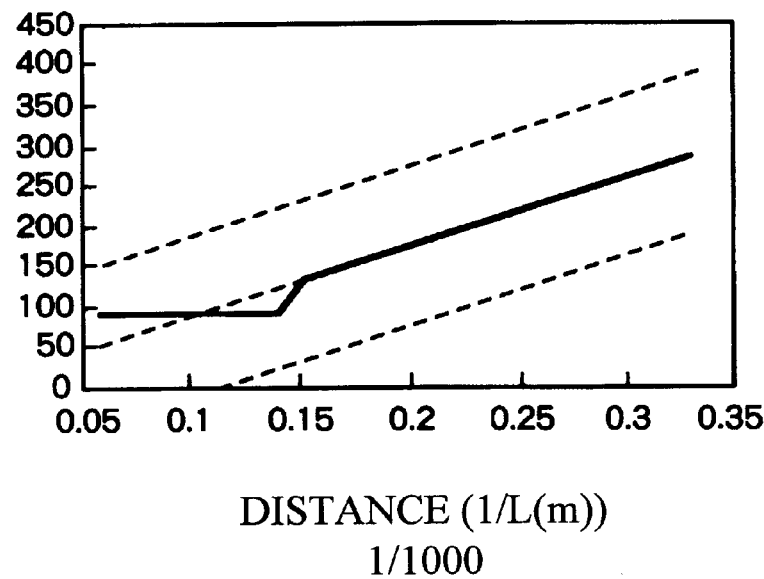
Figure 58:
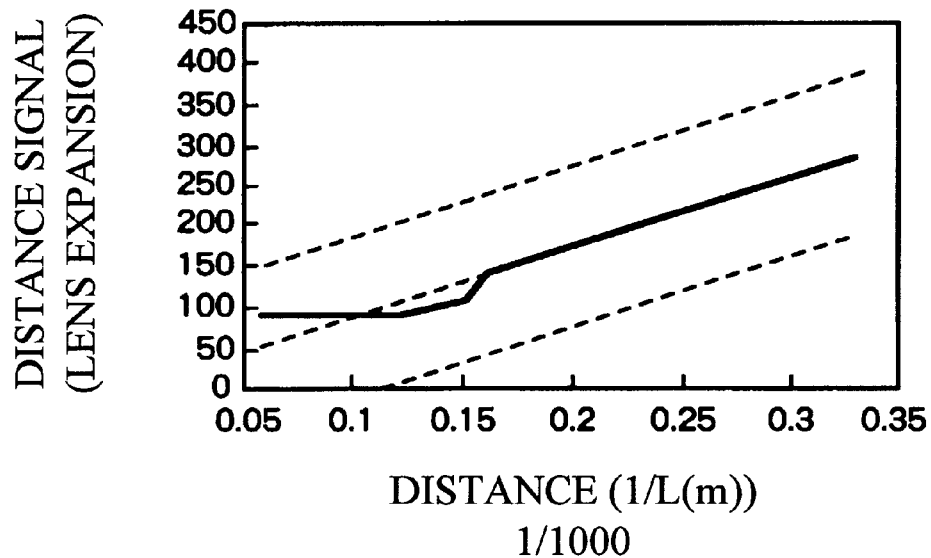
Figure 59:
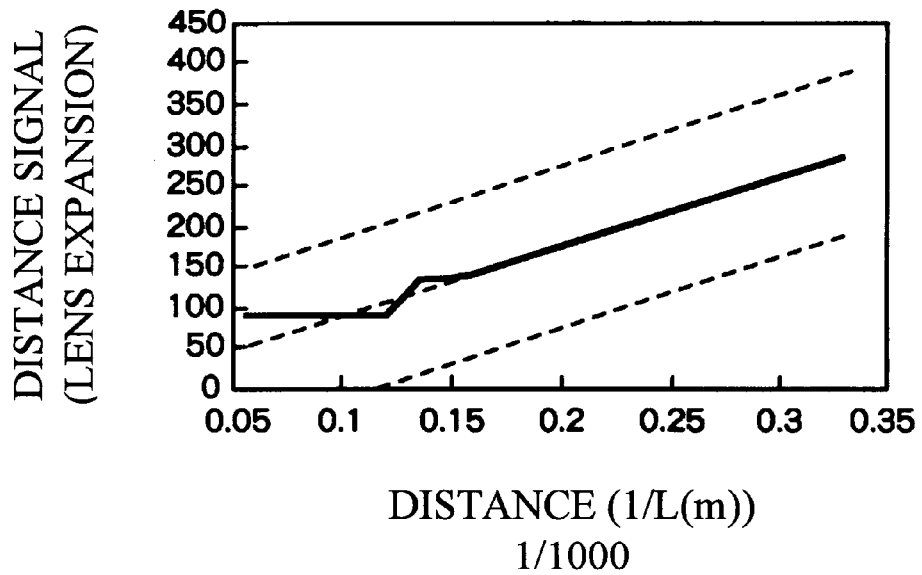
Figure 60:
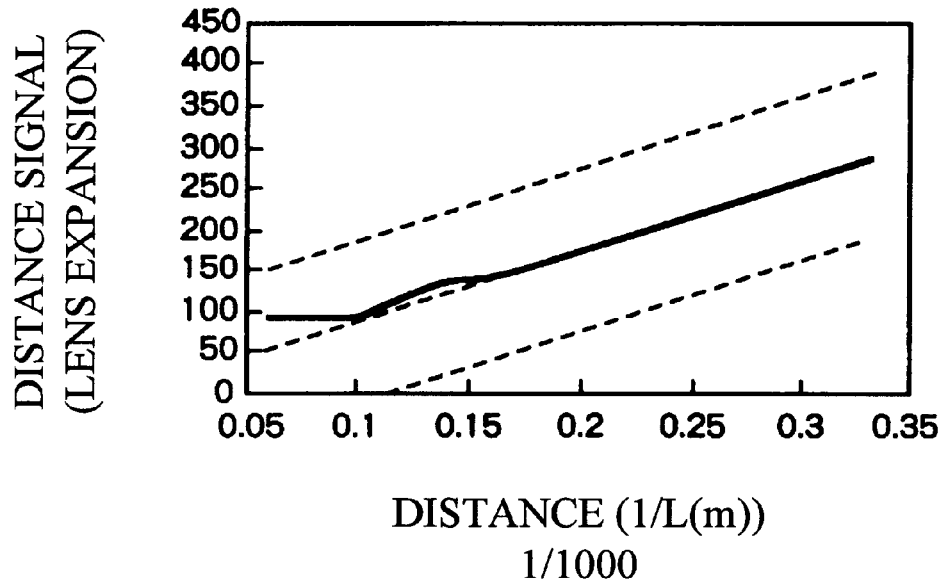
Figure 61:
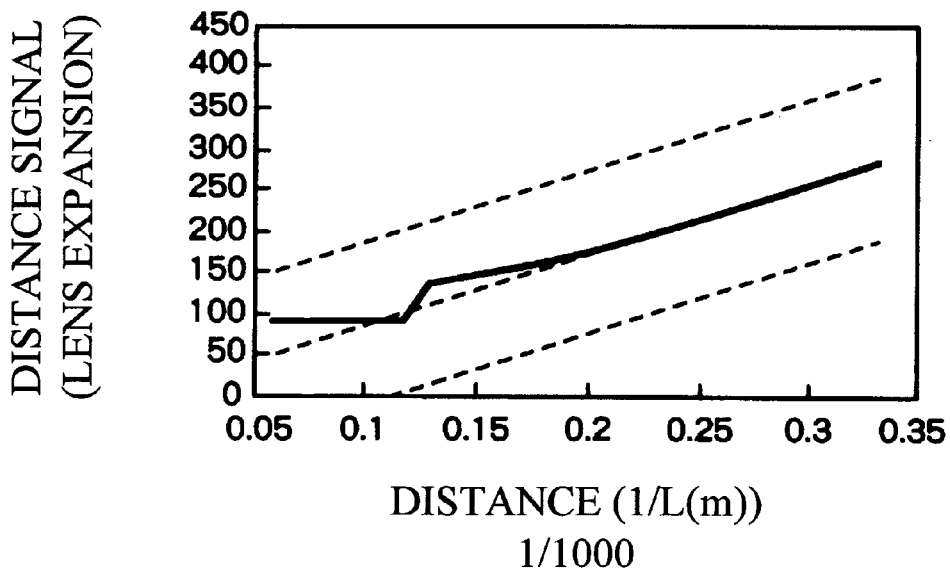
Figure 62:
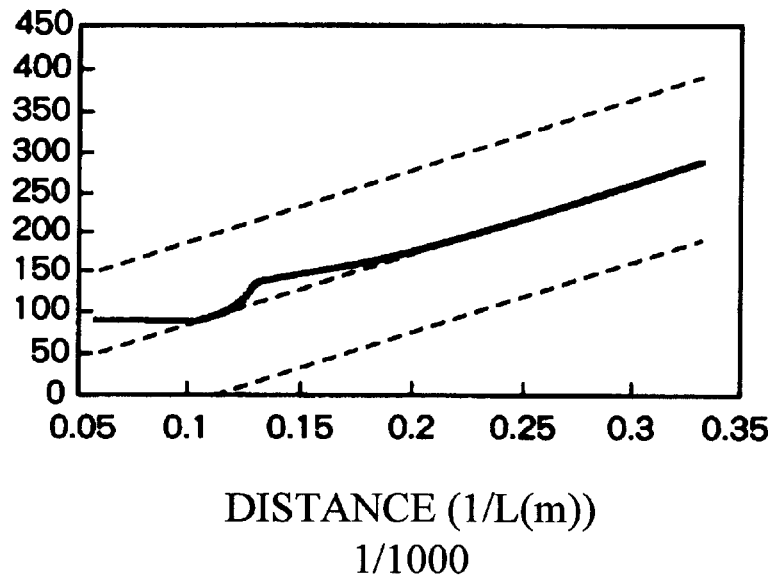
Figure 63:
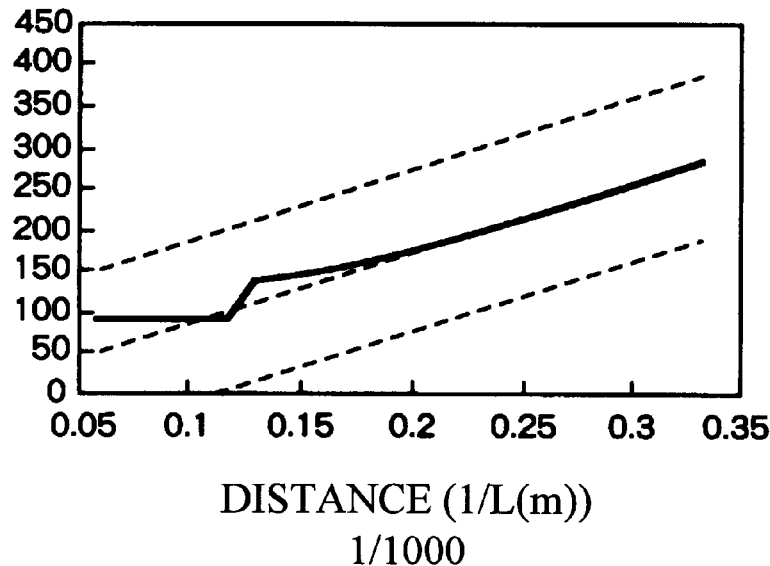
Figure 64:
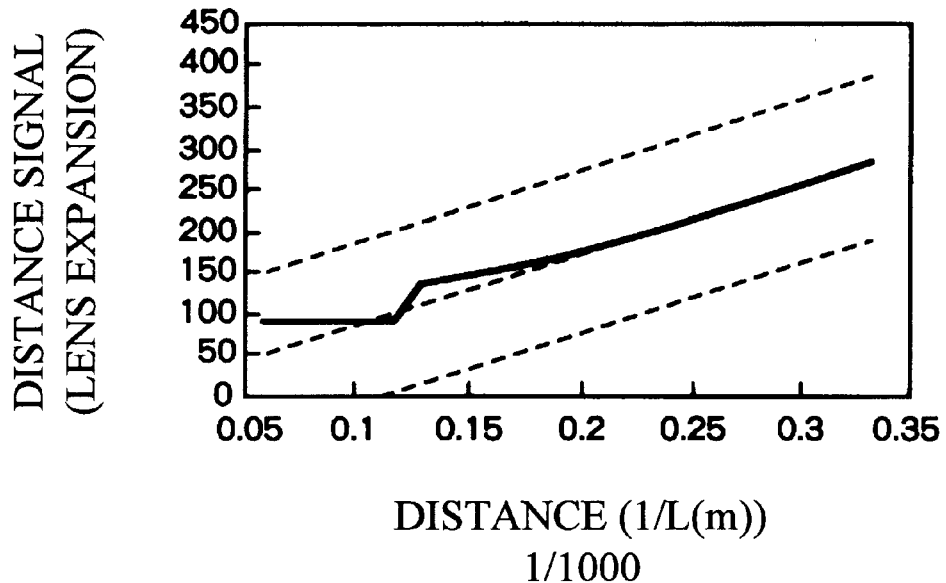
Figure 65:
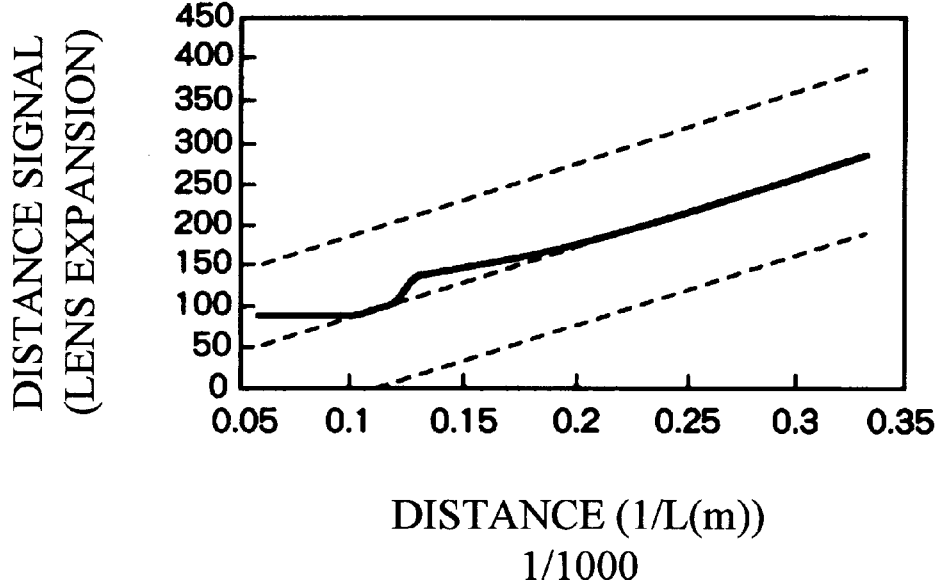
Figure 66:
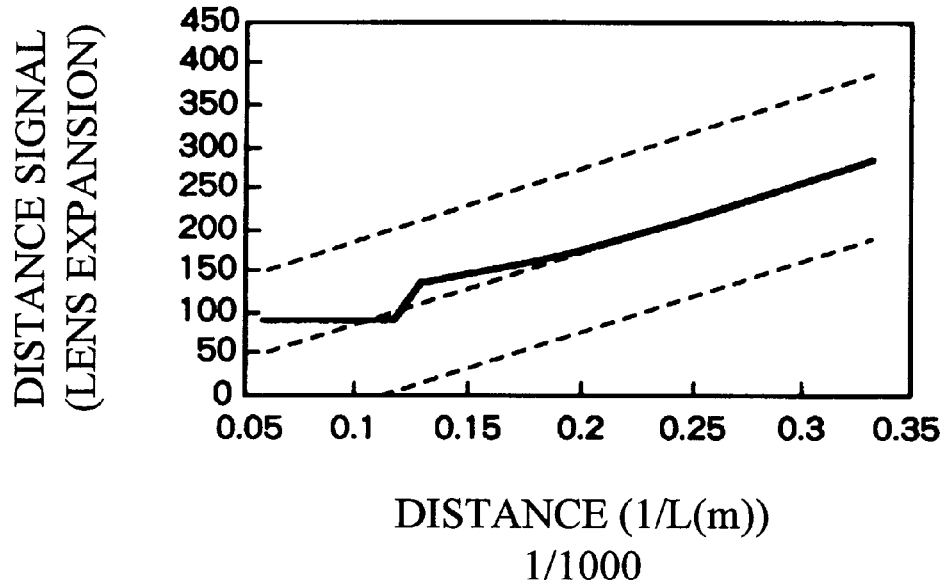

| | Lv | | |
|---|---|---|---|
| | Lv < 13.5 | 13.5 ≦ Lv < 15.4 | 15.4 ≦ Lv |
| Comparative Example A | FIG. 55 | FIG. 57 | FIG. 61 |
| Comparative Example B | | FIG. 58 | FIG. 62 |
| Comparative Example C | | FIG. 59 | FIG. 63 |
| Embodiment A | FIG. 56 | FIG. 60 | FIG. 64 |
| Embodiment B | | | FIG. 65 |
| Embodiment C | | | FIG. 66 |

Figure 88D:

Finally, the examples of calculation of the distance signal with respect to the distance to the object subjected to range-finding in the case where the PSD 5 is shifted on the nearer side in the measurement direction (see FIG. 88D) will be explained with reference to FIGS. 67 to 83. In this case, the luminance switching judgment value AEDATA obtained by the equation (39) in accordance with Embodiments A to C is 31.9. The relationship among the charts, the comparative examples and embodiments, and the external light luminance Lv are shown in the following table.

TABLE 3

Figure 67:
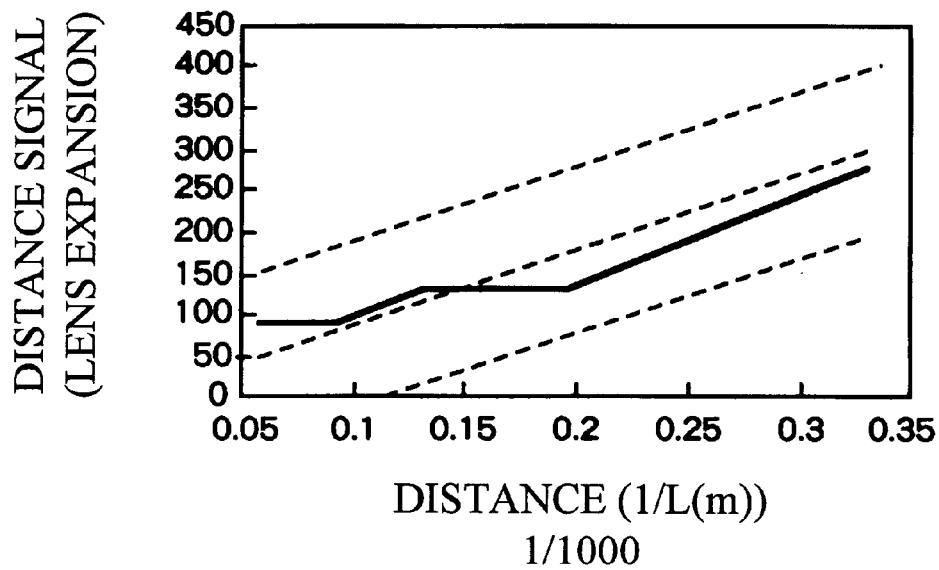
FIGS. 67 to 83 are charts showing respective examples of calculation of the distance signal with respect to the distance to the object subjected to range-finding in the case where the PSD is located on the nearer measurement side in Embodiments and Comparative Examples.
Figure 68:
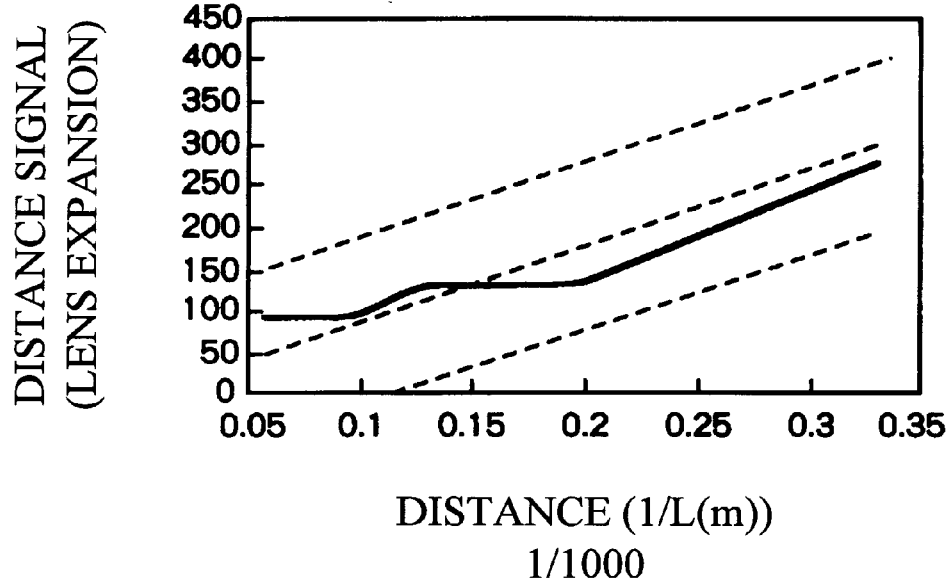
Figure 69:
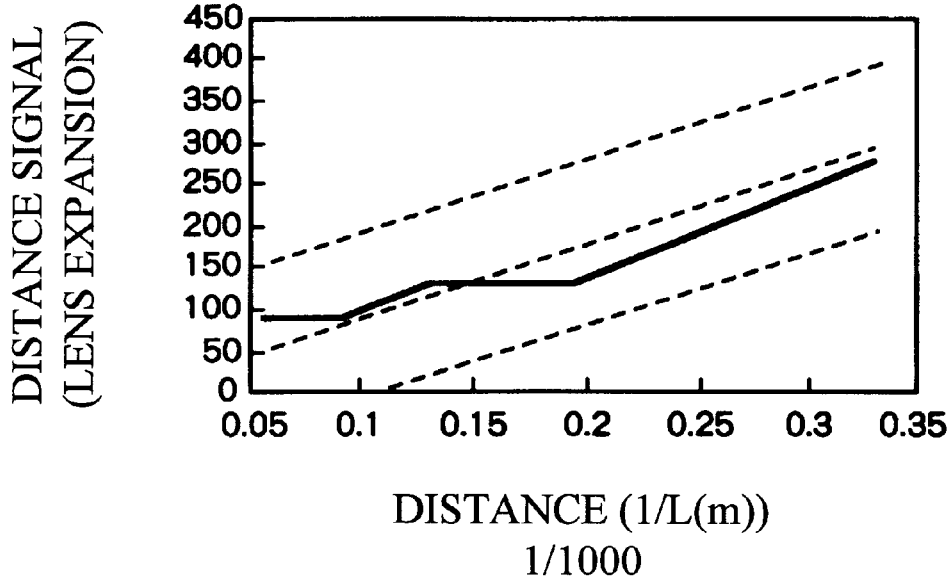
Figure 70:
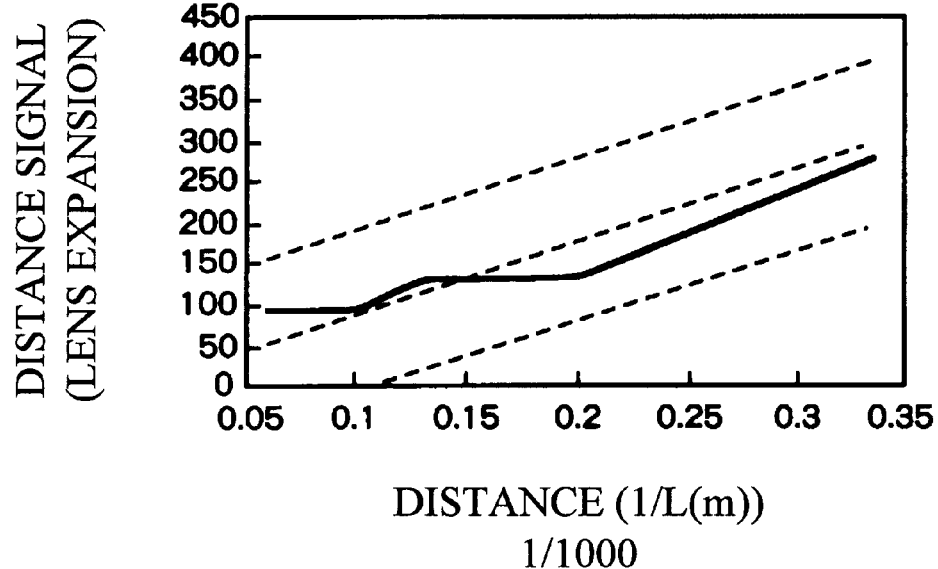
Figure 71:
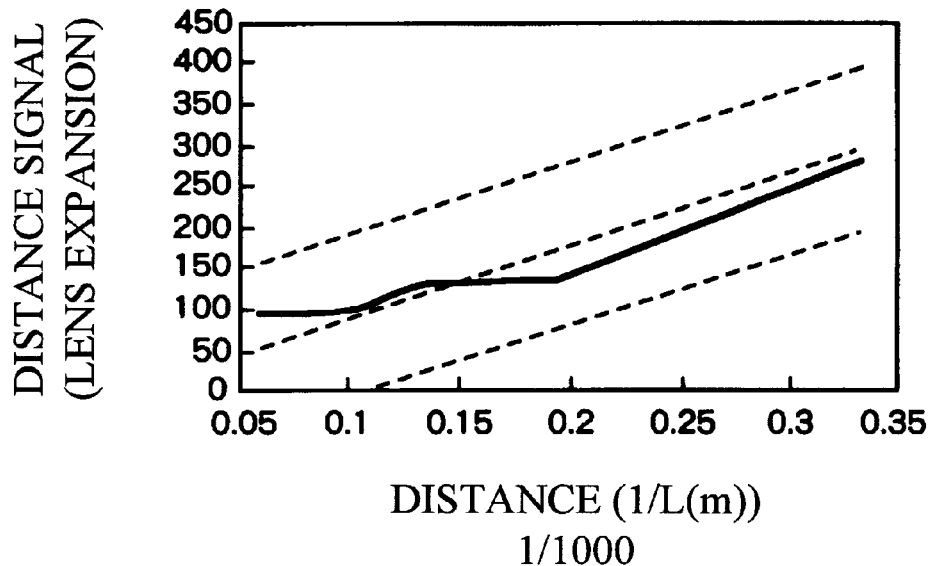
Figure 72:
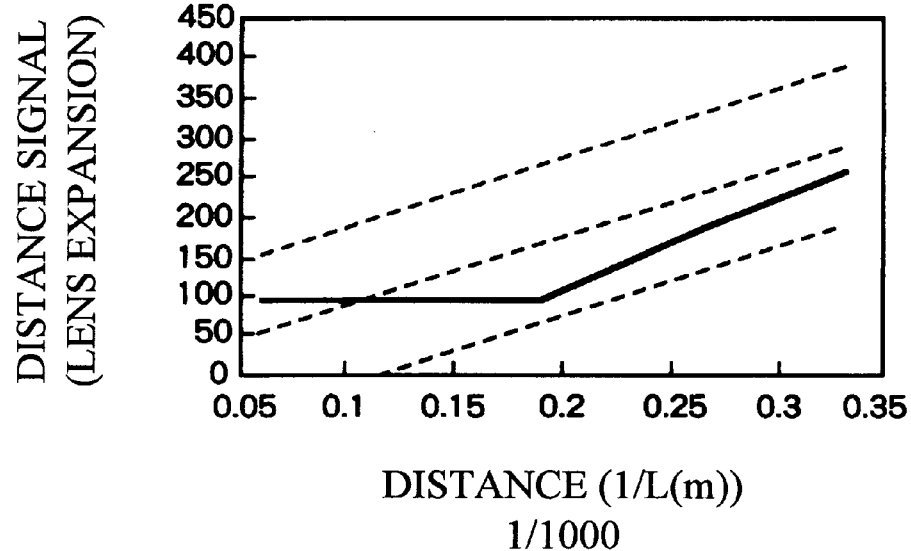
Figure 73:
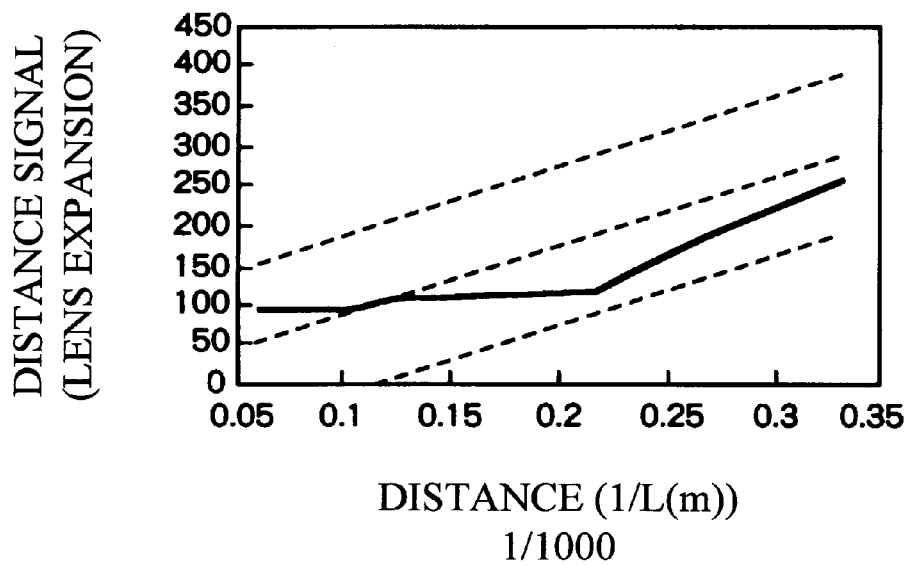
Figure 74:
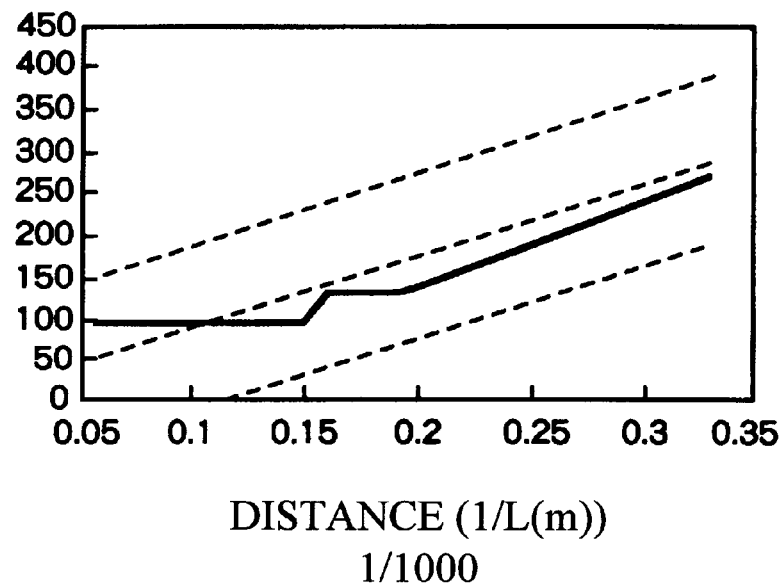
Figure 75:
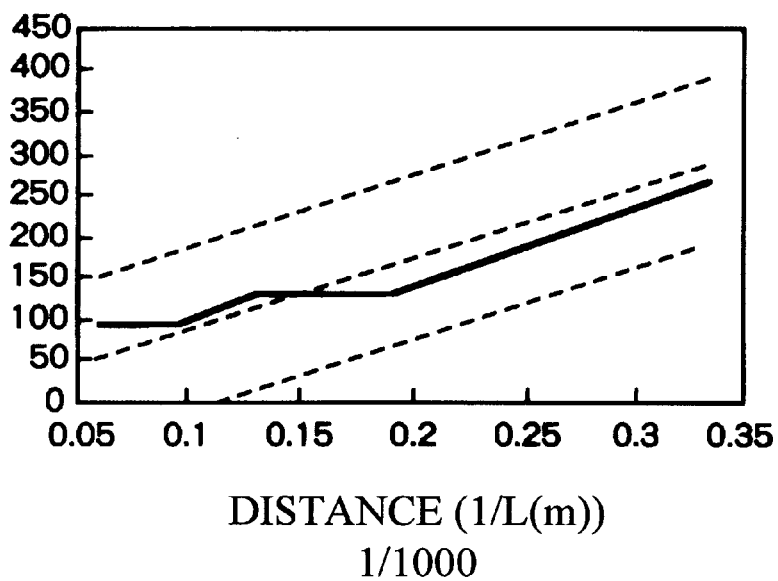
Figure 76:
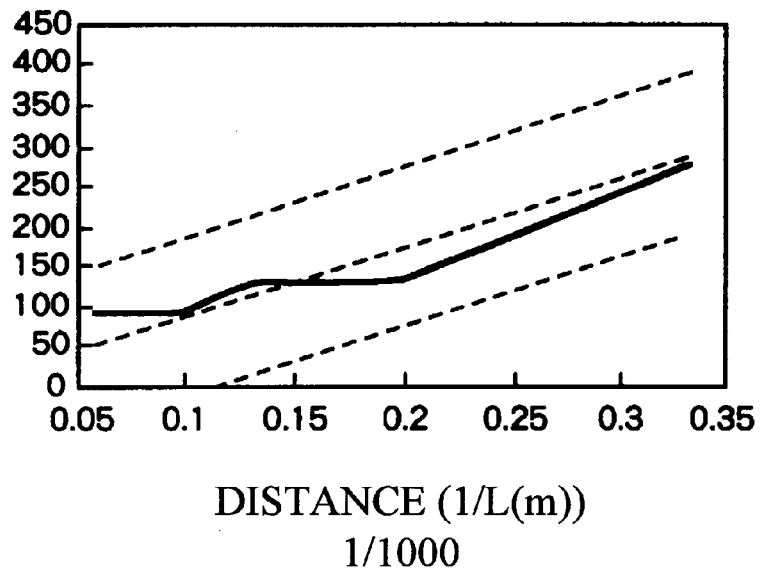
Figure 77:
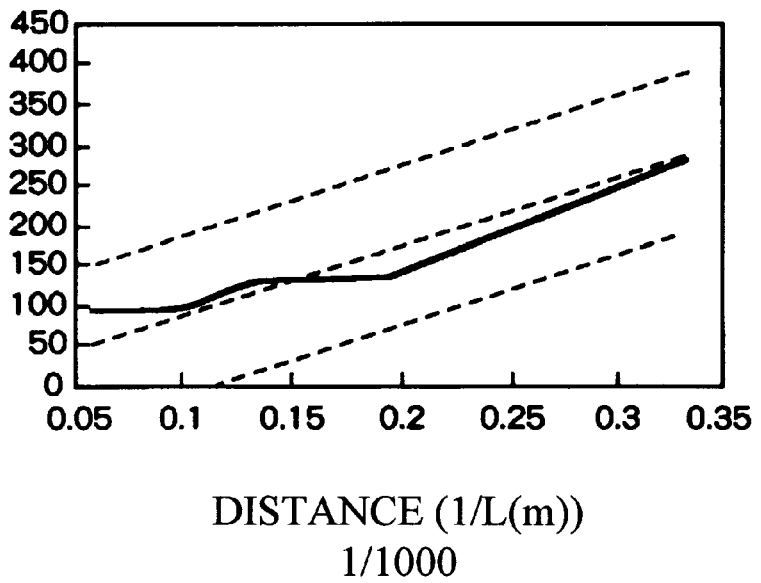
Figure 78:
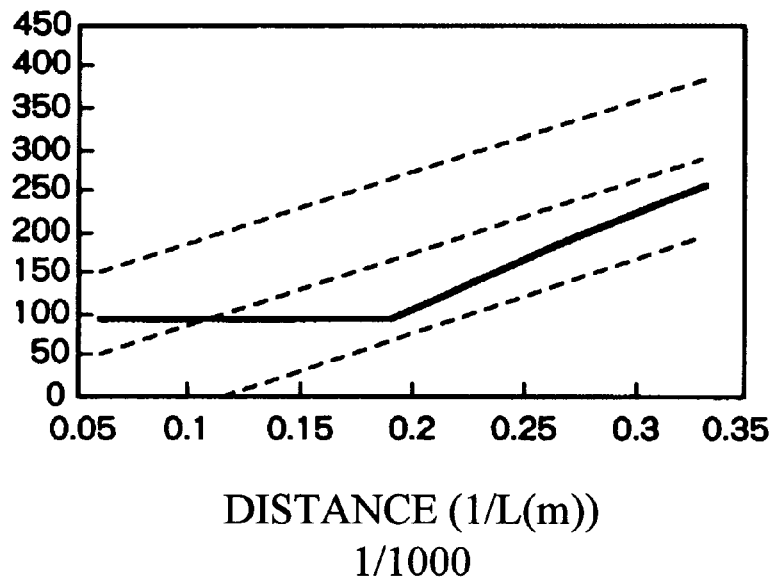
Figure 79:
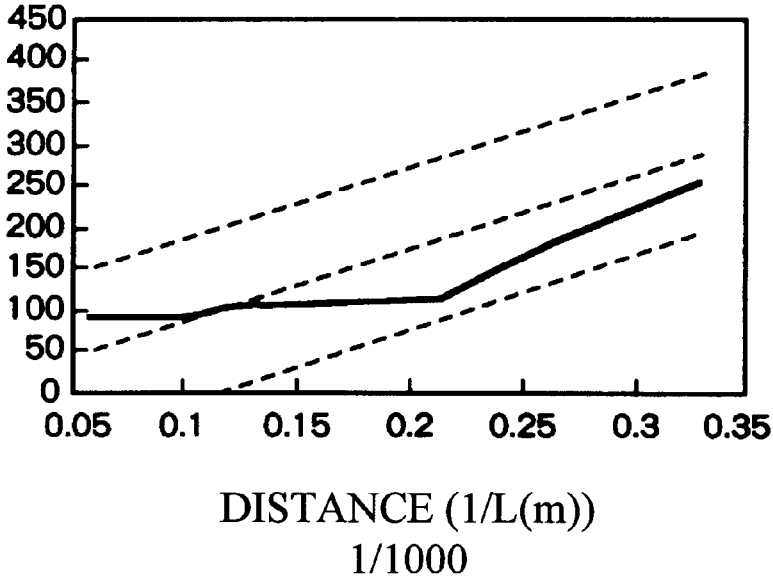
Figure 80:
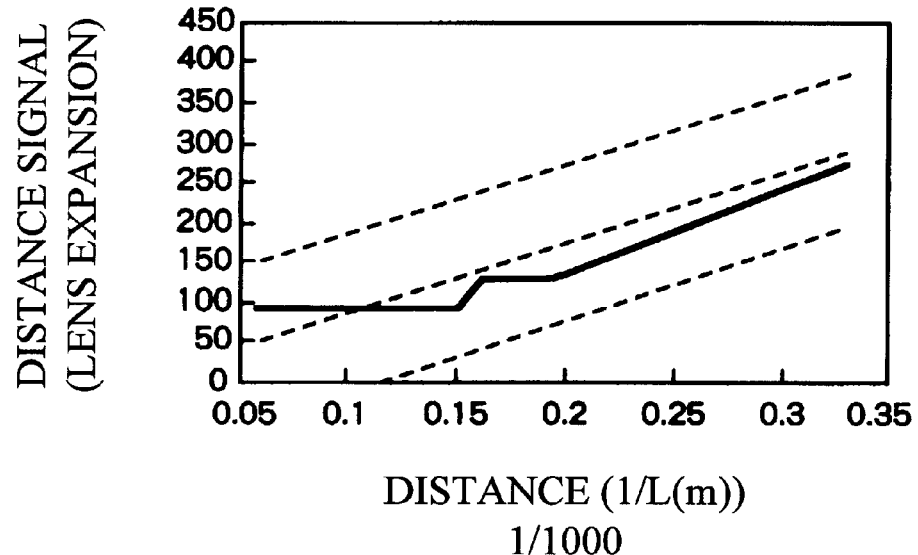
Figure 81:
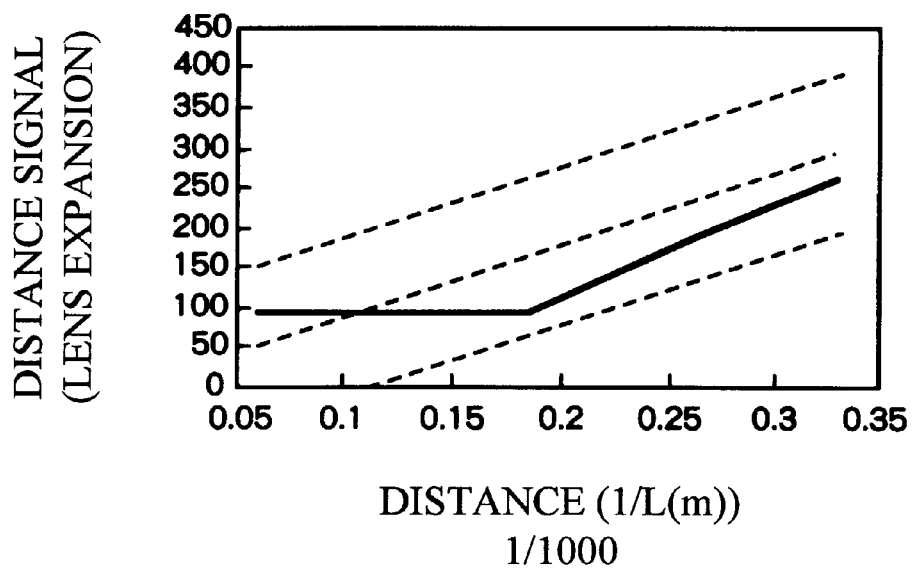
Figure 82:
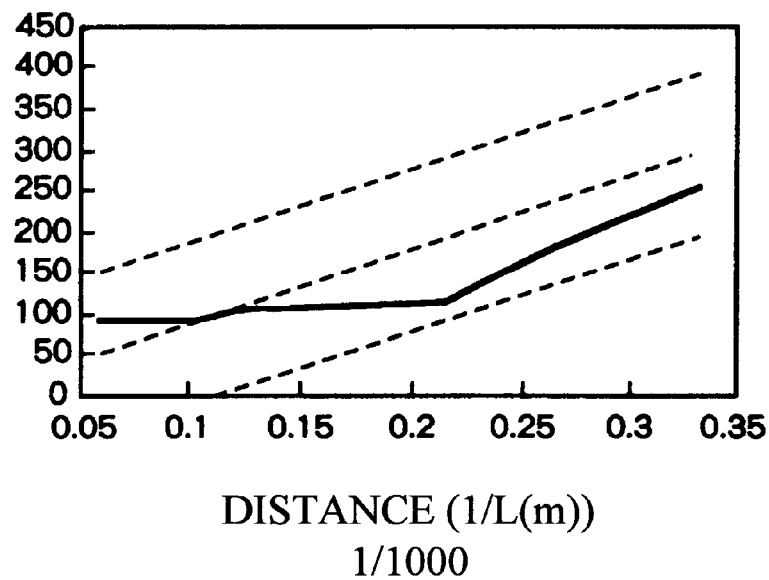
Figure 83:
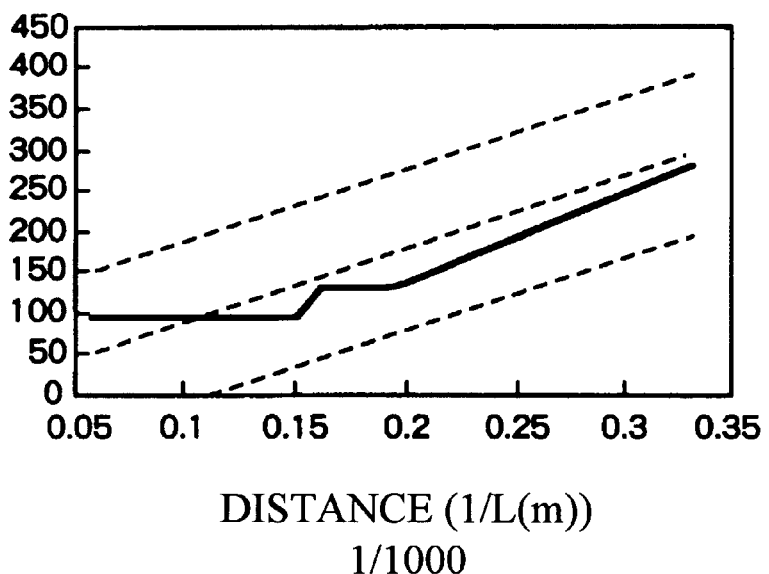
Figure 84:
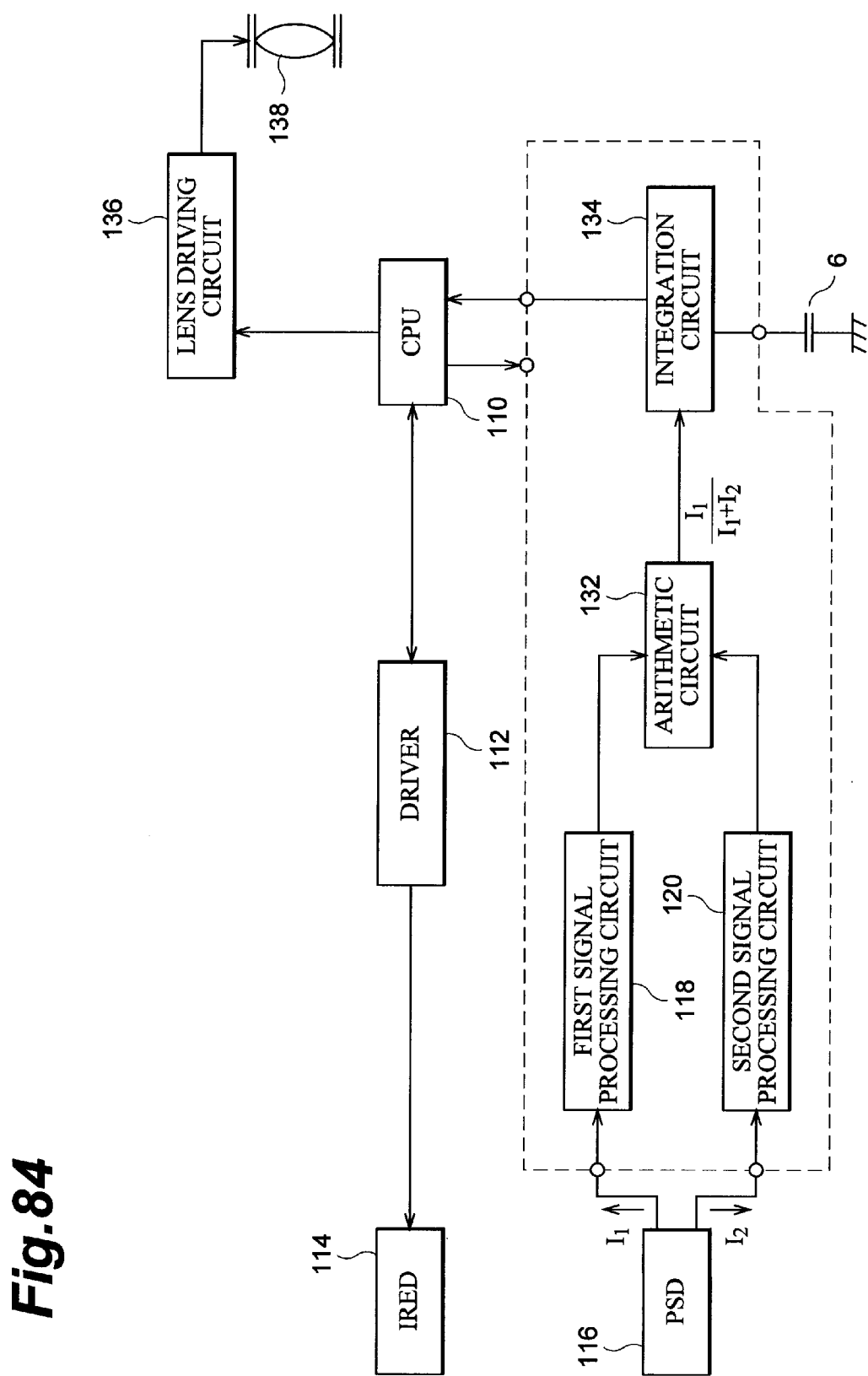
FIG. 84 is a block diagram of a distance measuring apparatus of the first prior art.

| | Lv | | |
|---|---|---|---|
| | Lv < 13.5 | 13.5 ≤ Lv < 15.4 | 15.4 ≤ Lv |
| Comparative Example A | FIG. 67 | FIG. 72 | FIG. 78 |
| Comparative Example B | FIG. 68 | FIG. 73 | FIG. 79 |
| Comparative Example C | FIG. 69 | FIG. 74 | FIG. 80 |
| Embodiment A | FIG. 70 | FIG. 75 | FIG. 81 |
| Embodiment B | FIG. 71 | FIG. 76 | FIG. 82 |
| Embodiment C | FIG. 35 | FIG. 77 | FIG. 83 |

As can be seen from these charts, in Comparative Examples A to C in which the luminance switching judgment value AEDATA is a fixed value, it is necessary for the luminance switching judgment value AEDATA to be set and fixed so as to correspond to the worst case in which the PSD 5 is located on the farther side (FIG. 88C), whereby the distance range in which the distance signal is uniquely determined would become narrower as the PSD 5 is located on the nearer side. In each of Embodiments A to C, by contrast, the luminance switching judgment value AEDATA set according to the position of the PSD 5 is larger than that in the case of Comparative Examples, whereby the distance and external light luminance ranges in which the distance signal is uniquely determined are wide. As a consequence, the distance measuring apparatus in accordance with the present invention can yield an excellent accuracy in long-distance range-finding even if the outer light luminance fluctuates, thereby enabling secure infinity judgment.

Without being restricted to the above-mentioned embodiments, the present invention can be modified in various manners. For example, though one luminance switching judgement value AEDATA is employed for switching conversion expressions in each embodiment, two or more luminance switching judgement values AEDATA may be provided for switching a number of conversion expressions. Also, though the above-mentioned embodiments employ the farthest AF signal INFDATA in order to calculate the position of the position-sensing device, the AF signal corresponding to the infinity distance or that corresponding a given distance may be used. Further, a value of a conversion expression from the AF signal to the distance signal may be used for calculating the position of the position-sensing device.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measuring apparatus comprising:

light-emitting means for outputting a light beam toward an object to be subjected to distance measurement;

light-receiving means for receiving reflected light of the light beam projected on said object at a light-receiving position corresponding to a distance to said object and outputting, on the basis of the light-receiving position, a far-side signal whose value becomes larger when the distance increases if an amount of received light remains the same and a near-side signal whose value becomes larger when the distance decreases if the amount of received light remains the same;

clamp means for receiving the far-side signal, comparing a level of the far-side signal with that of a clamp signal, and directly outputting the far-side signal when the far-side signal has a level higher than that of the clamp signal, and otherwise, outputting the clamp signal;

arithmetic means for calculating an output ratio of the near-side signal to the signal output from said clamp means and outputting an output ratio signal; and conversion means for converting the output ratio signal into a distance signal corresponding to the distance in accordance with a transformation formula which changes depending on whether the output ratio signal is on a far side of a predetermined reference level, the predetermined reference level being a clamp effect presence/absence determination reference level defined by a reference object reflectivity.

2. An apparatus according to claim 1, wherein said conversion means converts the output ratio signal into the distance signal corresponding to the distance in accordance with a first transformation formula when the output ratio signal is on a near side of the predetermined reference level, and otherwise, in accordance with a second transformation formula determined on the basis of the first transformation formula, and outputs the distance signal.

3. A method of adjusting said distance measuring apparatus of claim 2, comprising:

obtaining, on the basis of actual measurement, the first transformation formula for converting the output ratio signal into the distance signal when the output ratio signal is on the near side of the clamp effect presence/absence determination reference level defined by the reference object reflectivity, and determining, on the basis of the first transformation formula, the second transformation formula for otherwise converting the output ratio signal into the distance signal.

4. An apparatus according to claim 1, wherein said conversion means converts the output ratio signal into the distance signal corresponding to the distance in accordance with a first transformation formula when the output ratio signal is on a near side of the predetermined reference level, and otherwise, in accordance with a second transformation formula determined on the basis of an effect amount of said clamp means at the distance having a predetermined value and a distance which is obtained from the level of the clamp signal and at which the effect of said clamp means is obtained, and outputs the distance signal.

5. A method of adjusting said distance measuring apparatus of claim 4, comprising:

obtaining, on the basis of actual measurement, the first transformation formula for converting the output ratio signal into the distance signal when the output ratio signal is on the near side of the clamp effect presence/absence determination reference level defined by the reference object reflectivity, and determining the second transformation formula for otherwise converting the output ratio signal into the distance signal, on the basis of the effect amount of said clamp means at the distance having a predetermined value and the distance which is obtained from the level of the clamp signal and at which the effect of said clamp means is obtained.

6. An apparatus according to claim 1, further comprising luminance measurement means for measuring an external light luminance, and wherein said conversion means converts the output ratio signal into the distance signal corresponding to the distance in accordance with a first transformation formula when the output ratio signal is on a near side of the predetermined reference level, and otherwise, in accordance with one of the first transformation formula and a second transformation formula on the basis of the external light luminance measured by said luminance measurement means, and outputs the distance signal.

7. An apparatus according to claim 1, further comprising temperature measurement means for measuring a temperature, and wherein said conversion means converts the output ratio signal into the distance signal corresponding to the distance in accordance with a first transformation formula when the output ratio signal is on a near side of the predetermined reference level, and otherwise, in accordance with one of the first transformation formula and a second transformation formula on the basis of the temperature measured by said temperature measurement means, and outputs the distance signal.

8. An apparatus according to claim 1, further comprising voltage measurement means for measuring a power supply voltage, and wherein said conversion means converts the output ratio signal into the distance signal corresponding to the distance in accordance with a first transformation formula when the output ratio signal is on a near side of the predetermined reference level, and otherwise, in accordance with one of the first transformation formula and a second transformation formula on the basis of the power supply voltage measured by said voltage measurement means, and outputs the distance signal.

9. An apparatus according to claim 1, further comprising luminance measurement means for measuring an external light luminance, and wherein said conversion means converts the output ratio signal into the distance signal corresponding to the distance in accordance with a first transformation formula when the output ratio signal is on a near side of the predetermined reference level, and otherwise, in accordance with one of a second transformation formula and a third transformation formula on the basis of the external light luminance measured by said luminance measurement means, and outputs the distance signal.

10. An apparatus according to claim 1, further comprising temperature measurement means for measuring a temperature, and wherein said conversion means converts the output ratio signal into the distance signal corresponding to the distance in accordance with a first transformation formula when the output ratio signal is on a near side of the predetermined reference level, and otherwise, in accordance with one of a second transformation formula and a third transformation formula on the basis of the temperature measured by said temperature measurement means, and outputs the distance signal.

11. An apparatus according to claim 1, further comprising voltage measurement means for measuring a power supply voltage, and wherein said conversion means converts the output ratio signal into the distance signal corresponding to the distance in accordance with a first transformation formula when the output ratio signal is on a near side of the predetermined reference level, and otherwise, in accordance with one of a second transformation formula and a third transformation formula on the basis of the power supply voltage measured by said voltage measurement means, and outputs the distance signal.

12. An apparatus according to claim 1, further comprising luminance measurement means for measuring an external light luminance, and wherein said conversion means converts the output ratio signal into the distance signal corresponding to the distance in accordance with a first transformation formula when the output ratio signal is on a near side of the predetermined reference level, and otherwise, in accordance with a second transformation formula in which a value of the output ratio signal for determining infinity depends on the external light luminance measured by said luminance measurement means, and outputs the distance signal.

13. An apparatus according to claim 1, further comprising temperature measurement means for measuring a temperature, and wherein said conversion means converts the output ratio signal into the distance signal corresponding to the distance in accordance with a first transformation formula when the output ratio signal is on a near side of the predetermined reference level, and otherwise, in accordance with a second transformation formula in which a value of the output ratio signal for determining infinity depends on the temperature measured by said temperature measurement means, and outputs the distance signal.

14. An apparatus according to claim 1, further comprising voltage measurement means for measuring a power supply voltage, and wherein said conversion means converts the output ratio signal into the distance signal corresponding to the distance in accordance with a first transformation formula when the output ratio signal is on a near side of the predetermined reference level, and otherwise, in accordance with a second transformation formula in which a value of the output ratio signal for determining infinity depends on the power supply voltage measured by said voltage measurement means, and outputs the distance signal.

15. A distance measuring apparatus comprising:

light-emitting means for outputting a light beam toward an object to be subjected to distance measurement;

light-receiving means for receiving reflected light of the light beam projected on said object at a light-receiving position corresponding to a distance to said object and outputting, on the basis of the light-receiving position, a far-side signal whose value becomes larger when the distance increases if an amount of received light remains the same and a near-side signal whose value becomes larger when the distance decreases if the amount of received light remains the same;

clamp means for receiving the far-side signal, comparing a level of the far-side signal with that of a clamp signal, and directly outputting the far-side signal when the far-side signal has a level higher than that of the clamp signal, and otherwise, outputting the clamp signal;

arithmetic means for calculating an output ratio of the near-side signal to the signal output from said clamp means and outputting an output ratio signal;

detection means for outputting a detection signal representing whether the far-side signal has a level higher than that of the clamp signal; and conversion means for converting the output ratio signal into a distance signal corresponding to the distance in accordance with a transformation formula which changes depending on the detection signal.

16. An apparatus according to claim 15, wherein said conversion means converts the output ratio signal into the distance signal corresponding to the distance in accordance with a first transformation formula when the detection signal represents that the far-side signal has a level higher than that of the clamp signal, and otherwise, in accordance with a second transformation formula determined on the basis of the first transformation formula, and outputs the distance signal.

17. A method of adjusting said distance measuring apparatus of claim 16, comprising:
   obtaining, on the basis of actual measurement, the first transformation formula for converting the output ratio signal into the distance signal when the far-side signal has a level higher than that of the clamp signal; and
   determining, on the basis of the first transformation formula, the second transformation formula for otherwise converting the output ratio signal into the distance signal.

18. An apparatus according to claim 15, further comprising luminance measurement means for measuring an external light luminance, and wherein
   said conversion means converts the output ratio signal into the distance signal corresponding to the distance in accordance with a first transformation formula when the detection signal represents that the far-side signal has a level higher than that of the clamp signal, and otherwise, in accordance with one of the first transformation formula and a second transformation formula on the basis of the external light luminance measured by said luminance measurement means, and outputs the distance signal.

19. An apparatus according to claim 15, further comprising temperature measurement means for measuring a temperature, and wherein
   said conversion means converts the output ratio signal into the distance signal corresponding to the distance in accordance with a first transformation formula when the detection signal represents that the far-side signal has a level higher than that of the clamp signal, and otherwise, in accordance with one of the first transformation formula and a second transformation formula on the basis of the temperature measured by said temperature measurement means, and outputs the distance signal.

20. An apparatus according to claim 15, further comprising voltage measurement means for measuring a power supply voltage, and wherein
   said conversion means converts the output ratio signal into the distance signal corresponding to the distance in accordance with a first transformation formula when the detection signal represents that the far-side signal has a level higher than that of the clamp signal, and otherwise, in accordance with one of the first transformation formula and a second transformation formula on the basis of the power supply voltage measured by said voltage measurement means, and outputs the distance signal.

21. An apparatus according to claim 15, further comprising luminance measurement means for measuring an external light luminance, and wherein
   said conversion means converts the output ratio signal into the distance signal corresponding to the distance in accordance with a first transformation formula when the detection signal represents that the far-side signal has a level higher than that of the clamp signal, and otherwise, in accordance with one of a second transformation formula and a third transformation formula on the basis of the external light luminance measured by said luminance measurement means, and outputs the distance signal.

22. An apparatus according to claim 15, further comprising temperature measurement means for measuring a temperature, and wherein
   said conversion means converts the output ratio signal into the distance signal corresponding to the distance in accordance with a first transformation formula when the detection signal represents that the far-side signal has a level higher than that of the clamp signal, and otherwise, in accordance with one of a second transformation formula and a third transformation formula on the basis of the temperature measured by said temperature measurement means, and outputs the distance signal.

23. An apparatus according to claim 15, further comprising voltage measurement means for measuring a power supply voltage, and wherein
   said conversion means converts the output ratio signal into the distance signal corresponding to the distance in accordance with a first transformation formula when the detection signal represents that the far-side signal has a level higher than that of the clamp signal, and otherwise, in accordance with one of a second transformation formula and a third transformation formula on the basis of the power supply voltage measured by said voltage measurement means, and outputs the distance signal.

24. An apparatus according to claim 15, further comprising luminance measurement means for measuring an external light luminance, and wherein
   said conversion means converts the output ratio signal into the distance signal corresponding to the distance in accordance with a first transformation formula when the detection signal represents that the far-side signal has a level higher than that of the clamp signal, and otherwise, in accordance with a second transformation formula in which a value of the output ratio signal for determining infinity depends on the external light luminance measured by said luminance measurement means, and outputs the distance signal.

25. An apparatus according to claim 15, further comprising temperature measurement means for measuring a temperature, and wherein
   said conversion means converts the output ratio signal into the distance signal corresponding to the distance in accordance with a first transformation formula when the detection signal represents that the far-side signal has a level higher than that of the clamp signal, and otherwise, in accordance with a second transformation formula in which a value of the output ratio signal for determining infinity depends on the temperature measured by said temperature measurement means, and outputs the distance signal.

26. An apparatus according to claim 15, further comprising voltage measurement means for measuring a power supply voltage, and wherein
   said conversion means converts the output ratio signal into the distance signal corresponding to the distance in accordance with a first transformation formula when the detection signal represents that the far-side signal has a level higher than that of the clamp signal, and otherwise, in accordance with a second transformation formula in which a value of the output ratio signal for determining infinity depends on the power supply voltage measured by said voltage measurement means, and outputs the distance signal.

27. An apparatus according to claim 1, further comprising luminance measurement means for measuring an external light luminance, and wherein said conversion means uses a first transformation formula when said output ratio signal is on a nearer side of a clamping effect judgment reference level which is determined by a reference sample reflectivity or when said output ratio signal is on a farther side of said clamping effect judgment reference level while the external light luminance measured by said luminance measurement means is not lower than a luminance switching judgment value set according to a position where said position-sensing device is installed, and uses a second transformation formula at other times.

28. An apparatus according to claim 27, wherein said luminance switching judgment value is set according to a level of said clamp signal as well.

29. An apparatus according to claim 1, further comprising luminance measurement means for measuring an external light luminance, and wherein said conversion means uses a first transformation formula when said output ratio signal is on a nearer side of a clamping effect judgment reference level which is determined by a reference sample reflectivity, and, otherwise, uses a second transformation formula in which an output ratio signal value assuming said distance to be infinity depends on a relationship in terms of magnitude between the external light luminance measured by said luminance measurement means and a luminance switching judgment value set according to a position where said position-sensing device is installed.

30. An apparatus according to claim 29, wherein said luminance switching judgment value is set according to a level of said clamp signal as well.

31. An apparatus according to claim 1, further comprising luminance measurement means for measuring external light luminance, and wherein said conversion means uses a first transformation formula when said output ratio signal is on a nearer side of a clamping effect judgment reference level which is determined by a reference sample reflectivity, uses a second transformation formula when said output ratio signal is on a farther side of said clamping effect judgment reference level while said external light luminance measured by said luminance measurement means is lower than a luminance switching judgment value set according to a position where said position-sensing device is installed, and uses a third transformation formula at other times.

32. An apparatus according to claim 31, wherein said luminance switching judgment value is set according to a level of said clamp signal as well.

* * * * *